United States Patent
Roth et al.

(10) Patent No.: US 10,007,423 B2
(45) Date of Patent: *Jun. 26, 2018

(54) TECHNIQUES FOR ELECTRONIC AGGREGATION OF INFORMATION

(71) Applicant: MICROSOFT TECHNOLOGY LICENSING, LLC, Redmond, WA (US)

(72) Inventors: Tali Roth, Kirkland, WA (US); Matthew Wood, Seattle, WA (US); Scott Stiles, Sammamish, WA (US); Michael Affronti, Seattle, WA (US); Jodie Draper, Kirkland, WA (US); Malia Douglas, Seattle, WA (US); Janet Schorr, Seattle, WA (US); Zeyad Rajabi, Bellevue, WA (US); Robin Troy, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 10 days.

This patent is subject to a terminal disclaimer.

(21) Appl. No.: 15/219,709

(22) Filed: Jul. 26, 2016

(65) Prior Publication Data

US 2016/0334987 A1 Nov. 17, 2016

Related U.S. Application Data

(63) Continuation of application No. 13/073,931, filed on Mar. 28, 2011, now Pat. No. 9,436,685, which is a
(Continued)

(51) Int. Cl.
G06F 3/048 (2013.01)
G06F 3/0488 (2013.01)
(Continued)

(52) U.S. Cl.
CPC ........ *G06F 3/04883* (2013.01); *G06F 3/0482* (2013.01); *G06F 3/0486* (2013.01);
(Continued)

(58) Field of Classification Search
CPC ............ G06F 17/3002; G06F 3/04883; G06F 3/0482; G06F 3/048
See application file for complete search history.

(56) References Cited

U.S. PATENT DOCUMENTS

| 4,398,890 A | 8/1983 | Knowlton |
| 4,555,775 A | 11/1985 | Pike |

(Continued)

FOREIGN PATENT DOCUMENTS

| JP | H08-044883 | 9/1997 |
| JP | 2003150484 | 5/2003 |

(Continued)

OTHER PUBLICATIONS

Foley, Mary Jo., "Microsoft moves its social-computing lab to Microsoft Research", Retrieved at «http://www.zdnet.com/blog/microsoft/microsoft-moves-its-social-co- mputing-lab-to-microsoft-research/7996», Nov. 17, 2010, pp. 4.

(Continued)

*Primary Examiner* — Mahelet Shiberou

(57) ABSTRACT

Techniques for an electronic montage system are described. An apparatus may comprise a logic device arranged to execute a montage application comprising an authoring component operative to provide a presentation surface having multiple presentation tiles, receive control directives to associate content files with presentation tiles, generate tile objects for the content files based on content file types for the content files, and store the presentation surface and tile objects as a montage. Other embodiments are described and claimed.

20 Claims, 53 Drawing Sheets

Related U.S. Application Data continuation-in-part of application No. 12/978,318, filed on Dec. 23, 2010.

(51) Int. Cl.
*G06F 17/30* (2006.01)
*G06F 3/0482* (2013.01)
*G06F 3/0484* (2013.01)
*G06F 3/0486* (2013.01)

(52) U.S. Cl.
CPC ...... *G06F 3/04842* (2013.01); *G06F 3/04847* (2013.01); *G06F 17/3002* (2013.01); *G06F 17/30058* (2013.01)

(56) References Cited

U.S. PATENT DOCUMENTS

| | | |
|---|---|---|
| 4,653,020 A | 3/1987 | Cheselka et al. |
| 4,712,191 A | 12/1987 | Penna |
| 5,297,032 A | 3/1994 | Trojan et al. |
| 5,321,750 A | 6/1994 | Nadan |
| 5,339,392 A | 8/1994 | Risberg et al. |
| 5,394,521 A | 2/1995 | Henderson, Jr. et al. |
| 5,465,982 A | 11/1995 | Rebane |
| 5,479,602 A | 12/1995 | Baecker et al. |
| 5,548,664 A | 8/1996 | Knowlton |
| 5,577,187 A | 11/1996 | Mariani |
| 5,623,592 A | 4/1997 | Carlson et al. |
| 5,623,613 A | 4/1997 | Rowe et al. |
| 5,630,754 A | 5/1997 | Rebane |
| 5,707,288 A | 1/1998 | Stephens |
| 5,727,174 A | 3/1998 | Aparipio, IV et al. |
| 5,758,259 A | 5/1998 | Lawler |
| 5,764,241 A | 6/1998 | Elliott et al. |
| 5,805,118 A | 9/1998 | Mishra et al. |
| 5,805,166 A | 9/1998 | Hall, Jr. et al. |
| 5,812,123 A | 9/1998 | Rowe et al. |
| 5,819,284 A | 10/1998 | Farber et al. |
| 5,867,161 A | 2/1999 | Walsh |
| 5,907,323 A | 5/1999 | Lawler et al. |
| 5,935,003 A | 8/1999 | Stephens et al. |
| 5,959,621 A | 9/1999 | Nawaz et al. |
| 5,973,692 A | 10/1999 | Knowlton et al. |
| 6,008,803 A | 12/1999 | Rowe et al. |
| 6,052,486 A | 4/2000 | Knowlton et al. |
| 6,057,842 A | 5/2000 | Knowlton et al. |
| 6,058,417 A | 5/2000 | Hess et al. |
| 6,067,086 A | 5/2000 | Walsh |
| 6,072,535 A | 6/2000 | Kearns |
| 6,100,888 A | 8/2000 | Gourdol et al. |
| 6,111,582 A | 8/2000 | Jenkins |
| 6,119,135 A | 9/2000 | Helfman |
| 6,121,969 A | 9/2000 | Jain et al. |
| 6,133,916 A | 10/2000 | Bukszar et al. |
| 6,181,838 B1 | 1/2001 | Knowlton |
| 6,182,090 B1 | 1/2001 | Peairs |
| 6,188,405 B1 | 2/2001 | Czerwinski et al. |
| 6,216,141 B1 | 4/2001 | Straub et al. |
| 6,233,591 B1 | 5/2001 | Sherman et al. |
| 6,259,448 B1 | 7/2001 | McNally et al. |
| 6,266,684 B1 | 7/2001 | Kraus et al. |
| 6,278,448 B1 | 8/2001 | Brown et al. |
| 6,300,947 B1 | 10/2001 | Kanevsky |
| 6,311,058 B1 | 10/2001 | Wecker et al. |
| 6,346,951 B1 | 2/2002 | Mastronardi |
| 6,377,285 B1 | 4/2002 | Doan et al. |
| 6,396,473 B1 | 5/2002 | Callahan et al. |
| 6,396,518 B1 | 5/2002 | Dow et al. |
| 6,449,638 B1 | 9/2002 | Wecker et al. |
| 6,456,334 B1 | 9/2002 | Duhault |
| 6,469,722 B1 | 10/2002 | Kinoe et al. |
| 6,469,723 B1 | 10/2002 | Gould et al. |
| 6,486,891 B1 | 11/2002 | Rice |
| 6,496,206 B1 | 12/2002 | Mernyk et al. |
| 6,501,476 B1 | 12/2002 | Gould et al. |
| 6,510,553 B1 | 1/2003 | Hazra |
| 6,523,174 B1 | 2/2003 | Gould et al. |
| 6,529,200 B2 | 3/2003 | Gould |
| 6,556,205 B1 | 4/2003 | Gould et al. |
| 6,628,283 B1 | 9/2003 | Gardner |
| 6,687,419 B1 | 2/2004 | Atkin |
| 6,700,579 B2 | 3/2004 | Gould |
| 6,724,403 B1 | 4/2004 | Santoro et al. |
| 6,782,539 B2 | 4/2004 | Gould |
| 6,791,552 B2 | 9/2004 | Gould et al. |
| 6,801,225 B1 | 10/2004 | Gould |
| 6,807,558 B1 | 10/2004 | Hassett et al. |
| 6,832,355 B1 | 12/2004 | Duperrouzel et al. |
| 6,868,551 B1 | 3/2005 | Lawler et al. |
| 6,883,138 B2 | 4/2005 | Rosenholtz et al. |
| 6,937,254 B2 | 8/2005 | Nishiyama et al. |
| 6,976,210 B1 | 12/2005 | Silva et al. |
| 6,983,426 B1 | 1/2006 | Kobayashi et al. |
| 6,999,045 B2 | 2/2006 | Cok |
| 7,007,076 B1 | 2/2006 | Hess |
| 7,028,264 B2 | 4/2006 | Santoro et al. |
| 7,089,248 B1 | 8/2006 | King et al. |
| 7,158,878 B2 | 1/2007 | Rasmussen et al. |
| 7,159,188 B2 | 1/2007 | Stabb et al. |
| 7,162,493 B2 | 1/2007 | Weiss et al. |
| 7,188,316 B2 | 3/2007 | Gusmorino et al. |
| 7,203,909 B1 | 4/2007 | Horvitz et al. |
| 7,283,140 B2 | 10/2007 | Zhou et al. |
| 7,376,907 B2 | 5/2008 | Santoro et al. |
| 7,454,711 B2 | 11/2008 | Angiulo et al. |
| 7,469,380 B2 | 12/2008 | Wessling et al. |
| 7,499,979 B2 | 3/2009 | Hess et al. |
| 7,539,727 B2 | 5/2009 | Miller et al. |
| 7,568,154 B2 | 6/2009 | Salesin et al. |
| 7,580,960 B2 | 8/2009 | Travieso et al. |
| 7,581,176 B2 | 8/2009 | Wilson |
| 7,669,140 B2 | 2/2010 | Matthews et al. |
| 7,705,858 B2 | 4/2010 | Ubillos et al. |
| 7,761,791 B2 | 7/2010 | Kobashi et al. |
| 7,765,490 B2 | 7/2010 | Lai et al. |
| 7,813,562 B2 | 10/2010 | Pallister |
| 7,885,861 B2 | 2/2011 | Mills |
| 7,933,632 B2 | 4/2011 | Flynt et al. |
| 7,941,429 B2 | 5/2011 | Krovitz et al. |
| 7,945,546 B2 | 5/2011 | Bliss et al. |
| 7,948,504 B2 | 5/2011 | Sheasby et al. |
| 7,987,431 B2 | 7/2011 | Santoro et al. |
| 7,995,652 B2 | 8/2011 | Washington |
| 8,000,533 B2 | 8/2011 | Matsushita et al. |
| 8,010,885 B2 | 8/2011 | Bodin et al. |
| 8,078,603 B1 | 12/2011 | Chandratillake et al. |
| 8,171,004 B1 | 5/2012 | Kaminski, Jr. |
| 8,185,635 B2 | 5/2012 | Holmes et al. |
| 8,208,741 B2 | 6/2012 | Pallister |
| 8,358,902 B2 | 1/2013 | Mino |
| 8,443,300 B2 | 5/2013 | Nankani |
| 8,463,764 B2 | 6/2013 | Fujioka et al. |
| 8,489,577 B2 | 7/2013 | Fujioka |
| 8,498,657 B1 | 7/2013 | Delker et al. |
| 8,527,537 B2 | 9/2013 | Wang et al. |
| 8,683,314 B2 | 3/2014 | Berkner et al. |
| 8,687,023 B2 | 4/2014 | Markiewicz et al. |
| 8,745,018 B1 | 6/2014 | Singleton et al. |
| 8,745,168 B1 | 6/2014 | Singleton et al. |
| 8,745,604 B1 | 6/2014 | Agarwal |
| 8,910,076 B2 | 12/2014 | Fernandez |
| 8,988,347 B2 | 3/2015 | Iwase et al. |
| 9,171,076 B2 | 10/2015 | Boezeman et al. |
| 2001/0054035 A1 | 12/2001 | Lee |
| 2001/0056370 A1 | 12/2001 | Tafla |
| 2002/0004825 A1 | 1/2002 | Lindberg |
| 2002/0059215 A1 | 5/2002 | Kotani et al. |
| 2002/0075312 A1 | 6/2002 | Amadio et al. |
| 2002/0089519 A1 | 7/2002 | Betz et al. |
| 2002/0111177 A1 | 8/2002 | Castres et al. |
| 2002/0135621 A1 | 9/2002 | Angiulo et al. |
| 2002/0191028 A1 | 12/2002 | Senechalle et al. |
| 2003/0001827 A1 | 1/2003 | Gould |
| 2003/0002529 A1 | 1/2003 | Gibbons et al. |

(56) References Cited

U.S. PATENT DOCUMENTS

| | | |
|---|---|---|
| 2003/0014415 A1 | 1/2003 | Weiss et al. |
| 2003/0016247 A1 | 1/2003 | Lai et al. |
| 2003/0020671 A1 | 1/2003 | Santoro et al. |
| 2003/0033424 A1 | 2/2003 | Gould |
| 2003/0085899 A1 | 5/2003 | Gould et al. |
| 2003/0085920 A1 | 5/2003 | Belknap et al. |
| 2003/0177286 A1 | 9/2003 | Gould |
| 2003/0217328 A1 | 11/2003 | Agassi et al. |
| 2004/0015562 A1 | 1/2004 | Harper et al. |
| 2004/0088377 A1 | 5/2004 | Henriquez |
| 2004/0113930 A1 | 6/2004 | Hawley et al. |
| 2004/0122748 A1 | 6/2004 | Donald |
| 2004/0135815 A1 | 7/2004 | Browne et al. |
| 2004/0183824 A1 | 9/2004 | Benson et al. |
| 2004/0201628 A1 | 10/2004 | Johanson et al. |
| 2004/0205286 A1 | 10/2004 | Bryant et al. |
| 2004/0255244 A1 | 12/2004 | Filner et al. |
| 2005/0138009 A1 | 6/2005 | Deshpande |
| 2005/0188402 A1 | 8/2005 | de Andrade et al. |
| 2005/0198584 A1 | 9/2005 | Matthews et al. |
| 2005/0267869 A1 | 12/2005 | Horvitz et al. |
| 2005/0283734 A1 | 12/2005 | Santoro et al. |
| 2006/0004705 A1 | 1/2006 | Horvitz et al. |
| 2006/0026508 A1 | 2/2006 | Balinsky et al. |
| 2006/0075348 A1 | 4/2006 | Xu et al. |
| 2006/0107231 A1 | 5/2006 | Matthews et al. |
| 2006/0122917 A1 | 6/2006 | Lokuge et al. |
| 2006/0136477 A1 | 6/2006 | Bishop et al. |
| 2006/0173985 A1 | 8/2006 | Moore |
| 2006/0190833 A1 | 8/2006 | SanGiovanni et al. |
| 2006/0197963 A1 | 9/2006 | Royal et al. |
| 2006/0198555 A1 | 9/2006 | Hosotsubo |
| 2006/0200752 A1 | 9/2006 | Sellers et al. |
| 2006/0253775 A1 | 11/2006 | Ovetchkine et al. |
| 2007/0011250 A1 | 1/2007 | Kortum et al. |
| 2007/0050340 A1 | 3/2007 | von Kaenel et al. |
| 2007/0064004 A1 | 3/2007 | Bonner et al. |
| 2007/0097148 A1 | 5/2007 | Tanaka |
| 2007/0110080 A1 | 5/2007 | Bennett |
| 2007/0168425 A1 | 7/2007 | Morotomi |
| 2007/0171473 A1 | 7/2007 | Iwasaki |
| 2007/0183493 A1 | 8/2007 | Kimpe |
| 2007/0245265 A1 | 10/2007 | Zerba |
| 2007/0256073 A1 | 11/2007 | Troung et al. |
| 2007/0263984 A1 | 11/2007 | Sterner et al. |
| 2007/0265098 A1 | 11/2007 | Shimada et al. |
| 2008/0028308 A1 | 1/2008 | Brownlee et al. |
| 2008/0072166 A1 | 3/2008 | Reddy |
| 2008/0147664 A1 | 6/2008 | Fujiwara et al. |
| 2008/0172632 A1 | 7/2008 | Stambaugh |
| 2008/0222687 A1 | 9/2008 | Edry |
| 2008/0244408 A1 | 10/2008 | King et al. |
| 2008/0256440 A1 | 10/2008 | Boreham et al. |
| 2008/0262922 A1 | 10/2008 | Ahn et al. |
| 2008/0320413 A1 | 12/2008 | Oshiro et al. |
| 2009/0019031 A1 | 1/2009 | Krovitz et al. |
| 2009/0049104 A1 | 2/2009 | Pan |
| 2009/0064222 A1 | 3/2009 | Dawson et al. |
| 2009/0070710 A1 | 3/2009 | Kagaya et al. |
| 2009/0112806 A1 | 4/2009 | Cheng et al. |
| 2009/0119583 A1 | 5/2009 | Kihara et al. |
| 2009/0132942 A1 | 5/2009 | Santoro et al. |
| 2009/0164928 A1 | 6/2009 | Brown et al. |
| 2009/0228777 A1 | 9/2009 | Henry et al. |
| 2009/0237564 A1 | 9/2009 | Kikinis et al. |
| 2009/0249213 A1 | 10/2009 | Murase et al. |
| 2009/0287990 A1 | 11/2009 | Lynton et al. |
| 2009/0300528 A1 | 12/2009 | Stambaugh |
| 2009/0307622 A1 | 12/2009 | Jalon et al. |
| 2009/0319376 A1 | 12/2009 | Mills |
| 2010/0002013 A1 | 1/2010 | Kagaya |
| 2010/0017470 A1 | 1/2010 | Hyoung et al. |
| 2010/0017746 A1 | 1/2010 | Husoy et al. |
| 2010/0095219 A1 | 4/2010 | Stachowiak et al. |
| 2010/0095239 A1 | 4/2010 | McCommons et al. |
| 2010/0179991 A1 | 7/2010 | Lorch et al. |
| 2010/0185722 A1 | 7/2010 | Jones et al. |
| 2010/0302015 A1 | 12/2010 | Kipman et al. |
| 2010/0332512 A1 | 12/2010 | Shpits |
| 2011/0016386 A1 | 1/2011 | Odagiri et al. |
| 2011/0022982 A1 | 1/2011 | Takaoka et al. |
| 2011/0096014 A1 | 4/2011 | Fuyuno et al. |
| 2011/0106893 A1 | 5/2011 | Le |
| 2011/0119610 A1 | 5/2011 | Hackborn et al. |
| 2011/0141103 A1 | 6/2011 | Cohen et al. |
| 2011/0173188 A1 | 7/2011 | Walsh et al. |
| 2011/0194842 A1 | 8/2011 | Krakirian |
| 2011/0202848 A1 | 8/2011 | Ismalon |
| 2011/0225547 A1 | 9/2011 | Fong et al. |
| 2011/0243397 A1 | 10/2011 | Watkins et al. |
| 2011/0264694 A1 | 10/2011 | Rensburg et al. |
| 2012/0054649 A1 | 3/2012 | McDonald et al. |
| 2012/0054717 A1 | 3/2012 | Huang et al. |
| 2012/0096410 A1 | 4/2012 | Lancaster |
| 2012/0124498 A1 | 5/2012 | Santoro et al. |
| 2012/0136892 A1 | 5/2012 | Ajima |
| 2012/0154444 A1 | 6/2012 | Fernandez |
| 2012/0162266 A1 | 6/2012 | Douglas et al. |
| 2012/0166953 A1 | 6/2012 | Affronti et al. |
| 2012/0246682 A1 | 9/2012 | de Andrade et al. |
| 2013/0047123 A1 | 2/2013 | May et al. |

FOREIGN PATENT DOCUMENTS

| | | |
|---|---|---|
| JP | 2004139170 | 5/2004 |
| JP | 2004157619 | 6/2004 |
| JP | 2004194146 | 7/2004 |
| JP | 2004240962 | 8/2004 |
| JP | 2006126911 | 5/2006 |
| JP | 2009282938 | 12/2009 |
| KR | 20030008944 | 1/2003 |
| KR | 100737974 | 1/2007 |
| WO | 9926127 | 5/1999 |
| WO | 0131416 | 5/2001 |
| WO | 2009048050 | 4/2009 |
| WO | 2010080851 | 7/2010 |
| WO | 2010150104 | 12/2010 |

OTHER PUBLICATIONS

Demo Project Website—Retrieved Date: Feb. 28, 2011, 31 pages. http://documentation.magnolia-cms.com/usermanual4/demoprojectwebsite.html- .

Introducing the Office (2007) Open XML File Formats—Retrieved Date: Feb. 28, 2011, 26 pages. http://msdn.microsoft.com/en-us/library/aa338205%28v=office.12%29.aspx.

Montage Windows Productivity software—published Apr. 13, 2008, downloaded Sep. 28, 2010, http://www.ideaxchg.com/montage/.

Dachselt, Raimund, et al., "FacetZoom: A Continuous Multi-Scale Widget for Navigating Hierarchical Metadata", CHI 2008 Proceedings, Multidimensional Visualization. Apr. 5-10, 2008, Florence Italy, pp. 1353-1356.

Techniques for Electronic Aggregation of Information, U.S. Appl. No. 12/978,318, filed Dec. 23, 2010, pp. 61.

Jacobs, et al., "Adaptive Document Layout via Manifold Content", Retrieved at «http://research.microsoft.com/pubs/69469/adl-wda.pdf», Proceedings of Workshop on Web Document Analysis, Aug. 3, 2003, pp. 25-28.

Samuel, Alexandra, "How to Use Thesis to Customize Your Teasers by Page and Category", Retrieved at «http://www.alexandrasamuel.com/toolbox/how-to-use-thesis-to-custo- mize-your-teasers-by-page-and-category», Retrieved Date: Feb. 14, 2012, pp. 7.

Stevenson, Karen, "Display Suite: Building Fancy Teasers Without Custom Templates", Retrieved at «http://www.lullabot.com/articles/display-suite-building-fancy-tea- sers-without-custom-templates», Oct. 4, 2011, pp. 12.

Techniques to Automatically Manage File Descriptors, U.S. Appl. No. 13/479,786, filed May 24, 2012, pp. 55.

Techniques to Manage Universal File Descriptor Models for Content Files, U.S. Appl. No. 13/479,831, filed May 24, 2012, pp. 55.

(56) References Cited

OTHER PUBLICATIONS

Ahietala, "Demo Project Website", <http://documentation.magnoloa-cms.com/usermanual14/demoprojectwebsite-.html> Retrieved date: Feb. 15, 2012, Edited Jan. 29, 2010, 31 pages.
Rice, Frank, "Introducing the Office (2007)Open XML File Formats", Office 2007, <http://msdn.microsoft.com/en-us/library/aa338205(v=office.12).a- spx, Microsoft Corporation, May 2006, 26 pages.
Weitzman, Louis, "Automatic Presentation of Multimedia Documents Using Relational Grammars", Proceedings of the second ACM International Conference on Multimedia, 1994, pp. 9.
Kang, et al., "Dynamic Layout Management in a Multimedia Bulletin Board", In: IEEE 2002 Symposia on Human Centric Computing Languages and Environments, Sep. 3-6, 2002, pp. 8.
Cai et al., "VIPS: a Vision-Based Page Segmentation Algorithm," 2003 pp. 1-29.
"Microsoft 7 Enterprise," 2009, Screenshots captures Aug. 8, 2013, pp. 1-7 (author unknown).
Bing search q+live+tile+interface&src=IE-SearchB Jan. 12, 2016, 3 pages.
Bing search q-tile%20user%20interface&qs=n&form= Feb. 21, 2016.
Bing search q=tile+interface&src=IE-SearchBox&Form=IESR02>, retrieved on Feb. 21, 2016.
Malani, Prakash, "UI design with Tiles and Struts", JavaWorld, Jan. 2, 2002, 12 pages.
Microsoft Office Labs vision 2019 (montage + video)—Published Date: Feb. 28, 2009 http://www.istartedsomething.com/20090228/microsoft-office-labs-vision-2019-video/.
Montage 10.521—Published date: Oct. 26, 2004; uploaded Sep. 28, 2010 http:/wwwfreedownloadcenter.com/Utilities/Explorersub.--Add-ons/Montage.- html.
"Montage 3.0.521", Retrieved at «http://www.freedownloadcenter.com/Utilities/Explorer.sub.--Add-o- ns/Montage.html», Apr. 25, 2011, pp. 2.
"Tiwule (Touch It With Ultimate Learning Experience) From Indonesia", Retrieved at «http://bonarl3.web.id/2010/05/tiwule-touch-it-with-ultimate-learn- ing-experience-from-indonesia/», May 29, 2010, pp. 7.
"Montage Windows productivity software", Retrieved at «http://www.ideaxchg.com/montage/», Apr. 13, 2008, pp. 2.
Anderson, et al., "Web Montage: A Dynamic Personalized Start Page", Retrieved at «http://research.microsoft.com/en-us/um/people/horvitz/ftp/montage- .pdf», WWW, May 7, 2002, pp. 9.
Amitani, et al., "Our Content: Generative Montage Methods for Multimedia Data", Fourth International Conference on Internet and Web Applications and Services, May 24-28, 2009, pp. 655-660.
Zheng, Long., "Microsoft Office Labs vision 2019 (montage + video)", Retrieved at «http://www.istartedsomething.com/20090228/microsoft-office-labs-v- ision-2019-video/», Feb. 28, 2009, pp. 32.
Lowensohn, Josh., "Fuse Labs' Montage blends search with blogging", Retrieved at «http://news.cnet.com/8301-10805_sub.--3-20023013-75.html», Nov. 16, 2010, pp. 5.
Oiaga, Marius., "FUSE Labs Montage Now Open to the Public", Retrieved at «http://news.softpedia.com/news/FUSE-Labs-Montage-Now-Open-to-the- Public-171538_shtml», Dec. 9, 2010, pp. 4.
Office Action received for Japanese Patent Application No. 2014-502752, dated Sep. 6, 2016, 12 pages including 6 pages English translation.
Notice of Patent Allowance received for Japanese Patent Application No. 2014532059, dated Nov. 1, 2016, 3 pages (untranslated).
Notice of Allowance received for U.S. Appl. No. 13/422,814, dated Dec. 23, 2016, 9 pages.
Office Action received for Argentinian Patent Application No. P120102032, dated Jun. 26, 2017, 3 pages.

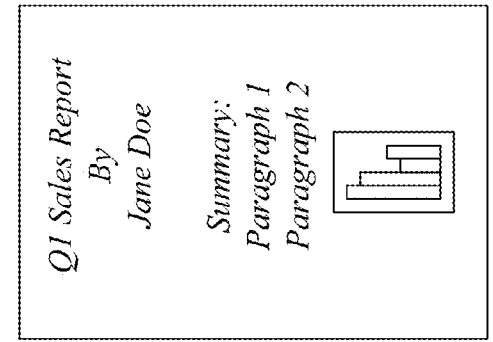
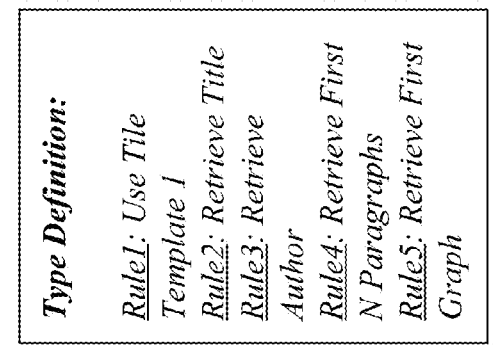
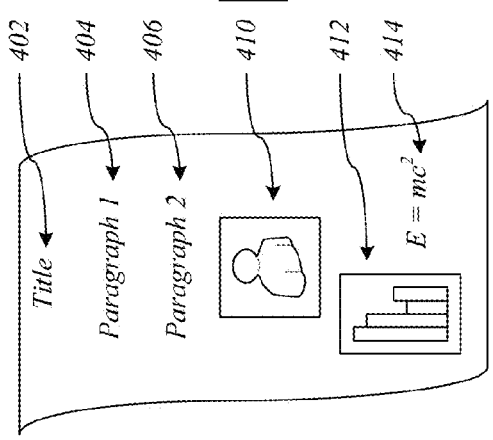
FIG. 4

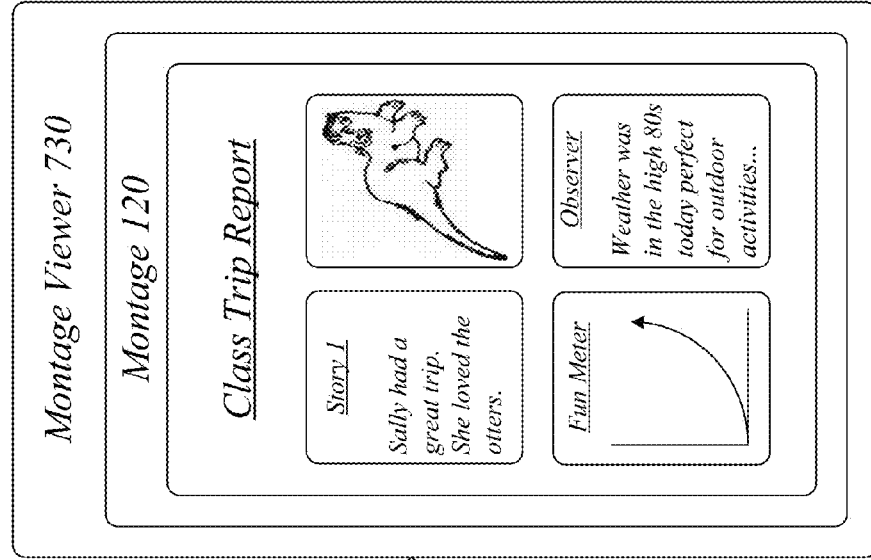
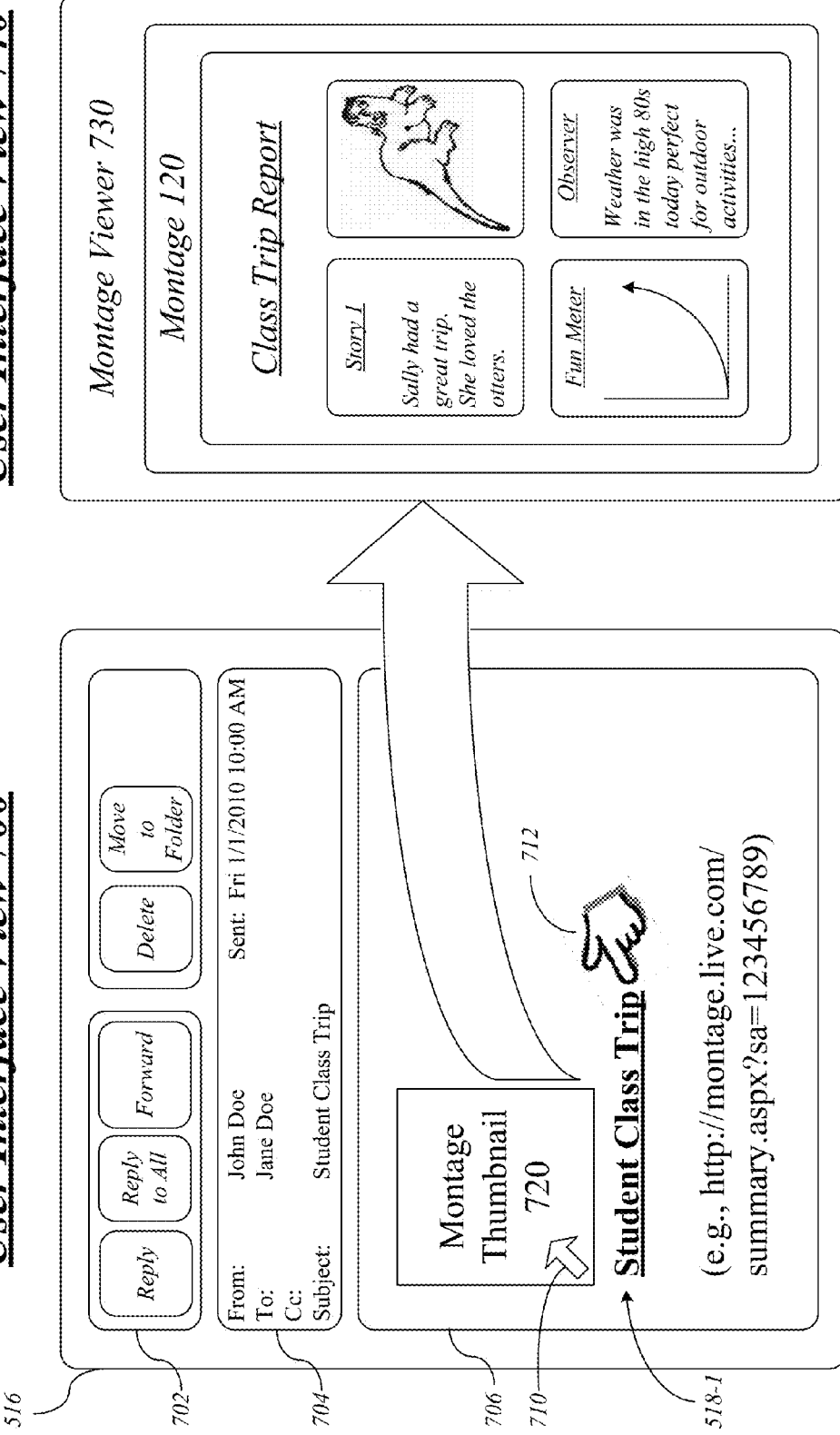
FIG. 7A
FIG. 7B

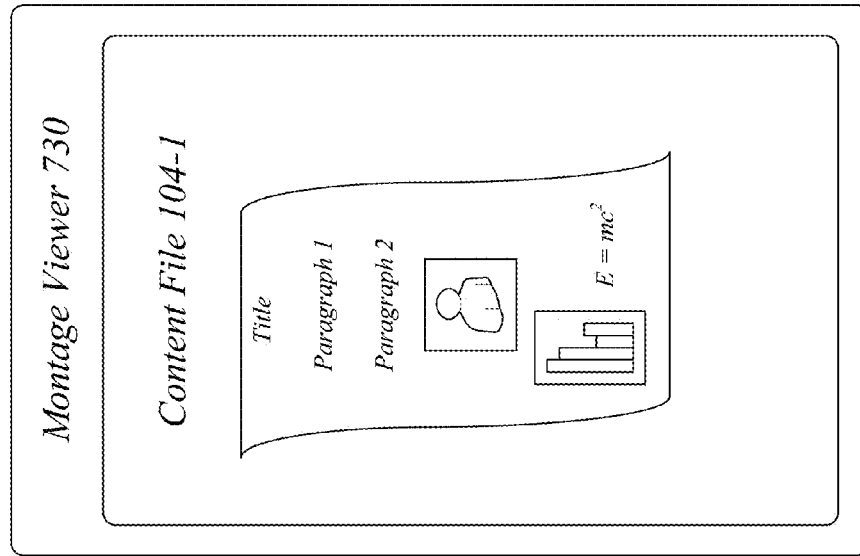
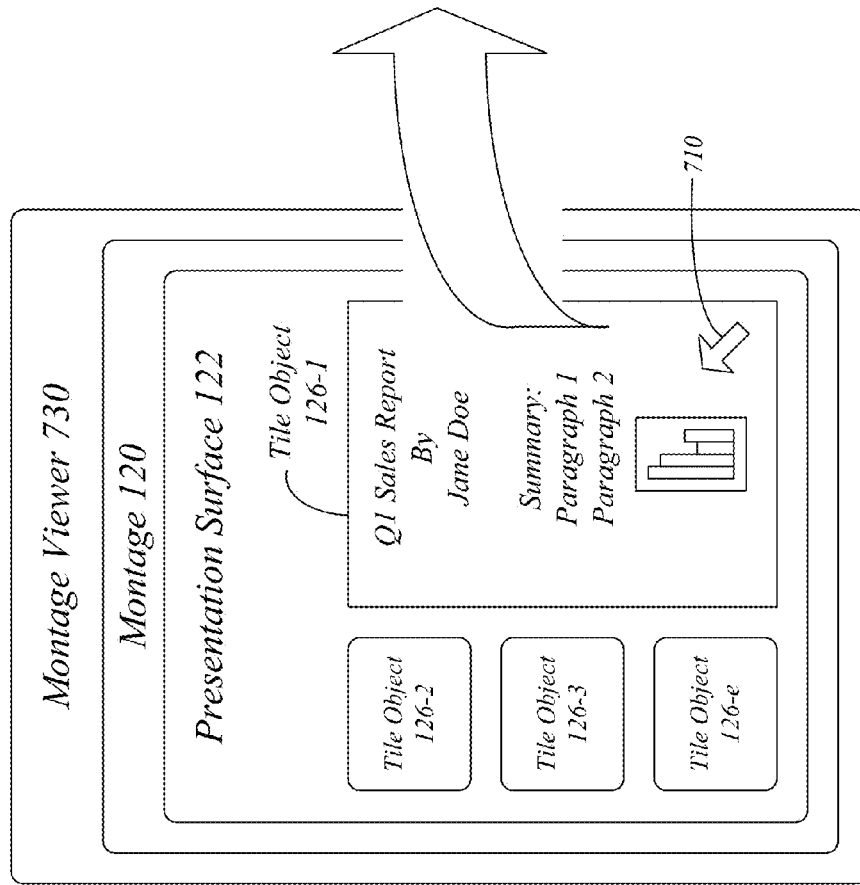

*800*

PROVIDE A PRESENTATION SURFACE HAVING MULTIPLE PRESENTATION TILES
802

RECEIVE A CONTROL DIRECTIVE TO ASSOCIATE A CONTENT FILE WITH A PRESENTATION TILE
804

IDENTIFY A CONTENT FILE TYPE FOR THE CONTENT FILE
806

RETRIEVE A PORTION OF CONTENT FROM THE CONTENT FILE BASED ON THE CONTENT FILE TYPE
808

GENERATE A TILE OBJECT BASED ON THE CONTENT PORTION
810

STORE THE PRESENTATION SURFACE AND TILE OBJECT AS A MONTAGE
812

```
GENERATE A MONTAGE COMPRISING A PRESENTATION
SURFACE WITH MULTIPLE PRESENTATION TILES EACH
HAVING A TILE OBJECT FOR A CORRESPONDING CONTENT
FILE
902
```

```
SEND THE MONTAGE AND CONTENT FILES TO A NETWORK
SERVICE
904
```

```
RECEIVE REFERENCES TO THE MONTAGE AND EACH
CONTENT FILE
906
```

```
ASSOCIATE A REFERENCE FOR A CONTENT FILE WITH A
CORRESPONDING TILE OBJECT
908
```

*FIG. 9*

Interesting facts about elephants

By Skylar M.

Elephants are the largest land animals now living. There are three species of elephant: the African bush elephant, the African forest elephant and the Asian elephant (also known as the Indian elephant).

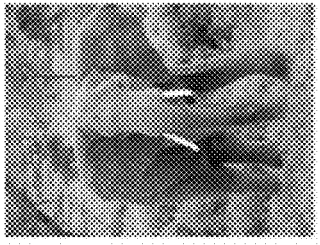

The elephant's gestation period is 22 months, the longest of any land animal. They typically live for 50 to 70 years, but the oldest recorded elephant lived for 82 years. The largest elephant ever recorded weighed about 24,000 lb with a shoulder height of 13.0 ft, a yard taller than the average male African elephant.

Elephants are a symbol of wisdom in Asian cultures and are famed for their memory and intelligence.

Healthy adult elephants have no natural predators, lions may take calves or weak individuals. They are threatened by human intrusion and poaching.

Interesting trivia about elephants:

- Elephants cry, play, have incredible memories, and laugh;
- Elephants are sensitive fellow animals where if a baby complains, the entire family will rumble and go over to touch and caress it.
- Elephants have greeting ceremonies when a friend that has been away for some time returns to the group.
- Elephants grieve at a loss of a stillborn baby, a family member, and in many cases other elephants.
- Elephants don't drink with their trunks, but use them as "tools" to drink with. This is accomplished by filling

Penguins: The Coolest Birds In Town
By Madison P.

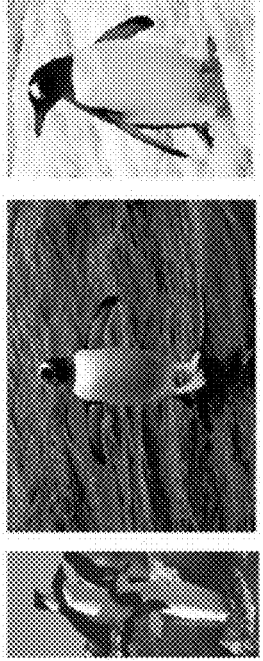

Penguins are flightless birds. World-wide there are 17 species of penguin, all of which breed in the Southern hemisphere. The name is believed to have originated from the Welsh "pen gwyn," which means white head. The name was originally applied to Great Auks, which are flightless birds that lived in the northern hemisphere, before being hunted to extinction in the 19th Century. Great Auks looked similar to penguins, and were also unable to fly, which is why they were killed off so Penguins differ from birds which are able to fly, by having a much heavier and more robust skeleton. Birds that fly must have a skeleton which is as light as possible, in order to make flight possible. This is achieved through bones that are paper-thin or hollow, often with internal honeycombing that combines adequate strength with low weight. For flying birds that also dive, such as Auks, this low density skeleton means that birds must work hard to overcome considerable natural buoyancy when diving below the water surface. For penguins that do not have the power of flight, such light weight skeletons hold no advantage, and they therefore have bones which are considerably denser, giving greater strength and reduced buoyancy.

The penguin skeleton is also markedly different from other birds around the furcula and breast bone, due to the differing movement and muscular requirements of penguin flippers compared to bird wings. Such differences in bone structure provide vital clues to the ancestry of penguins, since bones are often the only parts that remain as fossils.

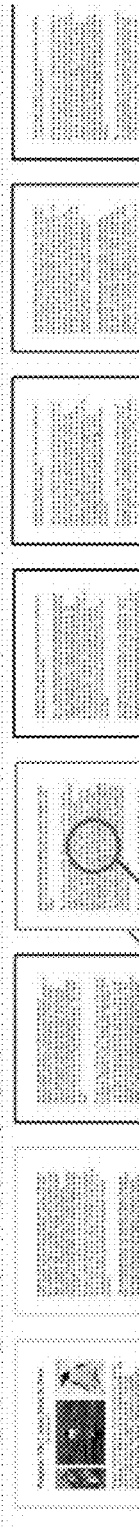

The first penguin fossil to be discovered was that of *Palaeeudyptes antarcticus*, found in rocks that were around 25 million years old, in New Zealand during the 19th century. Since then penguin fossils have been found that date back around 50 million years, which show many of the typical features associated with modern penguins. No penguin fossils have ever been found in the northern hemisphere. The largest penguin ever to have been discovered was similar in size to a man.

Despite a long evolutionary history, today's species have much in common. They mostly have blackish upperparts and whitish underparts on both the abdomen and flippers. This helps to camouflage the penguin against the lighter sky when viewed from below, and the darker waters when viewed from above, making them harder to spot by both predators and prey. The feathers are waterproof and interlocking, providing an effective barrier to water. Each feather has small muscles which allow them to be held tightly down against the body whilst swimming, to form a thin water proof layer. Little air is therefore trapped in the plumage when swimming, preventing excessive buoyancy which would hinder diving. When on land, these muscles hold the feathers erect, thereby trapping a thick layer of warm air to provide the best insulation against cold wind.

The insulation provided by the plumage is further aided by thick fat deposits beneath the skin, and a counter-current blood supply to the exposed legs and feet. The blood vessels supplying warm blood to the legs and feet are surrounded by the vessels returning cooler blood back to the body, enabling much of the heat lost from the warm blood to be recovered. This vascular system is also able to severely restrict the amount of blood flowing to the flippers and feet, which may be kept as low as 6 Celsius despite a body core temperature of 39 Celsius. This considerably reduces the amount of heat lost during cold weather, but the process can also be reversed so as to aid heat loss during hot weather.

Penguins also have a counter-current heat exchange system in the nasal passages, whereby air from inhalation and expiration are mixed in a common chamber. This allows recovery of much of the heat lost from the blood capillaries during

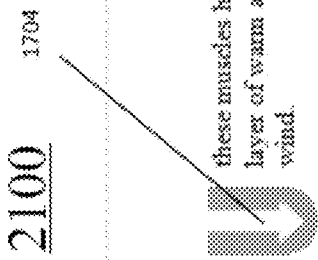

TECHNIQUES FOR ELECTRONIC AGGREGATION OF INFORMATION

CROSS-REFERENCE TO RELATED APPLICATIONS

This application is a continuation of, claims the benefit of and priority to, previously filed U.S. patent application Ser. No. 13/073,931 entitled "TECHNIQUES FOR ELECTRONIC AGGREGATION OF INFORMATION" filed on Mar. 28, 2011, which is a continuation-in-part of, and claims the benefit of and priority to, previously filed U.S. patent application Ser. No. 12/978,318 entitled "TECHNIQUES FOR ELECTRONIC AGGREGATION OF INFORMATION" filed on Dec. 23, 2010, the subject matters of which are hereby incorporated by reference in their entireties.

BACKGROUND

A montage may comprise an aggregation of separate elements to form a single composite element. For instance, a montage may comprise a composite picture made up of several separate pictures, or a video sequence comprising a rapid sequence of disparate images. Electronic montage systems have been designed to create digital montages using digital content, such as a composite web page comprising different constituent web pages served from different web applications. Sometimes the constituent web pages are organized according to a central theme, such as a web pages related to a given search term used by a search engine, or web pages consistently visited by a user as stored in a browser history. Often, the constituent web pages are lower-fidelity representations of the actual web page due to space limitations of the composite web page. As such, a user may select a constituent web page to retrieve a higher-fidelity version of the selected web page for more in-depth viewing. As an amount of digital information increases, however, it becomes increasingly difficult to build a digital montage in a way that provides meaningful information to a user. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to electronic montage systems. Some embodiments are particularly directed to an electronic montage system arranged to generate a digital montage from heterogeneous data sources. The electronic montage system may allow a user to generate a customized digital montage with customized representations for a data source, thereby allowing other users to quickly identify and select a data source of interest for closer viewing. The electronic montage system may publish the customized digital montage to other users via a publishing model, a messaging model, or a combination of a publishing model and a messaging model.

In one embodiment, for example, an apparatus may comprise a logic device arranged to execute a montage application. The logic device may comprise, for example, a processing system having a processor and memory. The montage application may comprise an authoring component operative to provide a presentation surface having multiple presentation tiles, receive control directives to associate content files with presentation tiles, generate tile objects for the content files based on content file types for the content files, and store the presentation surface and tile objects as a montage. The montage application may further comprise a presentation component operative to generate a first user interface view to present each tile object within each associated presentation tile of the presentation surface, receive a control directive to select a tile object, and generate a second user interface view to present a content file corresponding to the tile object. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an example for an authoring component.
FIG. 7A illustrates an embodiment of a user interface view of a message.
FIG. 7B illustrates an embodiment of a user interface view of a montage.
FIG. 7C illustrates an embodiment of a user interface view of a tile object.
FIG. 7D illustrates an embodiment of a user interface view of a content file.
FIG. 8 illustrates an embodiment of a logic flow for an authoring component.
FIG. 9 illustrates an embodiment of a logic flow for a publishing component.
FIG. 16 illustrates an embodiment of a user interface for a content file associated with a tile object.
FIG. 20 illustrates an embodiment of a user interface for a content file associated with a tile object.

FIG. 21 illustrates an embodiment of a user interface for a content file associated with a tile object.

FIG. 22 illustrates an embodiment of a user interface for a content file associated with a tile object.

DETAILED DESCRIPTION

Various embodiments are generally directed to electronic montage systems arranged to generate a digital montage from heterogeneous data sources. The electronic montage system may allow a user to generate a highly customized digital montage using content files generated by different software programs, such as application programs, for example. The digital montage may include one or more tile objects comprising customized representations for an underlying content file. A tile object may be constructed using information selectively extracted from a content file and formatted according to a type definition specifically built for the content file. The type definition includes detailed information about a content file, such as file extensions, data schemas, formatting controls, embedded objects, embedded code, properties, scripts, and other file specific information. The type definition also includes a set of rules concerning types of information to extract from a content file, formatting of the extracted information, a number of tile object versions to build, and so forth. In this manner, a wider range of content files may be used to author a digital montage, while constructing highly representative tile objects providing meaningful information for a viewer. This approach allows viewers to easily peruse the tile objects in a montage, identify a content file of interest among the many tile objects, and select a tile object to quickly retrieve the content file for closer viewing. As a result, the embodiments can improve affordability, scalability, modularity, extendibility, or interoperability for an operator, device or network.

Figure 1:
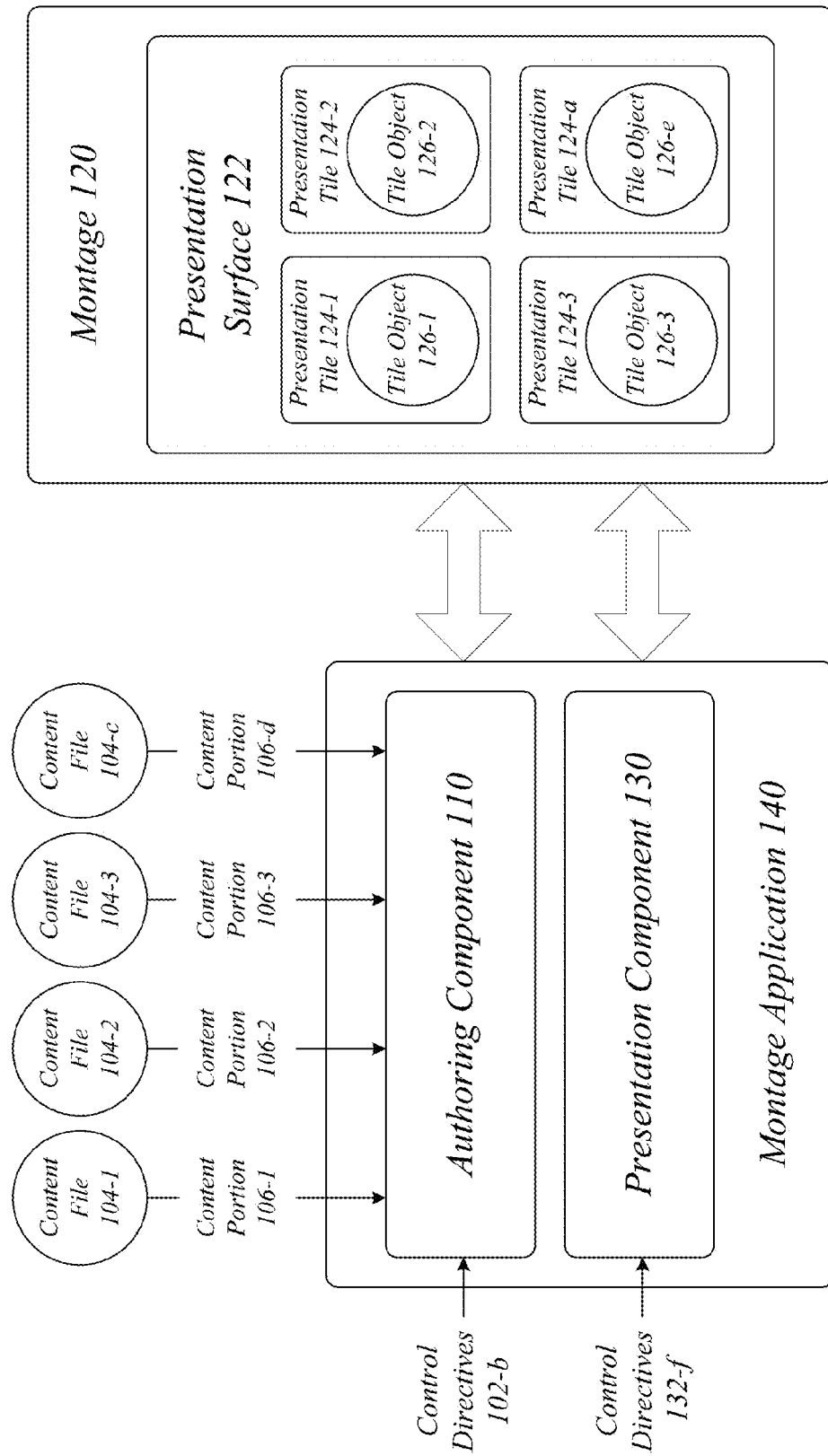
FIG. 1 illustrates an embodiment of a montage system.

FIG. 1 illustrates a block diagram of a montage system 100 having a montage application 140. In one embodiment, for example, the montage system 100 and the montage application 140 may comprise various components, such as components 110, 130, for example. As used herein the terms "system" and "application" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the montage system 100 and the montage application 140 may be implemented by an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, a multiprocessor system, a processor-based system, a gaming device, consumer electronics, programmable consumer electronics, a television, a digital television, a set top box, a wireless access point, a base station, a subscriber station, a mobile subscriber center, a radio network controller, a router, a hub, a gateway, a bridge, a switch, a machine, or combination thereof. Although the montage application 140 as shown in FIG. 1 has a limited number of elements in a certain topology, it may be appreciated that the montage application 140 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 1, the montage system may include one or more content files 104-*c* and the montage application 140. The content files 104-*c* may comprise digital content generated by a software program, such as an application program, a web application, a web service, and so forth. The montage application 140 may use one or more selected content files 104-*c* to generate a montage 120. In one embodiment, the one or more content files 104-*c* may be manually selected by a user. In one embodiment, the one or more content files 104-*c* may be automatically selected by a software program, such as by using search results related to a given search term used by a search engine, or content files 104-*c* consistently visited by a user as stored in a browser history.

The montage application 140 may comprise, among other elements, an authoring component 110 and a presentation component 130. The authoring component 110 may be used by a user to author or produce a montage 120. A user authoring or producing a montage 120 may sometimes be referred to herein as a "content producer." The presentation component 130 may be used by a user to view or navigate a montage 120. A user viewing or navigating a montage 120 may sometimes be referred to herein as a "content consumer." The montage application 140 further includes other components as described in more detail with reference to FIGS. 2-11.

The authoring component 110 may generally manage authoring operations for the montage application 140, including generating user interface views and tools to allow a content producer to generate, create or otherwise author a montage 120. A montage 120 may comprise a singular composite or aggregation of digital information elements from selected content files 104-*c* to form a single composite digital information element. A montage 120 may comprise, for example, a composite document having different constituent digital information elements generated by heterogeneous applications, such as applications files for application programs. Sometimes the constituent digital information elements are organized according to a central theme, such as those digital information elements relating to a business project, personal vacation, or a holiday. Often, the constituent digital information elements are lower-fidelity representations of the actual content files 104-*c* due to space limitations of the composite document. As such, a content consumer may select a constituent digital information element to retrieve a higher-fidelity version of the associated content file 104-*c* for more in-depth viewing.

In one embodiment, for example, the authoring component 110 may be arranged to provide a presentation surface 122 for a montage 120. The presentation surface 122 may have multiple presentation tiles 124-*a* defined or disposed on the presentation surface 122 in a certain topology. The authoring component 110 may receive control directives 102-*b* to associate certain content files 104-*c* with certain presentation tiles 124-*a*. The authoring component 110 may generate tile objects 126-*e* for the content files 104-*c* based on various content file types and type definitions associated with the content files 104-*c*. The authoring component 110 may store the presentation surface 122 and tile objects 126-*e* as part of a montage 120, which can then be published or distributed to various content consumers.

It is worthy to note that "a" and "b" and "c" and similar designators as used herein are intended to be variables representing any positive integer. Thus, for example, if an implementation sets a value for a=5, then a complete set of presentation tiles 124-*a* may include presentation tiles 124-1, 124-2, 124-3, 124-4 and 125-5. The embodiments are not limited in this context.

The authoring component 110 may begin authoring operations to generate a montage 120 by providing a presentation surface 122 having multiple presentation tiles 124-*a*. A presentation surface 122 may comprise a two-dimensional (2D) or three-dimensional (3D) topological space of any defined size having a coordinate system and boundaries. Examples for a presentation surface 122 may comprise a document for a word processing program, a slide for a presentation program, a worksheet for a spreadsheet program, a note for a note program, a contact card for a personal information manager (PIM), and other spaces typically used by application programs.

A presentation tile 124-*a* may comprise a defined region of the presentation surface 122 designated for presenting a discrete set of information, such as a tile object 126-*e*. A defined region may be of any size, dimension or shape as desired for a given implementation. A given presentation surface 122 may have any number of presentation tiles 124-*a*, and each presentation tile 124-*a* may have a set of definitions (e.g., size, shape, dimension, geometry) to ensure that all the presentation tiles 124-*a* fit within a given size for a presentation surface 122. Definitions for presentation tiles 124-*a* may dynamically change based on a presentation surface 122, set of content files 104-*c*, associations between content files 104-*c* and a presentation tile 124-*a*, tile objects 126-*e* associated with content files 104-*c*, properties for a display, properties for a device, user preferences, and other factors. The embodiments are not limited in this context.

In one embodiment, a content producer may custom define a presentation surface 122 and presentation tiles 124-*a*. A user interface for the montage application 140 may provide various controls specifically defined to modify characteristics of a presentation surface 122 and a set of presentation tiles 124-*a* on the presentation surface 122. Examples of such controls may include without limitation drawing controls, dimension controls, size controls, width controls, height controls, pixel controls, refresh controls, and so forth. Alternatively, a content producer may select from any number of montage templates providing different presentation surfaces and presentation tiles 124-*a*.

The authoring component 110 may receive control directives 102-*b* to associate certain content files 104-*c* with certain presentation tiles 124-*a*. The authoring component 110 may generate a user interface view and tools allowing a user to select a content file 104-*a*, and associate the content file 104-*a* with a presentation tile 124-*a*. For instance, a user may use an input device such as a pointing device to select a content file 104-1 and drag the content file 104-1 over a presentation tile 124-1. A user selection may generate a control directive 102-*b* as a message or signal indicating the selection to the authoring component 110. Alternatively, control directives 120-*b* may be programmatically generated in accordance with a content selection algorithm. For instance, a content selection algorithm may have a set of defined rules to automatically select content files 104-*c* from results of a search generated by a search engine, or by analysis of user browsing patterns. The embodiments are not limited in this context.

A content file 104-*c* may comprise any digital information element or digital content generated by a software program, such as an application program, a web application, a web service, a client application, a server application, a system program, and so forth. Different software programs may generate different types of digital content. As such, digital content generated by different software programs may comprise heterogeneous digital content. Examples for a content file 104-*c* may include without limitation application files, such as a word processing file, a spreadsheet file, a presentation file, a personal information manager (PIM) file, a database file, a publisher file, a drawing file, a note file, a message file, a project file, and so forth. Further examples for a content file 104-*c* may include multimedia files, such as an audio file, an image file, a video file, an audio/video (AV) file, an animation file, a game file, a markup file, a web page file, a social networking service (SNS) file, and so forth. It may be appreciated that these are merely a few examples of a content file 104-*c*, and embodiments are not limited to these examples.

In one embodiment, a content file 104-*c* may comprise a content file for a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

In one embodiment, a content file 104-*c* may comprise a content file personally authored by a same content producer of the montage application 140 to create a montage 120. For instance, assume a content producer is a project manager for a business project, and during the course of the business project, has authored various application files associated with the business project, such as a word processing file, a spreadsheet file, and a presentation file. The content producer may use the authoring component 110 of the montage application 140 to create an executive report having tile objects 126-*e* for each file personally authored by the content producer.

The authoring component 110 may generate tile objects 126-*e* for selected content files 104-*c* based on various content file types for the content files 104-*c*. Once a content file 104-*c* has been associated with a presentation tile 124-*a*, the authoring component 110 may generate a tile object 126-*e* for the selected content file 104-*c*. In one embodiment, a single content file 104-*c* may be associated with a single presentation tile 124-*a*, thereby forming a one-to-one correspondence. In one embodiment, multiple content files 104-*c* may be associated with a single presentation tile 124-*a*, thereby forming a one-to-many correspondence.

A tile object 126-*e* may comprise a representation, agent or "teaser" for a content file 104-*c*. A tile object 126-*e* is a concise set of information from an associated content file 104-*c* rendered in a way that allows a content consumer to quickly and easily determine whether an associated content file 104-*c* is of interest, and merits closer inspection of the associated content file 104-*c*.

A tile object 126-*e* may be generated using a content portion 106-*d* retrieved from a content file 104-*c*. A content portion 106-*d* may comprise a subset of information derived or extracted from a complete set of information stored by a content file 104-*c*. One advantage of a montage 120 is that information from different content files 104-*c* may be presented on a single presentation surface 122. However, each content file 104-*c* may comprise a greater amount of information than can be presented within a defined region of a single presentation tile 124-*a*. For instance, if a content file 104-1 comprises a word processing document, the authoring component 110 may be unable to fit all the information (e.g., text, figures, images, drawings, embedded objects) contained within the word processing document within an available area or space of a presentation tile 124-1, even when miniaturized as a thumbnail. As such, the authoring component 110 may retrieve a subset of information from a set of information contained within the content source 104-1, format the subset of information to fit within a set of boundaries for the presentation tile 124-1, and store the formatted subset of information as a tile object 126-1. For example, the tile object 126-1 may comprise a combination of a title for the word processing document, a content producer (e.g., author) of the word processing document, and an image from the word processing document.

A tile object 126-*e* may also include, or be associated with, a reference (e.g., an address, pointer or link) to a corresponding content file 104-*c*. When a tile object 126-*e* is selected by a user for closer inspection, the reference may be used to retrieve a corresponding content file 104-*c* to present a full-fidelity presentation of the content file 104-*c*. In one embodiment, the reference may be to the content file 104-*c* as stored in a local datastore. In this case, the reference may be used to retrieve the content file 104-*c* using peer-to-peer technology. In one embodiment, the reference may be to the content file 104-*c* stored in a remote datastore. In this case, the reference may be used to retrieve the content file 104-*c* using network storage and access technology.

In one embodiment, a single content file 104-*c* may be associated with a single presentation tile 124-*a*. In this case, a single tile object 126-*e* is presented in each presentation tile 124-*a*. In one embodiment, multiple content files 104-*c* may be associated with a single presentation tile 124-*a*. In this case, multiple tile objects 126-*e* may be presented in a single presentation tile 124-*a*. When rendered, a content consumer may use a selector tool provided by the presentation component 130 to navigate between multiple tile objects 126-*e* presented in different presentation tiles 124-*a*, and also between multiple tile objects 126-*e* presented in a single presentation tile 124-*a*, so that the content consumer can select a tile object 126-*e* of interest. For instance, assume a content producer associates pictures from corresponding content files 104-1 to 104-100 with the presentation tile 124-1. Thumbnails for the 100 pictures may be generated as tile objects 126-1 to 126-100, and sized to fit within a given dimension for the presentation tile 124-1. A selector tool may be used to navigate between the tile objects 126-1 to 126-100 to select and enlarge a given picture.

Once a user has completed authoring operations to associate different content files 104-*c* with different presentation tiles 124-*a* of a presentation surface 122, the authoring component 110 may store the presentation surface 122 and tile objects 126-*e* as part of a montage 120.

The presentation component 130 may generally manage presentation operations for the montage application 140, including generating user interface views and tools to present a montage 120 on an electronic display for an electronic device. In one embodiment, for example, the presentation component 130 may generate a first user interface view to present each tile object 126-*e* within each associated presentation tile 124-*a* on the presentation surface 122 of the montage 120. The presentation component 130 may receive control directives 132-*f* to select a tile object 126-*e*, and generate a second user interface view to present a content file 104-*c* corresponding to the selected tile object 126-*e*.

Figure 2:
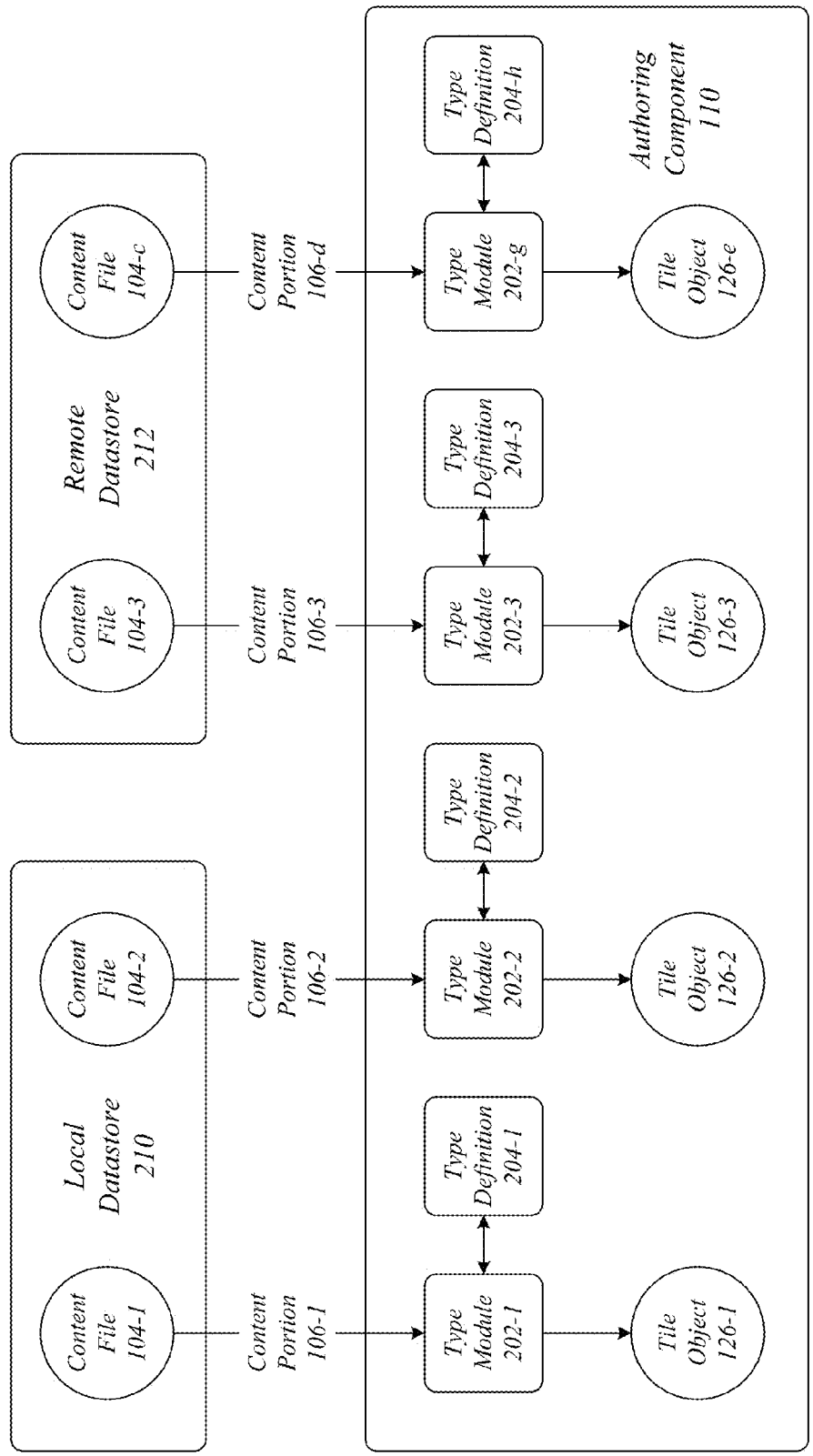
FIG. 2 illustrates an embodiment of an authoring component.

FIG. 2 illustrates a more detailed block diagram of the authoring component 110 of the montage application 140. The authoring component 110 may intelligently generate a tile object 126-*e* for an associated content file 104-*c* by retrieving certain portions of content from the content file 104-*c* based on a type definition for the content file 104-*c* type. For instance, the portion of content may comprise text from the content file 104-*c*, metadata for the content file 104-*c*, an object from the content file 104-*c*, or some combination thereof.

In one embodiment, a content file 104-*c* may be stored in a local datastore 210 implemented within a same electronic device implementing the montage application 140. For example, a computing device may implement the montage application 140 using content files 104-1, 104-2 stored on a mass storage device of the computing device. In one embodiment, a content file 104-*c* may be stored in a remote datastore 212 implemented by a different electronic device as the one implementing the montage application 140. For example, a computing device may implement the montage application 140 using a content file 104-3 stored on a mass storage device of a server device.

In the illustrated embodiment shown in FIG. 2, the authoring component 110 may comprise or implement multiple type modules 202-*g*. Each type module 202-*g* may correspond to a content file type for a respective content file 104-*c*. Examples for a content file type for a content file 104-*c* may include without limitation application file types, such as a word processing file type, a spreadsheet file type, a presentation file type, a PIM file type, a database file type, a publisher file type, a drawing file type, a note file type, a message file type, and so forth. Further examples for a content file 104-*c* may include multimedia file types, such as an audio file type, an image file type, a video file type, an AV file type, an animation file type, a game file type, a markup file type, a web page type, and so forth. It may be appreciated that these are merely a few examples of a content file types, and embodiments are not limited to these examples.

A type module 202-*g* may retrieve information from a content file 104-*c* based on a type definition 204-*h* for a content file type, and generate a tile object 126-*e* based on the retrieved information and the type definition 204-*h*. A type definition 204-*h* may comprise a set of definitions, rules, properties, methods, events, coordinates or instructions to extract selected portions from a content file 104-*c*, and format the extracted portions within a defined region of a presentation tile 124-*a*. By implementing specific types definitions 204-*h* for specific content files 104-*c*, the authoring component 110 may generate highly customized tile objects 126-*e* specifically designed for a particular context (e.g., business, personal) and associated set of content consumers. A type definition 204-*h* may be a default type definition provided with the montage application 140, or a user-defined type definition that is created using the montage application 140.

By way of example, assume a content file 104-1 is a word processing document 104-1, a type module 202-1 is for a word processing file type, and a type definition 204-1 is a set of definitions for the word processing file type. The type definition 204-1 may include various types of information used in creating a tile object 126-1. For instance, the type definition 204-1 may include supported file formats associated with different versions of a word processing application, such as extensible markup language formats (e.g., .docx, .docm, .dotx, .dotm), binary formats (e.g., .doc, .dot), and open document formats (e.g., .odt). The type definition 204-1 may include security credentials (e.g., passwords, certificates, public or private keys) to access encrypted files. The type definition 204-1 may include tools to access embedded or loaded code for a file (e.g., macros, expansion packs). The type definition 204-1 may include supported fields in a document (e.g., Ask field, Author field, Database field, Fillin field, Includepicture field, Includetext field, Mailmerge field). The type definition 204-1 may include rules to handle links for a document (e.g., linked objects, master documents, template references, linked cascading style sheet references). The type definition 204-1 may include rules to handle data sets (e.g., mail merge data). The type definition 204-1 may include rules to handle object linking and embedding (OLE) objects. Other information for the type definition 204-1 is possible, and the embodiments are not limited in this context.

Further, the type definition 204-1 may contain a set of rules pertaining to types of information to retrieve from the content file 104-1. For instance, the type definition 204-1 may include three classes of information and associated rules, including a content and properties class (e.g., paragraphs or properties) from the content file 104-1, a content objects class (e.g., image, embedded object) for the content file 104-1, and a content pages class within the content file 104-1, or some combination thereof. It may be appreciated that any number of classes or categories may be defined for a given content file type.

In one embodiment, examples for the content and properties class may be illustrated in TABLE 1 as follows:

TABLE 1

| Content/Property | Description |
| --- | --- |
| Title (property) | The title property of a document |
| Abstract | The abstract of a document |
| Filename | The filename of the document |

TABLE 1-continued

| Content/Property | Description |
| --- | --- |
| Author | The author of the document |
| Title (1$^{st}$ instance of title style) | The first paragraph with Title style applied |
| First N Body Paragraphs | The first N body paragraphs within the document |
| First N Headings | The first N paragraph headings used within the document |

In one embodiment, examples for the content objects class may be illustrated in TABLE 2 as follows:

TABLE 2

| Object | Description |
| --- | --- |
| 1$^{st}$ Image (not in table) | The first image within the document that is not in a table Image is filled and centered within the tile |
| 1$^{st}$ Image (filled and centered) | The first image within the document Image is filled and centered within the tile |
| 1$^{st}$ Table | The first table within the document Table image is clipped to fit within the tile For a table that contains LTR language clipping will start at a top left corner of table For a table that contains RTL language clipping will start at top right corner of table |
| 1$^{st}$ SmartArt ® (filled and centered) | The first SmartArt graphic within the document SmartArt image is filled and centered within the tile |
| 1$^{st}$ Chart (filled and centered) | The first chart within the document Chart image is filled and centered within the tile |
| Table of Contents (TOC) (Web Layout) | The first TOC, as it appears in web layout, within the document |
| 1$^{st}$ SmartArt (shrunk) | The first SmartArt graphic within the document SmartArt image is shrunk and then centered to fit within the tile |
| 1$^{st}$ Chart (shrunk) | The first chart graphic within the document Chart image is shrunk and then centered to fit within the tile |
| 1$^{st}$ Equation | The first equation within the document |
| TOC (Print Layout) | The first TOC, as it appears in print layout, within the document. The TOC will be clipped to fit the dimension of the tile |

In one embodiment, examples for the content pages class may be illustrated in TABLE 3 as follows:

TABLE 3

| Page | Description |
| --- | --- |
| 1$^{st}$ Page (Print Layout + shrunk) | The 1$^{st}$ page (non-cover page) in the document as represented in Print Layout The image is shrunk and then centered to fit within the tile |
| 1$^{st}$ Page (Web Layout) | The 1$^{st}$ page (non-cover page) in the document as represented in Web Layout |
| Cover Page (Print Layout + shrunk) | The 1$^{st}$ cover page in the document as represented in Print Layout The image is shrunk and then centered to fit within the tile |
| 1$^{st}$ Page (Print Layout) | The 1$^{st}$ page (non-cover page) in the document as represented in Print Layout The image is filled and centered within the tile |
| Cover Page (Print Layout) | The 1$^{st}$ cover page in the document as represented in Print Layout The image is filled and centered with the tile |
| Cover Page (Web Layout) | The 1$^{st}$ cover page in the document as represented in Web Layout |

The authoring component 110 may use the type module 202-1 and associated type definition 204-1 to retrieve a content portion 106-1 from the content file 104-1 from the local datastore 210. The type module 202-1 may then organize and format the content portion 106-1 to generate the tile object 126-1. For instance, a rule for the type definition 204-1 may state that any text retrieved from within the document, such as the first N paragraphs, will retain style formatting as specified within a document. Another rule may be that content properties that are not actual text within a document will be formatted as Normal style as defined within the document. Yet another rule may be that if the entire text of the content portion 106-1 cannot fit within the dimensions of the presentation tile 124-1 then an ellipsis " . . . " will be appended at the end of the text. These are merely some exemplary rules, and others are possible. The embodiments are not limited in this context.

In some cases, the type definition 204-1 may define a set of rules to create the tile object 126-1 from a combination of a content and properties class, a content object class, and a content page class, sometimes referred to informally as a "mashup." This provides for a highly customized tile object 126-1 constructed to represent content of the content file 104-1.

In one embodiment, examples for different class combinations may be illustrated in TABLE 4 as follows:

TABLE 4

| Class Combination | Description |
| --- | --- |
| Title + author + First N paragraphs | The title on one line, then author, then the first N body paragraphs that can fit within the tile |
| Title + author | The title on one line and then author |
| Title + First N paragraphs | The title on one line, and then the first N body paragraphs that can fit within the tile |
| Filename + author + First N paragraphs | If no title, then use the filename on one line, then author, then the first N body paragraphs that can fit within the tile |
| Filename + author | If no title, then use the filename on one line, and then author |
| Filename + First N paragraphs | If no title, then use the filename on one line, and then the first N body paragraphs that can fit within the tile |
| Title + 1$^{st}$ image (not in table) | The title on one line and then the 1$^{st}$ image, which is not in a table |
| Filename + 1$^{st}$ image (not in table) | If no title, then use the filename on one line, and then the 1$^{st}$ image, which is not in a table |

The type definition 204-1 may also provide rules limiting the tile object 126-1 to a single class or type within a class. For instance, a rule may define the type module 202-1 to only use content in the form of text from the content file 104-1, or content objects in the form of images for the content file 104-1.

The type definition 204-1 may further identify a device to generate the tile object 126-1 for the content file 104-1. For instance, a rule may define the type module 202-1 to interact with a server device to generate and retrieve the tile object 126-1.

The type definition 204-1 may still further provide rules to generate a list of multiple versions of the tile object 126-1 for presentation to a user for final selection. For instance, a rule may generate P versions of the tile object 126-1, with P representing any positive integer (e.g., P=10). A list of multiple versions of the tile object 126-1 may be generated in accordance with examples given in TABLE 5 as follows:

TABLE 5

| Tile Object Version | Class |
| --- | --- |
| Title + author + First N paragraphs | Class Combination |
| Filename + author + First N paragraphs | Class Combination |
| Title + First N paragraphs | Class Combination |
| Filename + First N paragraphs | Class Combination |
| Title + 1st image (not in table) | Class Combination |
| Filename + 1st image (not in table) | Class Combination |
| Title + author | Class Combination |
| Filename + author | Class Combination |
| 1st Page (Print Layout) | Page |
| Cover Page (Print Layout) | Page |
| 1st Page (Web Layout) | Page |
| Cover Page (Print Layout + shrunk) | Page |
| Abstract | Content/Property |
| Title (property) | Content/Property |
| First N Body Paragraphs | Content/Property |
| Filename | Content/Property |
| 1st Image (filled and centered) | Content Object |
| 1st Chart (filled and centered) | Content Object |
| 1st SmartArt (filled and centered) | Content Object |
| TOC (Web Layout) | Page |
| 1st Table | Content Object |
| 1st Image (not in table) | Content Object |
| 1st Chart (shrunk) | Content Object |
| 1st SmartArt (shrunk) | Content Object |
| 1st Equation | Content Object |
| Title (1st instance of title style) | Content/Property |
| 1st Page (Print Layout + shrunk) | Page |
| Cover Page (Web Layout) | Page |
| TOC (Print Layout) | Content Object |
| Author | Content/Property |
| First N Headings | Content/Property |

The type module 202-g may generate a tile object 126-e using additional information to that provided by a type definition 204-h. For instance, a type module 202-g may receive as input information about a presentation tile 124-a selected for a content file 104-a. A type module 202-g may receive information such as a location, size, shape, dimension, geometry, boundaries, adjacent presentation tiles 124-a, adjoining presentation tiles 124-a, and so forth. For instance, if a type module 202-1 is using type definition 204-1 to construct a tile object 126-1 that is too large for current dimensions of a presentation tile 124-1, the type module 202-1 may use information about adjacent or adjoining presentation tiles 124-2, 124-3 to determine whether the current dimensions for the presentation tile 124-1 may be increased to accommodate a larger tile object 126-1, and the current dimensions for the presentation tiles 124-2, 124-3 may be decreased accordingly. The authoring component 110 may implement various fitting algorithms to accommodate such cases.

Figure 3A:
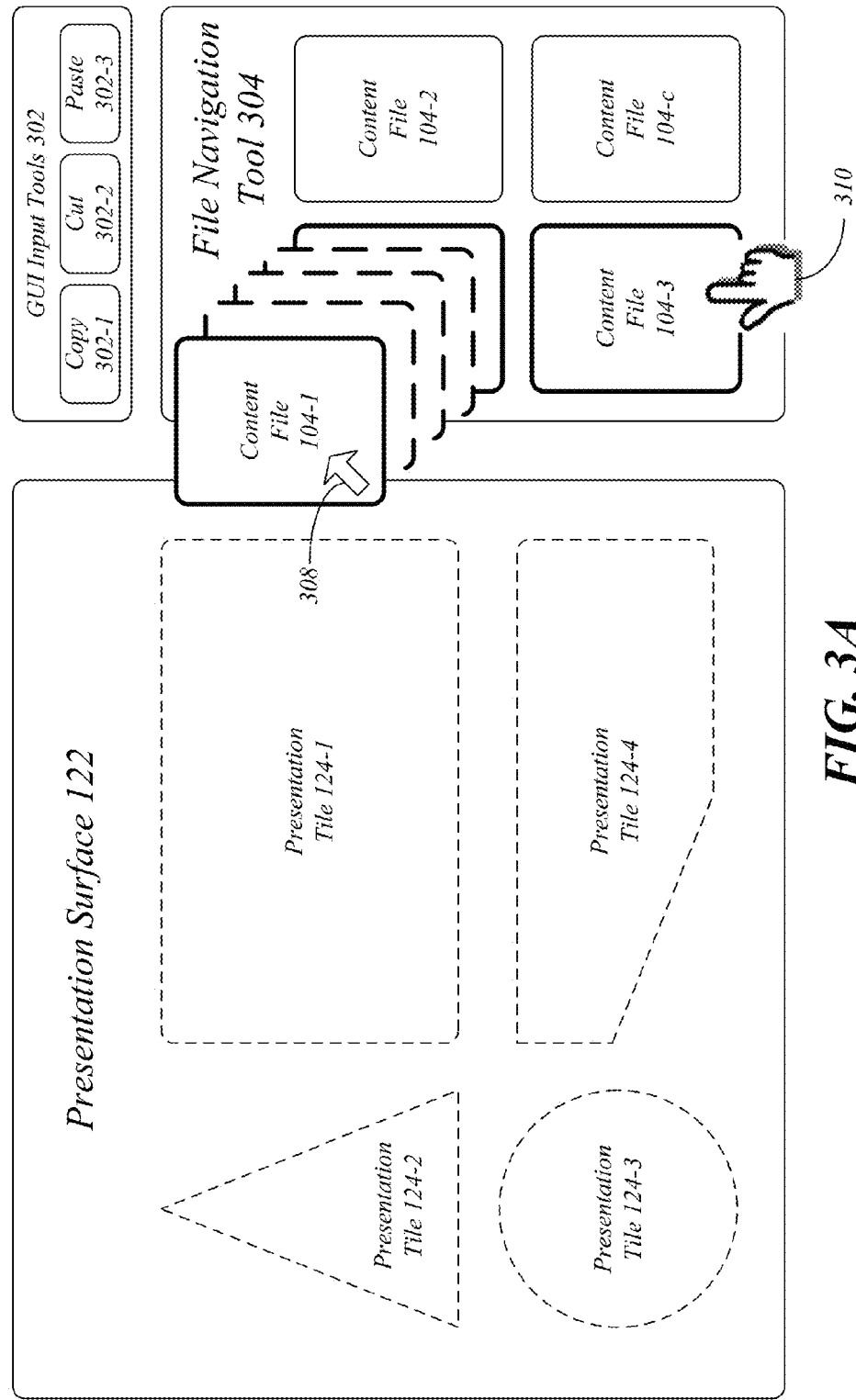
FIG. 3A illustrates an embodiment of a presentation surface.

FIG. 3A illustrates an embodiment of a user interface view 300 generated by the authoring component 110. The user interface view 300 may include a presentation surface 122 with a number of empty presentation tiles 124-a before any tile objects 126-e have been created for the content files 104-c. The user interface view 300 may also include various graphical user interface (GUI) tools 302-s for receiving control directives 102-b from an author, such as a copy command 302-1, a cut command 302-2, and a paste command 302-3. Other GUI tools 302-s may be used beyond those shown in FIG. 3A, such as a move command, a paste special command, and so forth.

The user interface view 300 may further include a file navigation tool 304. The file navigation tool 304 may comprise a file manager application for a given OS designed for navigating a file system with stored data files. For instance, the file navigation tool 304 may be used to navigate and present various content files 104-c from the local datastore 210 or the remote datastore 212. An example of a file navigation tool 304 may include MICROSOFT WINDOWS EXPLORER designed for a MICROSOFT WINDOWS operating system. Other file navigation tools may be used as well.

During authoring operations, the authoring component 110 may receive a control directive 102-b to associate the content file 104-1 with the presentation tile 124-1 from an input device, such as a pointing device 308 or a gesture 310 on a touch-screen display, for example. For instance, a content producer may create a montage 120 by utilizing the file navigation tool 304 to navigate and present content files 104-c stored by one or both datastores 210, 212. The content producer may use various input devices, such as a pointing device 308 or a gesture 310 on a touch-screen display, to select a content file 104-c for a presentation tile 124-a. As shown, the pointing device 308 may be used to select the content file 104-1 and use a drag-and-drop technique to move the content file 104-1 over the presentation tile 124-1. Alternatively, the GUI input tools 302 may be used to perform similar operations.

Figure 3B:
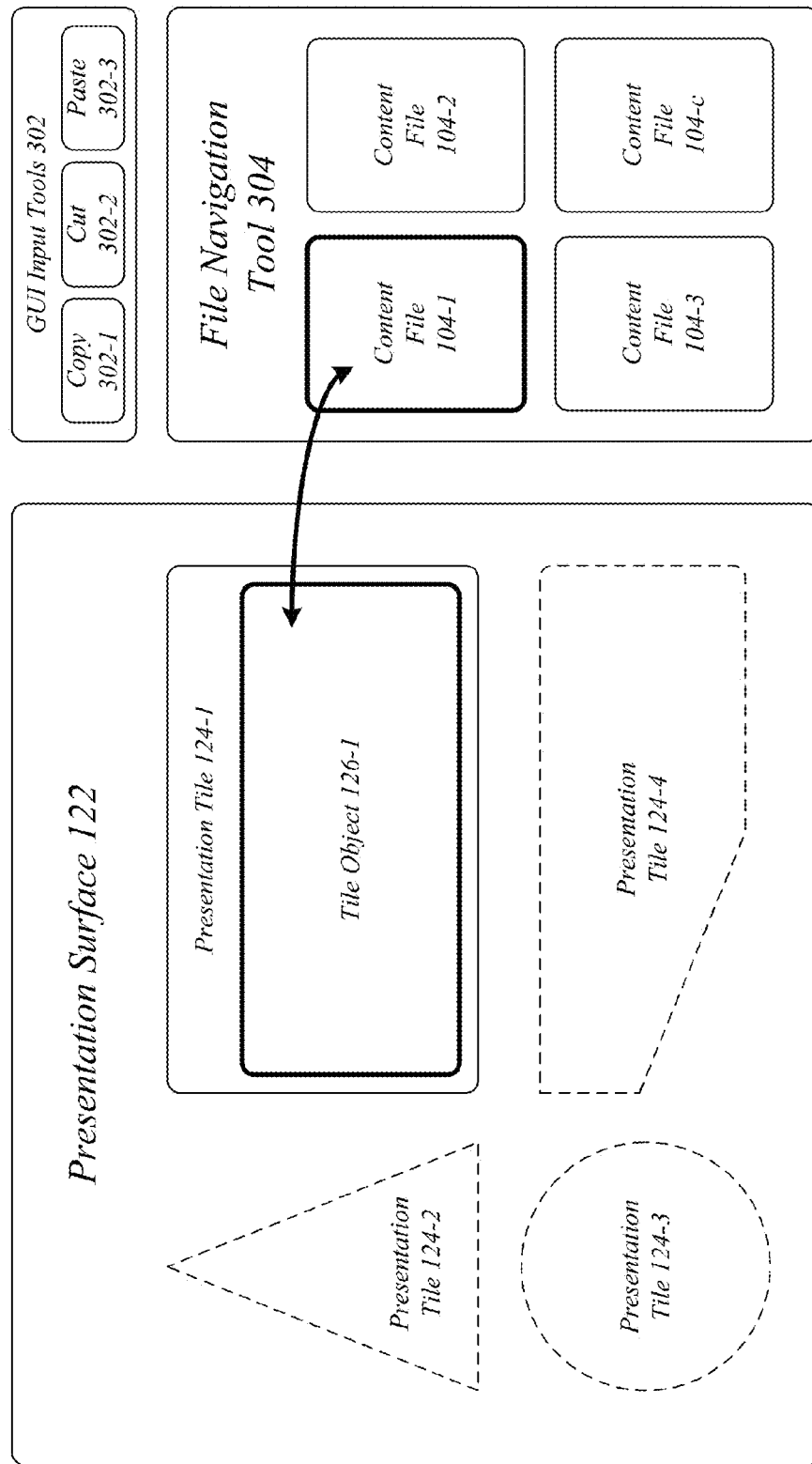
FIG. 3B illustrates an embodiment of a presentation surface with tile objects.

FIG. 3B illustrates an embodiment of a user interface view 320 generated by the authoring component 110. The user interface view 320 may include a presentation surface 122 with a filled presentation tile 124-1 after a tile object 126-1 has been created for the content file 104-1. Once the content producer selects the content file 104-1 and associates it with the presentation tile 124-1, the authoring component 110 may identify a content file type for the content file 104-1. In this example, the authoring component 110 identifies the content file type for the content file 104-1 as an application file type, and more particularly, a word processing file. The authoring component 110 may utilize the type module 202-1 and the type definition 204-1 specifically designed for generating tile objects from word processing files. The type module 202-1 may use the type definition 204-1 to retrieve the appropriate content portion 106-1 from the content file 104-1, with the content portion 106-1 comprising information of a content and properties class, a content objects class, a content pages class, or a class combination. The type module 202-1 may use the content portion 106-1 to generate the tile object 126-1, and present the tile object 126-1 within boundaries of the presentation tile 124-1.

FIG. 4 illustrates an example of the authoring component 110 generating the tile object 126-1. As shown, the content file 104-1 may comprise various types of information of the content and properties class, including a title 402, a first paragraph 404, a second paragraph 406, and various metadata 408. The content file 104-1 may further comprise various types of information of the content objects class, including an image 410, a bar chart 412, and an equation 414. The type definition 204-1 may include five rules, including a first rule to use a specific tile template labeled "Tile Template 1," a second rule to retrieve a title 402, a third rule to retrieve an author from metadata 408, a fourth rule to retrieve a first N paragraphs 404, 406 (e.g., N=2), and a fifth rule to retrieve a first graph, which in this case is the bar chart 412. The type module 201-1 may use the type definition 204-1 to retrieve the content portion 106-1 from the content file 104-1 according to rules 1-5 of the type definition 204-1, and generate the tile object 126-1, which is presented as a user interface view with the specific information of the content portion 106-1 formatted according to "Tile Template 1."

Figure 5:
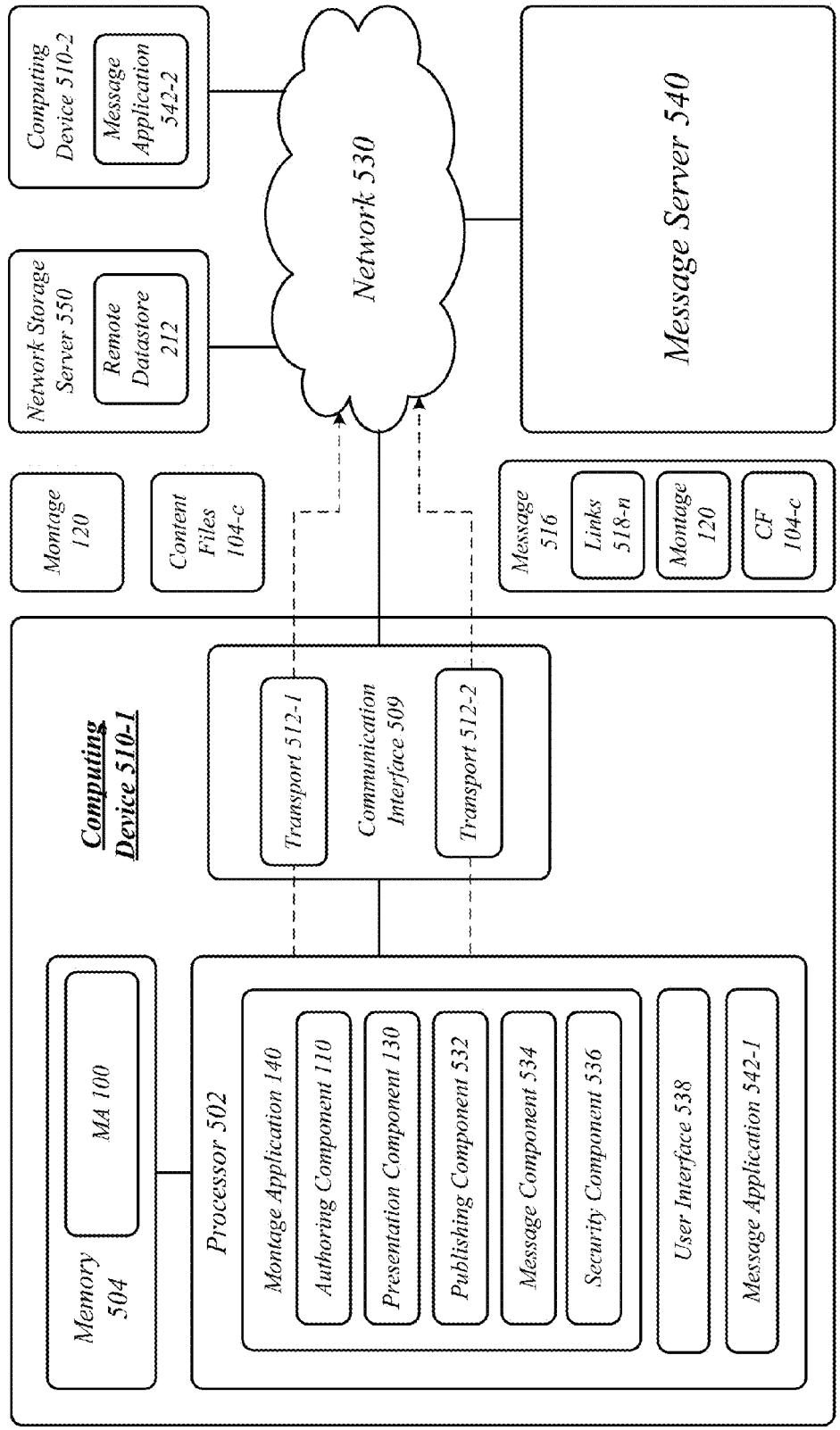
FIG. 5 illustrates an embodiment of a messaging system.

FIG. 5 illustrates an embodiment of a messaging system 500 suitable for publishing or distributing a montage 120 generated by the montage application 140. A content producer may generate a montage 120 using the montage application 140 using various user interface views provided by the user interface component 540. The user interface 538 may comprise a native user interface component for the montage application 140, or a user interface component for an OS executing the montage application 140 (e.g., Microsoft Windows). Once a montage 120 has been generated, a content producer may distribute the montage 120 to various content consumers using a publishing model, a messaging model, or a combination of a publishing model and a messaging model.

In one embodiment, the montage application 140 may use a publishing component 532 to publish a montage and associated content files 104-c from a local datastore 210 to the remote datastore 212. The remote datastore 212 may be implemented as part of a network storage server 550 accessible by a network service, such as a social networking service (SNS), for example. Content consumers may access the network service to view the network service versions.

In one embodiment, the montage application 140 may use a native message component 534 to send a montage 120 and associated content files 104-c as a message 516 and message attachments via a messaging architecture, such as a message server 540. Content consumers may access and view the message versions. Alternatively, the montage application 140 may use an external (non-native) message application 542-k.

In one embodiment, the montage application 140 may use a combination of both the publishing model and the messaging model, by publishing a montage 120 and associated content files 104-c to a network service, receive links 518-n for network versions of the montage 120 and associated content files 104-c, and send a message 516 with the links 518-n. Content consumers may access the message 516, select a link 518-n, and view the network version of the montage 120. Further, content consumers may select a tile object 126-e of the montage 120 to view the network version of the content file 104-c associated with the selected tile object 126-e.

The montage application 140 may use a security component 536 to manage permissions and access to a montage 120 and associated content files 104-c by content consumers. The security component 536 may manage accounts, authentication information, authorization information, security information (e.g., encryption/decryption algorithms, security keys, certificates, etc.), permission levels, and so forth. In one embodiment, the security component 536 may receive a control directive from an input device representing a command from a content producer to authorize communicating content files 104-c from the local datastore 210 to the remote datastore 212 for the network storage server 550 accessible by a network service.

In the illustrated embodiment shown in FIG. 5, the messaging system 500 may comprise multiple computing devices 510-j, a message server 540 and a network storage server 550 all communicating over a network 530. The computing devices 510-j may each implement the montage application 140 and/or one or more message applications 542-k. Although the messaging system 500 as shown in FIG. 5 has a limited number of elements in a certain topology, it may be appreciated that the messaging system 500 may include more or less elements in alternate topologies as desired for a given implementation.

The network 530 may comprise a communications framework designed to communicate information between the various devices of the messaging system 500. The network 530 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

The message server 540 may comprise or employ one or more server computing devices and/or server programs that operate to perform various methodologies in accordance with the described embodiments. For example, when installed and/or deployed, a server program may support one or more server roles of the server computing device for providing certain services and features. Exemplary message server 540 may include, for example, stand-alone and enterprise-class server computers operating a server OS such as a MICROSOFT OS, a UNIX® OS, a LINUX® OS, or other suitable server-based OS. Exemplary server programs may include, for example, communications server programs such as MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

The network storage server 550 may also comprise or employ one or more server computing devices and/or server programs that operate to perform various methodologies in accordance with the described embodiments. For example, when installed and/or deployed, a server program may support one or more server roles of the server computing device for providing certain services and features. Exemplary network storage server 550 may include, for example, stand-alone and enterprise-class server computers operating a server OS such as a MICROSOFT OS, a UNIX OS, a LINUX OS, or other suitable server-based OS. Exemplary server programs may include, for example, network storage server programs such as MICROSOFT LIVE providing online network storage of documents and files, including multimedia or media files such as images, photographs, photo albums, videos, video albums, and so forth. Exemplary server programs may further include, for example, network application programs such as social networking application programs, search applications, document management programs, weblogs (blogs), word processing programs, spreadsheet programs, database programs, drawing programs, document sharing programs, message applications, web services, web applications, web server, and/or other types of programs, applications, or services in accordance with the described embodiments.

The computing devices 510-j may each comprise a processor 502 and a memory 504 communicatively coupled to the processor 502. The processor 502 and the memory 504 may each be communicatively coupled to a communication interface 509. An exemplary architecture and examples for computing devices 510-j may be described with reference to FIG. 10.

The communication interface 509 may comprise or implement various communication techniques to allow the computing devices 510-j to communicate with each other and the other devices of the messaging system 500 via the network 530. For instance, the various devices of the messaging system 500 may each include a communication interface 509 that implements various types of standard communication elements designed to be interoperable with the network 530, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the communication interface 509 may comprise multiple different types of transports 512-m. Each of the transports 512-m may implement or utilize a same or different set of communication parameters to communicate information between the various devices of the messaging system 500. In one embodiment, for example, each of the transports 512-m may implement or utilize a different set of communication parameters to communicate information between the computing devices 510-j and the message server 540. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the communication interface 509 implemented by the computing devices 510-j. The embodiments are not limited in this context.

In various embodiments, the communication interface 509 of the computing device 510-1 may implement different communication parameters offering varying bandwidths or communications speeds. For instance, the transport 512-1 may comprise a high-speed interface implementing suitable communication parameters for high-speed communications of information to the network 530, while the transport 512-2 may comprise a low-speed interface implementing suitable communication parameters for lower-speed communications of information to the network 530.

With respect to wired communications, for example, the transport 512-1 may comprise a network interface designed to communicate information over a packet-switched network such as the Internet. The transport 512-1 may be arranged to provide data communications functionally in accordance with different types of wired network systems or protocols. Examples of suitable wired network systems offering data communication services may include the Internet Engineering Task Force (IETF) Transmission Control Protocol (TCP) and the Internet Protocol (IP) suite of communications standards, the User Datagram Protocol (UDP), the Datagram Congestion Control Protocol (DCCP), the Stream Control Transmission Protocol (SCTP), the Resource Reservation Protocol (RSVP), the Explicit Congestion Notification (ECN) protocol, the Open Shortest Path First (OSPF) suite of protocols, Reliable Transport Protocol (RTP), the IETF Real-Time Transport Protocol (RTP), and so forth. The transport 512-2 may be arranged to provide data communications in accordance with different message protocols, such as the Simple Mail Transfer Protocol (SMTP), extended SMTP (ESMTP), Post Office Protocol (POP), POPS, the Internet Message Access Protocol (IMAP), Multipurpose Internet Mail Extensions (MIME) protocol, Unix-to-Unix Copy (UUCP) protocol, the International Telecommunication Union (ITU) suite of protocols such as the ITU-T X.400 protocol, and so forth. It may be appreciated that other wired communications techniques may be implemented, and the embodiments are not limited in this context.

With respect to wireless communications, for example, the transport 512-1 may comprise a radio designed to communicate information over a wireless local area network (WLAN). The transport 512-1 may be arranged to provide data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The transport 512-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. It may be appreciated that other wireless techniques may be implemented, and the embodiments are not limited in this context.

In various embodiments, the communication interface 509 of the computing device 510-1 may implement a same set of communication parameters offering identical or substantially similar bandwidths or communications speeds. However, the transports 512-1, 512-2 may be utilized by the montage application 140 and/or the message application 542-1 at different points in time. In one embodiment, for instance, the montage application 140 may communicate a montage 120 and one or more content files 104-c for the montage 120 during a first time interval, and the montage application 140 and/or the message application 542-1 may communicate a message 516 with information pertaining to the montage 120 and/or supporting content files 104-c during a second time interval. In one embodiment, for example, the first and second time intervals may be completely discontinuous, where a start time and an end time for the first time interval are before a start time for the second time interval. In one embodiment, for example, the first and second time intervals may be partially overlapping, where a start time for the first time interval is before a start time for the second time interval but the end time for the first time interval is after the start time for the second time interval. The embodiments are not limited in this context.

The computing devices 510-*j* may each implement the montage application 140 with the message component 534 and/or one or more message applications 542-*k* arranged to communicate various types of messages in a variety of formats. One embodiment will be described with reference to the message applications 542-*k* for the messaging model, although such descriptions may apply to other embodiments utilizing the message component 534 of the montage application 140.

Each of the message applications 542-*k* may be representative of a particular kind of transport, enabling handling of messages of particular types and formats for the particular application. The message applications 542-*k* may comprise without limitation a facsimile application, a video message application, an instant messaging (IM) application, a chat application, an electronic mail (email) application, a short message service (SMS) application, a multimedia message service (MMS) application, a social network system (SNS) application, and so forth. It is to be understood that the embodiments are not limited in this regard and that the message applications 542-*k* may include any other type of messaging or communications application which is consistent with the described embodiments. It also is to be appreciated that the computing devices 510-*j* may each implement other types of applications in addition to message applications 542-*k* which are consistent with the described embodiments.

As shown in FIG. 5, for example, the computing devices 510-1, 510-2 implement respective message applications 542-1, 542-2. The message applications 542-1, 542-2 may generally operate to generate, send, receive, update, modify and otherwise manage messages for the computing devices 510-1, 510-2. It may be appreciated that the implementation details shown for the computing device 510-1 and its message application 542-1 as described herein also applies to the computing device 510-2 and its respective message application 542-2.

In one embodiment, the message applications 542-1, 542-2 are implemented as stand-alone client-based applications stored and executed by local resources provided by the computing devices 510-1, 510-2, such as the processor 502 and the memory 504 of the computing device 510-1, rather than network based message applications implemented on network devices and accessed by the computing devices 510-1, 510-2 via a web browser. In one embodiment, the message applications 542-1, 542-2 may comprise distributed applications suitable for distributed processing and partially executing on local resources for the computing devices 510-1, 510-2 and partially executing on network resources. Additionally or alternatively, the message applications 542-1, 542-2 may comprise network based message applications implemented on network devices and accessed by the computing devices 510-1, 510-2 via a web browser. The embodiments are not limited in this context.

In one embodiment, for example, the message application 542-1 may be arranged to communicate a message 516 over a transport 512-2. The message 516 may include one or more embedded links 518-*n* for a montage 120 and/or one or more content files 104-*c* and/or a montage 120 when communicated over the transport 512-2. The one or more embedded links 518-*n* may comprise, for example, a reference to the montage 120 and/or the one or more content files 104-*c* as stored on the network storage server 550 and accessible by a message sender or a message recipient.

Each of the links 518-*n* may comprise a reference or pointer to stored montage 120 and content files 104-*c* that a user can directly follow, or that is followed automatically by a program. References are data types that refer to a referent (e.g., stored montage 120 and content files 104-*c* such as an object, file, data item, and so forth) elsewhere in memory of a device (e.g., a file server) and are used to access the referent. Generally, a reference is a value that enables a program to directly access the referent. The referent may be stored on a same device as the reference or a different device as the reference. Most programming languages support some form of reference. Examples for the links 518-*n* may include without limitation hypertext and hyperlinks, such as those used by the World Wide Web (WWW). Hypertext is text with hyperlinks. A hyperlink typically comprises an anchor, which is a location within a message from which the hyperlink can be followed. The target of a hyperlink is the stored montage 120 and/or content file 104-*c* to which the hyperlink leads. The user can follow the link when its anchor is shown by activating it in some way, such as by touching it (e.g., with a touch screen display) or clicking on it with a pointing device (e.g., a mouse). When a link 518-*n* is activated its target is displayed, via a web browser or an application program.

As previously described, the montage application 140 may use a hybrid of both the publishing model and the messaging model, by publishing a montage 120 and associated content files 104-*c* to the remote datastore 212 of the network storage server 550, receive links 518-*n* for network versions of the montage 120 and associated content files 104-*c*, and send a message 516 with the links 518-*n*. Content consumers may access a message 516, select a link 518-*n*, and view the network version of the montage 120. Further, content consumers may select a tile object 126-*e* of the montage 120 to view the network version of the content file 104-*c* associated with the selected tile object 126-*e*. This hybrid model may be described in more detail with reference to FIG. 6.

Figure 6:
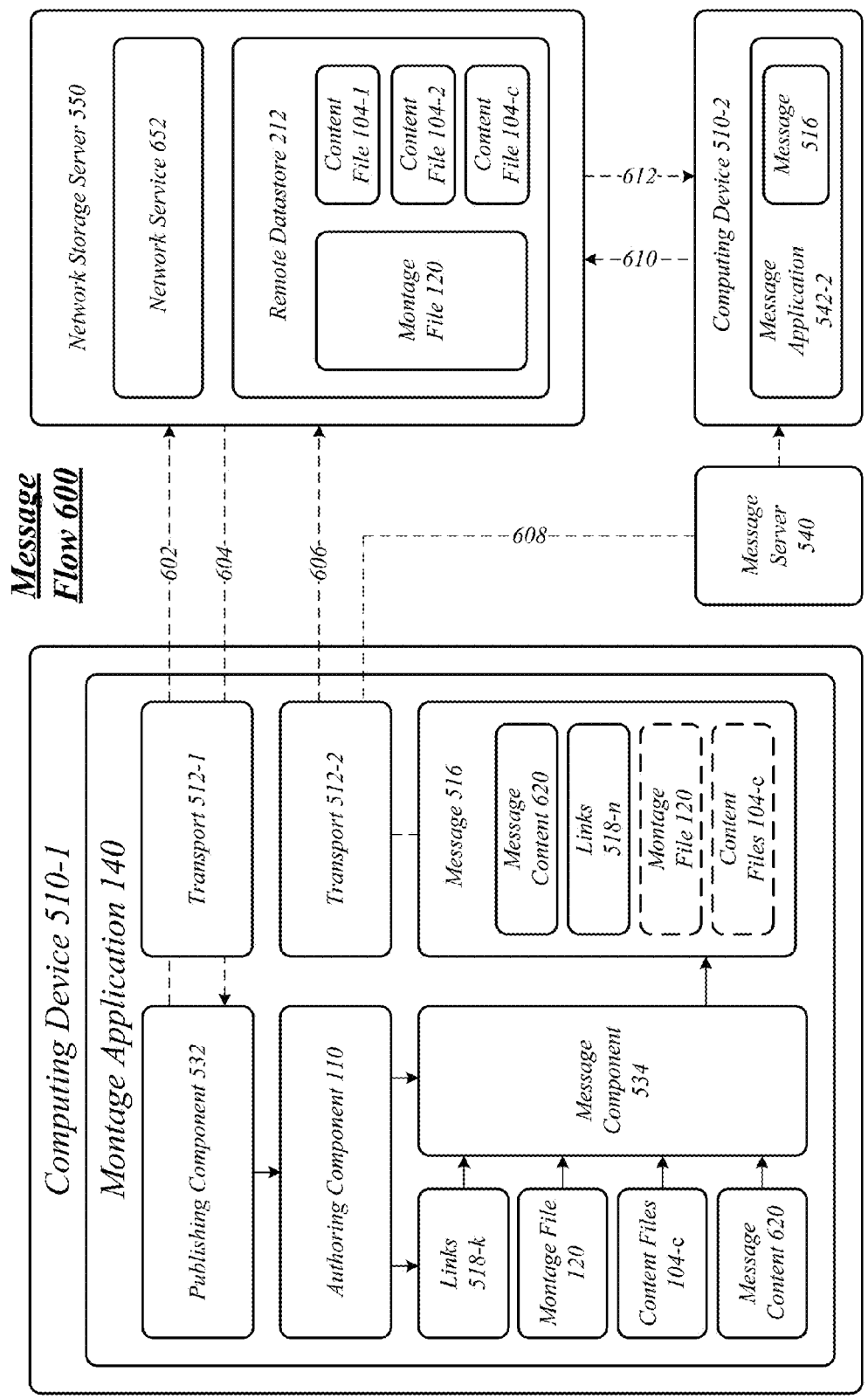
FIG. 6 illustrates an embodiment of a message flow for a messaging system.

FIG. 6 illustrates an embodiment of a message flow for the messaging system 500. As shown in FIG. 6, the publishing component 532 may publish a montage 120 and associated content files 104-*c* to a network service 652. The publishing component 532 may send the montage 120 and associated content files 104-*c* to the network storage server 550 over the transport 512-1 as indicated by arrow 602. As a high-speed transport, the transport 512-1 may have sufficient bandwidth to transport larger file size typically associated with the content files 104-*c*, relative to a message size for a message 516, for example.

The network storage server 550 may receive the montage 120 and the associate content files 104-*c*, and store them in the remote datastore 212. The network storage server 550 may then send links 518-*n* to the montage 120 and the content files 104-*c* as stored in the remote datastore 212, as indicated by arrow 604.

The publishing component 532 may receive the links 518-*n*, and forward the links to the authoring component 110. The authoring component 110 may associate a link 518-*n* with each tile object 126-*e*, and update the montage 120 with the associations so that a content consumer can select a tile object 126-*e* and access an associated content file 104-*c* from the remote datastore 212 for deeper viewing of the content file 104-*c*.

In one embodiment, consistent with the publishing model, the authoring component 110 may send the updated montage 120 to the publishing component 532. The publishing component 532 may then publish the updated montage 120 and the links 518-n on the network service 652 as indicated by arrow 606. For instance, the network service 652 may comprise a social networking service (SNS), and content consumers having a defined relationship with the content producer (e.g., friends) may access the montage 120 and associated content files 104-c via the published links 518-n. In another example, the network service 652 may provide an account to the content producer, which can be enabled for viewing by content consumers according to permissions set for the network service 652 and/or the security component 536. A content consumer may access the network service 652 via the computing device 510-2, select the link 518-n to a file for the montage 120 via a web browser, request the montage 120 from the remote datastore 212 as indicated by arrow 610. The network service 652 may receive the request, and send the montage 120 to the computing device 510-2 as indicated by arrow 612. The computing device 510-2 may present the montage 120 as a user interface view of the presentation surface 122 with the tile objects 126-e in the presentation tiles 124-a. The computing device 510-2 may generate a user interface view as a web page for a web browser, or as a user interface view of an application program, such as the montage application 140 or a montage viewer designed to view a montage 120.

In one embodiment, consistent with the messaging model, the authoring component 110 may forward the updated montage 120 and links 518-n to the message component 534 (or message application 542-1). The message component 534 may receive as inputs the links 518-n and message content 620. The message content 620 may comprise a message from the content producer. The message component 534 may generate a message 516 with the message content 620 and the links 518-n. Additionally or alternatively, the message 516 may optionally include the montage 120 and/or certain content files 104-c depending on file size restrictions and available bandwidth on the message transport 512-2. The montage 120 may comprise a full-fidelity version of the montage 120, or a lower-fidelity version of the montage 120 more suitable for available bandwidth of the transport 512-2, such as a thumbnail version of the montage 120.

The message component 534 may send the message 516 over the transport 512-2 to the message application 542-2 of the computing device 510-2 via the message server 540 as indicated by arrow 608. A content consumer may open the message 516, select the link 518-n to the montage 120, and request the montage 120 from the remote datastore 212 as indicated by arrow 610. The network service 652 may receive the request, and send the montage 120 to the computing device 510-2 as indicated by arrow 612. The computing device 510-2 may present the montage 120 as a user interface view of the presentation surface 122 with the tile objects 126-e in the presentation tiles 124-a. The computing device 510-2 may generate a user interface view as a web page for a web browser, or as a user interface view of an application program, such as the montage application 140 or a montage viewer designed to view a montage 120.

FIG. 7A illustrates an embodiment of a user interface view 700 of an exemplary message 516. As described with reference to FIG. 6, a content producer may use the montage application 140 and/or the messaging application 542-1 to generate and send a message 516 with a montage 120 or a reference to the montage 120. A content consumer may receive the message 516 via the computing device 510-2 and the messaging application 542-2. The user interface view 700 provides an example for a message 516 implemented as an email message.

The message 516 may comprise a ribbon bar 702 having various command elements for an email, such as a Reply button, a Reply to All button, a Forward button, a Delete button, a Move to Folder button, and a Create Rule button, among others. The message 516 may further comprise an address bar 704 with addressing information, and a message body 706. The message body 706 may comprise a surface having montage file thumbnail 720 and a link 518-1 to the montage 120 as stored in the remote datastore 212. The montage file thumbnail 720 may comprise a lower-fidelity version of the montage 120.

A content consumer may select the montage thumbnail 720 using an input device, such as a pointing device 710, for example. A content consumer may also select the link 518-1 titled "Student Class Trip" using an input device, such as a gesture 712 on a touch-screen display, for example. In both cases, the selection launches a web browser or an application program to view the montage 120.

FIG. 7B illustrates an embodiment of a user interface view 740 of a montage 120 once launched from the message 516. Depending on a given implementation for the computing device 510-2, the computing device 510-2 may generate the user interface view 740 as a web page for a web browser, or as a user interface view of an application program, such as the montage application 140 or a montage viewer 730 specifically designed to view a montage 120. For instance, the presentation component 130 of the montage application 140 implemented for the computing device 510-2 and/or the montage viewer 730 may receive a control directive to open the montage 120, and initiate operations to retrieve the montage 120 from the remote datastore 212. The presentation component 130 and/or the montage viewer 730 may present the user interface view 740 of the montage 120, including the presentation surface 122 with the tile objects 126-e in the appropriate presentation tiles 124-a.

When rendered as a web page, the presentation component 130 may use code specifically designed for a web page, such as Hypertext Markup Language (HTML) or similar code. However, HTML code may be limited by a given type of web browser implemented by the client device 510-2. When rendered as a user interface view for the montage viewer 730, the presentation component 130 and/or the montage viewer 730 may use code optimized for the montage viewer 730. For instance, a montage 120 may be generated using HTML code for a web page, with extensible markup language (XML) code embedded within the HTML code. The XML code may be generated with a data schema specifically designed for the montage application 140 or the montage viewer 730. As such, the montage application 140 or the montage viewer 730 may render a higher-fidelity version of the montage 120 relative to a lower-fidelity version of the montage 120 used for a web page.

FIG. 7C illustrates an embodiment of a user interface view 750 of an example of a montage 120 as presented in the montage viewer 730. As described with reference to FIG. 7B, the montage viewer 730 may present the user interface view 740 of the montage 120, including the presentation surface 122 with the tile objects 126-e in the appropriate presentation tiles 124-a. Assume that the presentation surface 122 includes the tile object 126-1 for the content file 104-1 as described with reference to FIG. 4.

A content consumer may select the tile object 126-1 using an input device, such as a pointing device 710, for example. The presentation component 130 of the montage application 140 implemented for the computing device 510-2 and/or the montage viewer 730 receives a control directive to select the tile object 126-1, and retrieves the content file 104-1 for the tile object 126-1 from the remote datastore 212.

FIG. 7D illustrates an embodiment of a user interface view 760 of a content file 104-1 once launched from the montage 120. The presentation component 130 and/or the montage viewer 730 may present the user interface view 760 with a full-fidelity version of the content file 104-1 retrieved from the remote datastore 212. Alternatively, a content file 104-1 may be rendered using a native application program similar to the one used to generate the content file 104-1, or a viewer specifically designed for such an application program. The embodiments are not limited in this context.

In various embodiments, the presentation component 130 may dynamically generate a montage 120 for viewing on displays having different properties, such as different sizes, resolution, refresh rates, backlighting, power consumption, and so forth. In such cases, the presentation component 130 may be arranged to detect display properties of a display, and modify a montage 120 for presentation on the display. For instance, the presentation component 130 may generate a much larger version of a montage 120 with a greater number of presentation tiles 124-$a$ and tile objects 126-$e$ when presented on a large wall display with touch controls as found in many conference rooms. Meanwhile, the presentation component 130 may generate a smaller version of a montage 120 with a fewer number of presentation tiles 124-$a$ and tile objects 126-$e$ when presented on a smart phone. Similarly, the presentation component 130 may generate a montage 120 with different levels of fidelity based on screen resolution or pixel size of a given display. In another example, the presentation component 130 may generate one version of a montage 120 when in portrait mode, and another version of the montage 120 when in panoramic mode, such as when a user rotates a smart phone or tablet. The embodiments are not limited in this context.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 8 illustrates one embodiment of a logic flow 800. The logic flow 800 may be representative of some or all of the operations executed by one or more embodiments described herein, such as the authoring component 110 of the montage application 140.

In the illustrated embodiment shown in FIG. 8, the logic flow 800 may provide a presentation surface having multiple presentation tiles at block 802. For example, the authoring component 110 may provide a presentation surface 122 having multiple presentation tiles 124-$a$ via the user interface 538. The presentation surface 122 may be selected from among a number of montage templates, or custom designed by a content producer.

The logic flow 800 may receive a control directive to associate a content file with a presentation tile at block 804. For example, the authoring component 110 may receive a control directive 102-$b$ to associate a content file 104-$c$ with a presentation tile 124-$a$. The control directive 102-$b$ may be from an input device representing a command by the content producer.

The logic flow 800 may identify a content file type for the content file at block 806. For example, the authoring component 110 may identify a content file type for the content file 104-$c$. Identification may be performed by inspecting a file extension of the content file 104-$c$, metadata for the content file 104-$c$, analysis of information within the content file 104-$c$, information for an application program used to produce the content file 104-$c$, and so forth.

The logic flow 800 may retrieve a portion of content from the content file based on the content file type at block 808. For example, the authoring component 110 may select a type module 202-$g$ based on the content file type, and use the selected type module 202-$g$ to retrieve appropriate content portion 106-$d$ from the content file 104-$c$ in accordance with a type definition 204-$h$ associated with the content file type discovered for the content file 104-$c$. In one embodiment, the content file 104-$c$ may be stored in the local datastore 210, and the content portion 106-$d$ retrieved over a data bus using the file navigation tool 304. In one embodiment, the content file 104-$c$ may be stored in the remote datastore 212, and the content portion 106-$d$ retrieved over a network using the file navigation tool 304.

The logic flow 800 may generate a tile object based on the content portion at block 810. For example, the authoring component 110 may use the selected type module 202-$g$ to generate a tile object 126-$e$ from the retrieved content portion 106-$d$ in accordance with associated type definition 204-$h$. The tile object 126-$e$ may be presented within a presentation tile 124-$a$. The tile object 126-$e$ is designed to present sufficient information about the underlying content file 104-$c$ to allow a content consumer to determine whether he or she would like to view a full-fidelity view of the content file 104-$c$.

The logic flow 800 may store the presentation surface and tile object as a montage at block 812. For example, the authoring component 110 may store the presentation surface 122 and any tile objects 126-$e$ as the montage 120. The montage 120 may then be distributed, published and consumed by various content consumers using the messaging system 500, for example.

FIG. 9 illustrates one embodiment of a logic flow 900. The logic flow 900 may be representative of some or all of the operations executed by one or more embodiments described herein, such as the presentation component 130 of the montage application 140.

In the illustrated embodiment shown in FIG. 9, the logic flow 900 may generate a montage comprising a presentation surface with multiple presentation tiles each having a tile object for a corresponding content file at block 902. For example, the presentation component 130 may generate a montage 120 comprising a presentation surface 122 with multiple presentation tiles 124-$a$ each having a tile object 126-$e$ for a corresponding content file 104-$c$.

The logic flow 900 may send the montage and content files to a network service at block 904. For example, the publishing component 532 of the montage application 140 may send the montage 120 and associated content files 104-$c$ to a network storage server 550 for storage by a remote datastore 212 accessible via a network service 652.

The logic flow 900 may receive references to the montage and each content file at block 906. For example, the publishing component 532 may receive links 518-$n$ to the montage 120 and each content file 104-$c$. The links 518-$n$ may comprise references or pointers to network versions of the montage 120 and each content file 104-c as stored on the remote datastore 212.

The logic flow 900 may associate a reference for a content file with a corresponding tile object at block 908. For example, the publishing component 532 may pass the received links 518-n to the authoring component 110. The authoring component 110 may associate a link 518-n for a content file 104-c with a corresponding tile object 126-e. When a content consumer selects a tile object 126-e, the presentation component 130 may retrieve a content file 104-c associated with the tile object 126-e via the associated link 518-n.

The montage system 100 and the montage application 140 may implement various types of user interfaces to create a montage 120 and also to manipulate or control content of a montage 120. FIGS. 10-26 provide some exemplary user interface views for a content consumer to manipulate or consume a montage 120 as prepared by a content producer using the montage system 100 and the montage application 140. FIGS. 27-50 provide some exemplary user interface views for a content producer to author or produce a montage 120 for consumption by a content consumer using the montage system 100 and the montage application 140. The embodiments, however, are not limited to these exemplary user interface views.

In various embodiments, the exemplary user interfaces are designed for a gesture interface, such as an electronic device with a touch-screen display, a touch-pad, or other touch-based input device. In one embodiment, a gesture interface is implemented via a touch-screen display. A touch-screen display is an electronic visual display that can detect the presence and location of a touch within the display area. The term generally refers to touching the display of the device with a finger or hand. Touch-screens can also sense other passive objects, such as a stylus. Touch-screens are common in devices such as all-in-one computers, tablet computers, navigation devices, mobile phones, video games, and smart phones, among others. A touch-screen allows a user more direct interaction with content as displayed, rather than indirect interaction via a cursor controlled by an input device, such as a mouse or touchpad.

In some embodiment, specific gestures may be described for a gesture interface with respect to user interface views. Exemplary gesture motions may be referred to as swiping motions, tapping motions, directional motions (e.g., upward, downward, sideways), and so forth. It may be appreciated that these gesture motions (or a given number of taps) are merely examples and that other gesture motions may be used for a given user interface view as desired for a given implementation. For instance, other gesture interfaces may implement "cross-slide" motions, single taps, double taps, a press and hold, a "press and tap" gesture, and so forth. The embodiments are not limited in this context.

It is worthy to note that although some embodiments may use a gesture interfaces and touch gestures, other embodiments may be implemented with traditional input devices, such as mouse, touch pads, keypads, keyboards, pointing devices, and so forth. The embodiments are not limited to just gesture interfaces.

Figure 10:
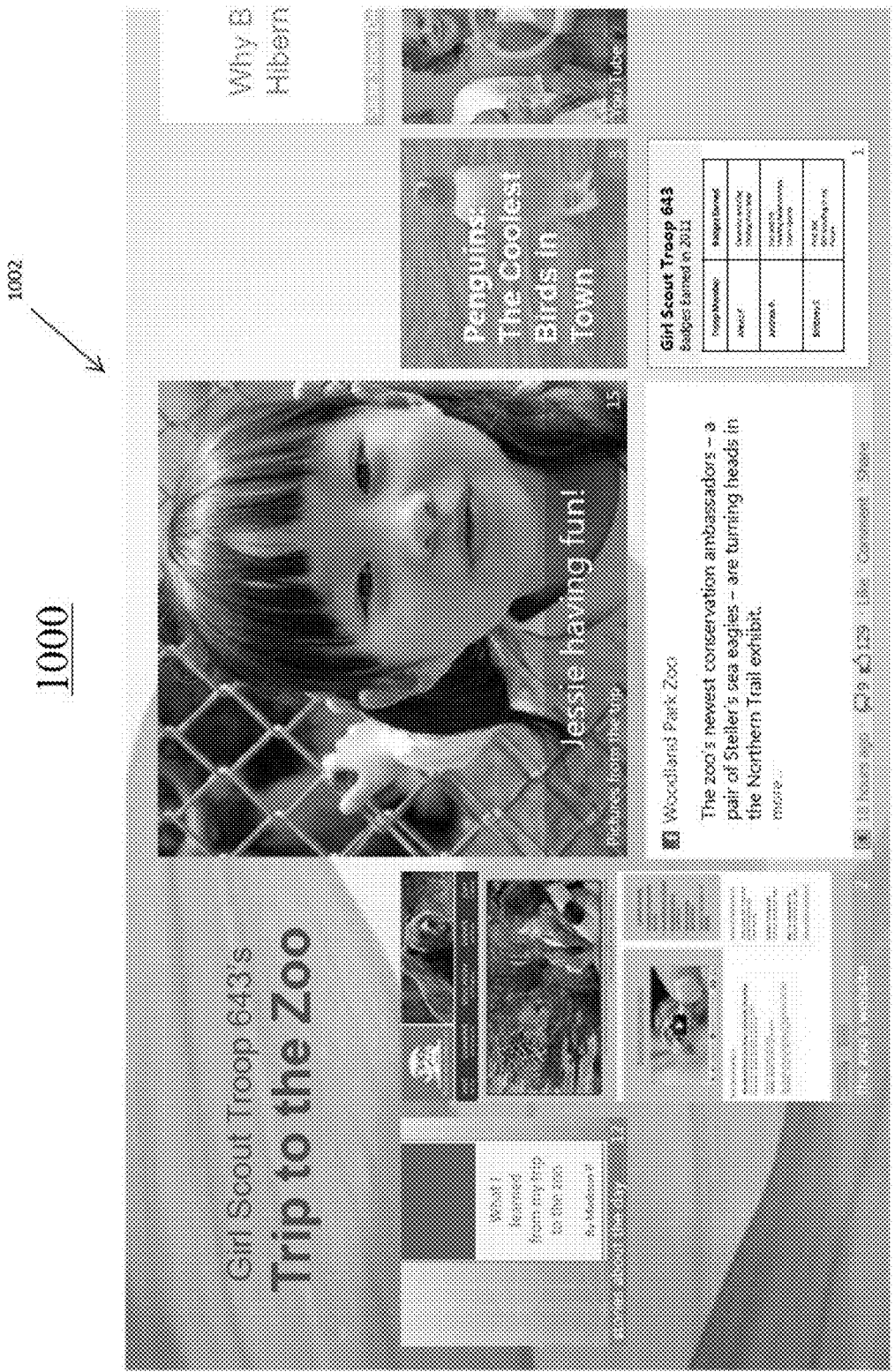
FIG. 10 illustrates an embodiment of a representative montage.

FIG. 10 illustrates a user interface view 1000 of a montage 1002. The montage 1002 may comprise a representative example of a montage 120 as described with reference to FIGS. 1-9.

The user interface view 1000 illustrates a montage 1002 for a representative example of a use scenario of the montage system 100 and the montage application 140. Suppose a content consumer has a daughter and her Girl Scout troop recently took a trip to the local zoo. The trip was a great success—the Girl Scouts had fun and learned a lot. After the trip, the troop leader put together a report in the form of the montage 1002 to share with all of the Girl Scouts and their families. The montage 1002 has photos and videos from the trip, research reports that the girls wrote before the trip and stories about the day. The troop leader utilizes the montage application 140 as a content producer to create a montage 1002 for the trip, and sends the content consumer the montage 1002 using one of the publishing techniques described with reference to FIGS. 5, 6. A content consumer may received the montage 1002, and open it up for viewing on a device with a touch-screen display by tapping or "clicking" the display.

Figure 11:
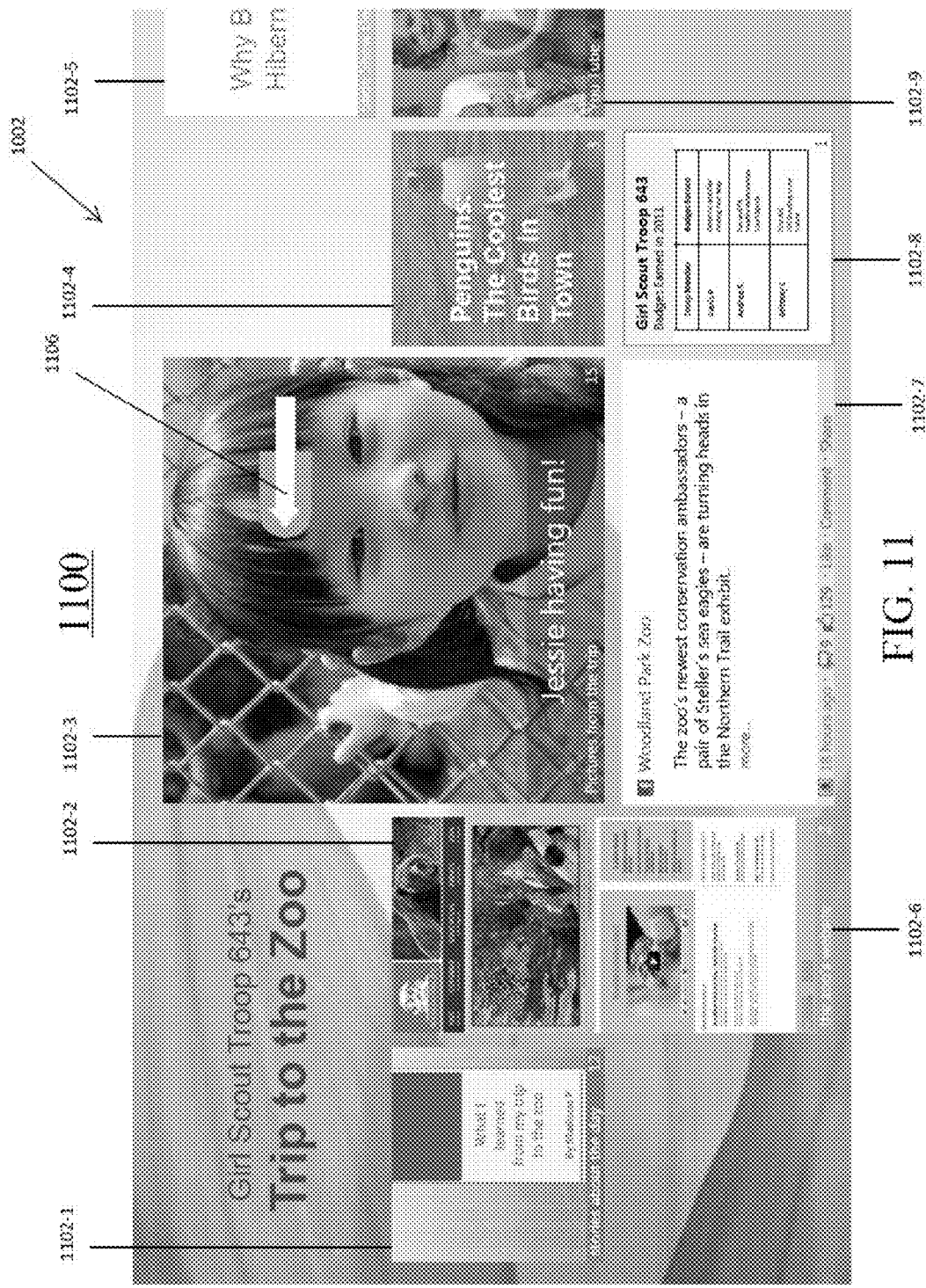
FIG. 11 illustrates an embodiment of a user interface for a montage.

FIG. 11 illustrates a user interface view 1100 of the montage 1002. As shown in the user interface view 1100, the montage 1002 comprises various tile objects 1102-x. In this example, the montage 1002 has 9 tile objects 1102-1 to 1102-9. Tile object 1102-3 may comprise multiple photographs, with a first photograph illustrating a picture of a child. Assume a content consumer chooses to manipulate the tile object 1102-3 to display additional photographs (e.g., <Click 2× for each photo—4 clicks for the gallery>). For instance, the content consumer may use one or more fingers to perform a gesture motion from left-to-right swiping motion as indicated by arrow 1106 when making contact with touch-screen display.

Figure 12:
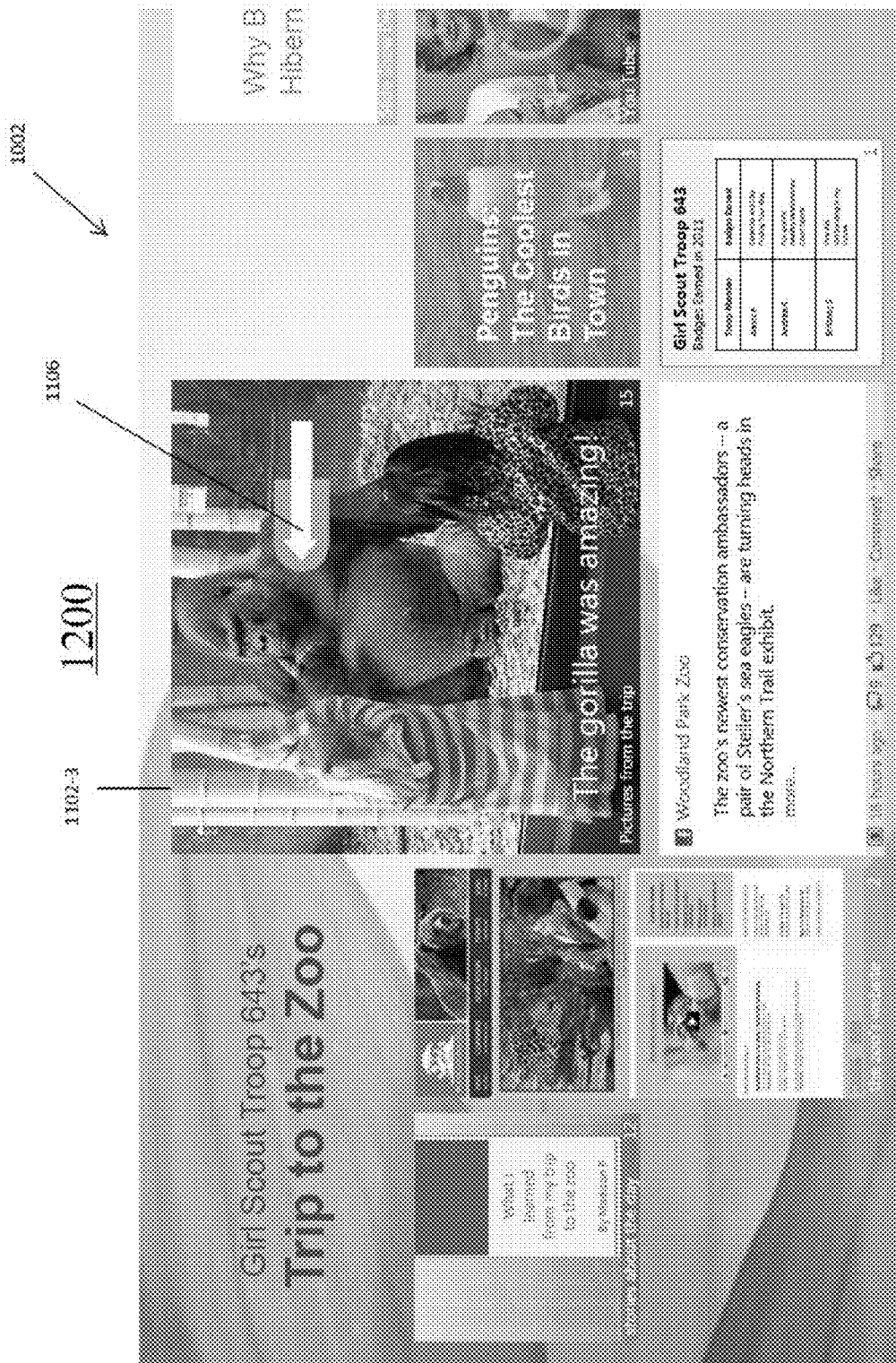
FIG. 12 illustrates an embodiment of a user interface for a montage.

FIG. 12 illustrates a user interface view 1200 of the montage 1002. As shown in the user interface view 1200, the gesture motion causes a second photograph of children with a gorilla to appear in replacement of the first photograph. Meanwhile, the other tile objects 1102-1, 1102-2 and 1102-4 to 1102-9 remain unchanged. This feature provides an advantage of allowing a content consumer to quickly manipulate and consume a larger number of tile objects and associated content files in a same screen area relative to traditional user interfaces. The user interface view 1200 further shows the content consumer making another swiping motion as indicated by the arrow 1106.

Figure 13:
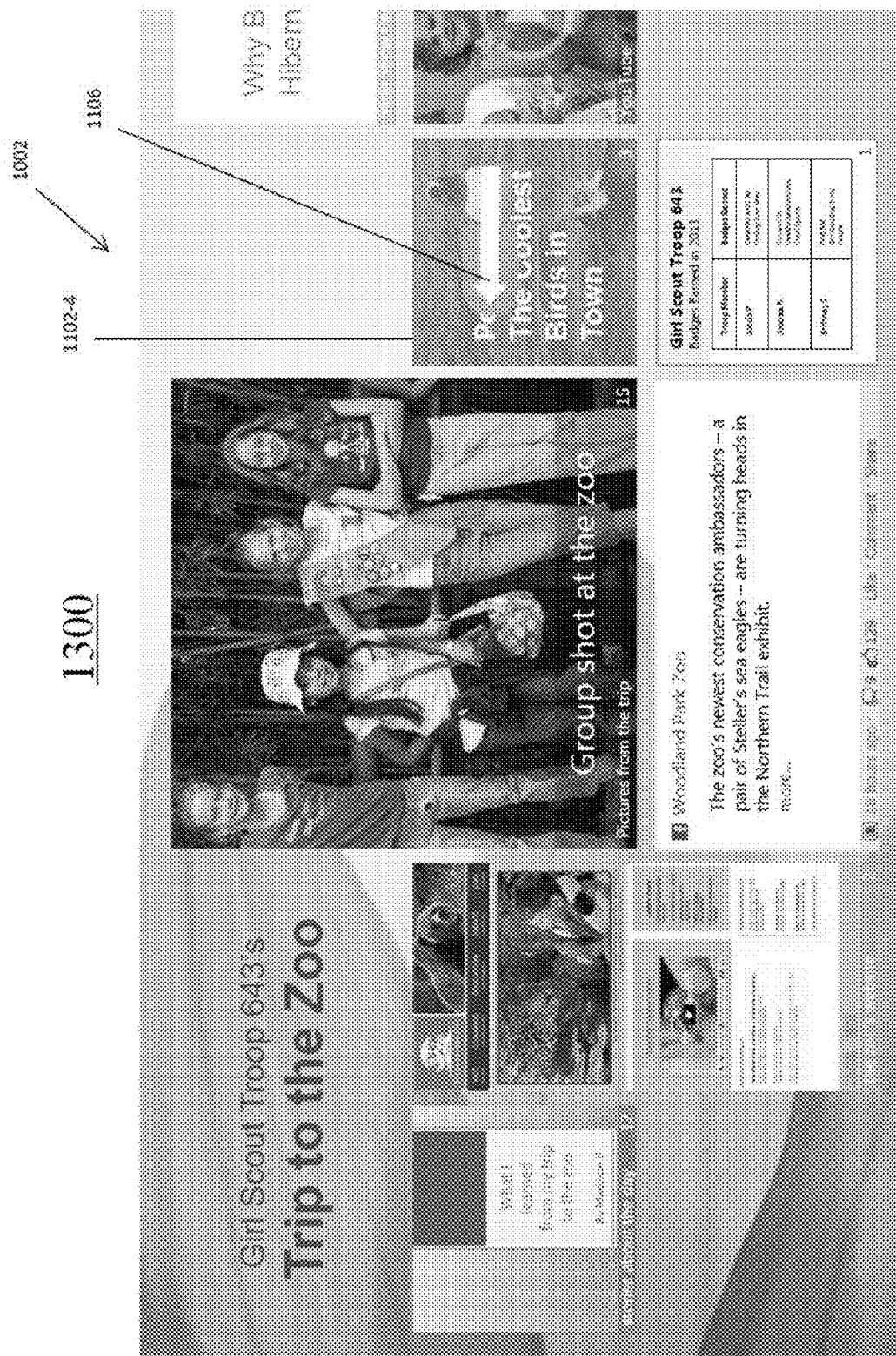
FIG. 13 illustrates an embodiment of a user interface for a montage.

FIG. 13 illustrates a user interface view 1300 of the montage 1002. As shown in the user interface view 1300, the gesture motion causes a third photograph of children standing near a fence to appear in replacement of the second photograph. Meanwhile, the other tile objects 1102-1, 1102-2 and 1102-4 to 1102-9 remain unchanged. The user interface view 1300 also shows tile object 1102-4 which comprises a collection of reports, with a first report represented with a picture of a penguin in the background. The content consumer may then use the user interface 1300 to peruse various reports in the collection (e.g., <Click 2× for each, 4 clicks for the gallery>). For instance, the user interface view 1300 further shows the content consumer selecting the tile object 1102-4 showing a first picture of a penguin, and making a left-to-right swiping motion of the tile object 1102-4 as indicated by the arrow 1106.

Figure 14:
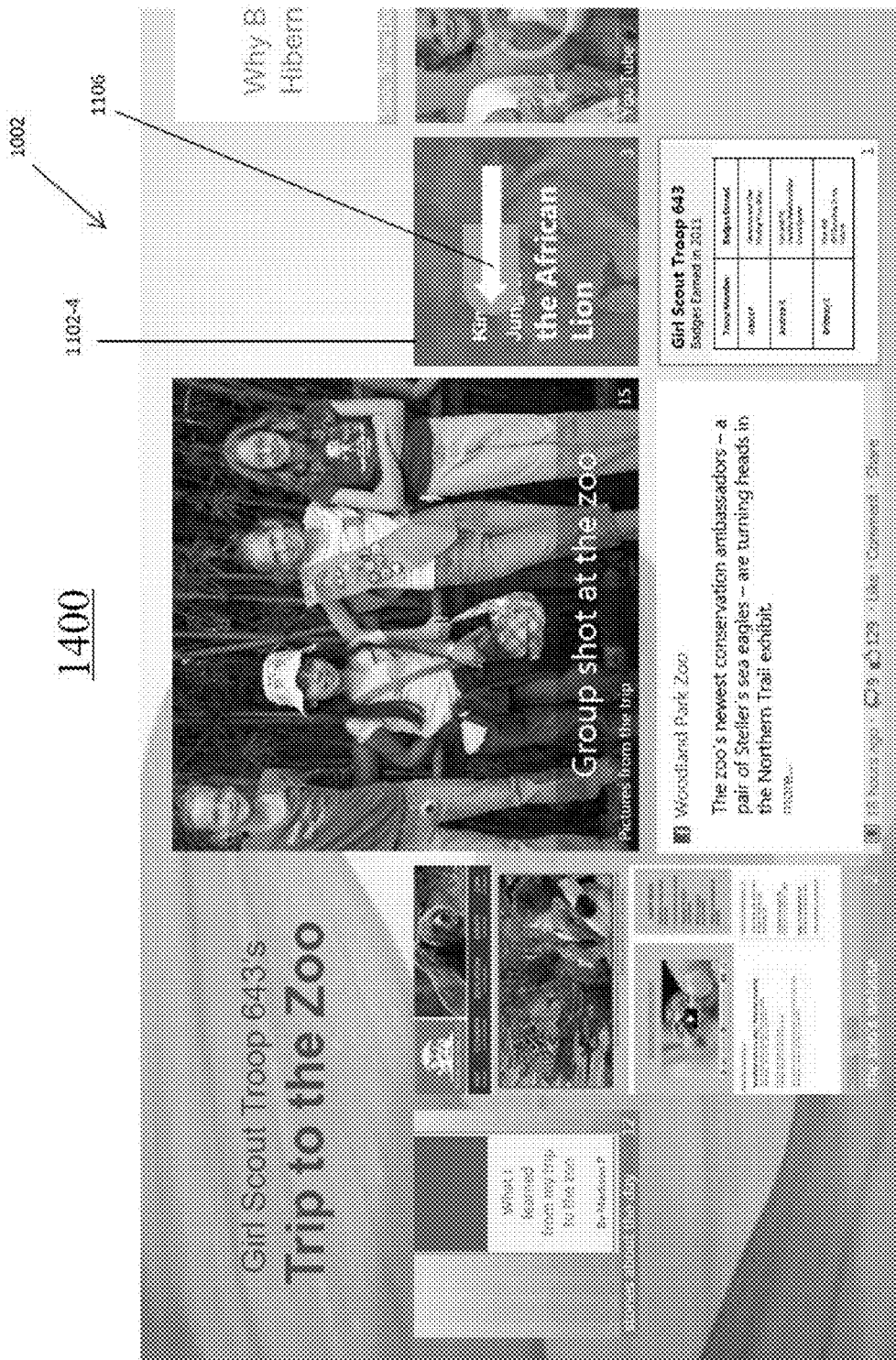
FIG. 14 illustrates an embodiment of a user interface for a montage.

FIG. 14 illustrates a user interface view 1400 of the montage 1002. As shown in the user interface view 1400, the gesture motion causes a second report having an image of a lion in the background to appear in replacement of the first report for the tile object 1102-4. Meanwhile, the other tile objects 1102-1, 1102-2, 1102-3 and 1102-5 to 1102-9 remain unchanged. The user interface view 1400 further shows the content consumer making another swiping motion as indicated by the arrow 1106.

Figure 15:
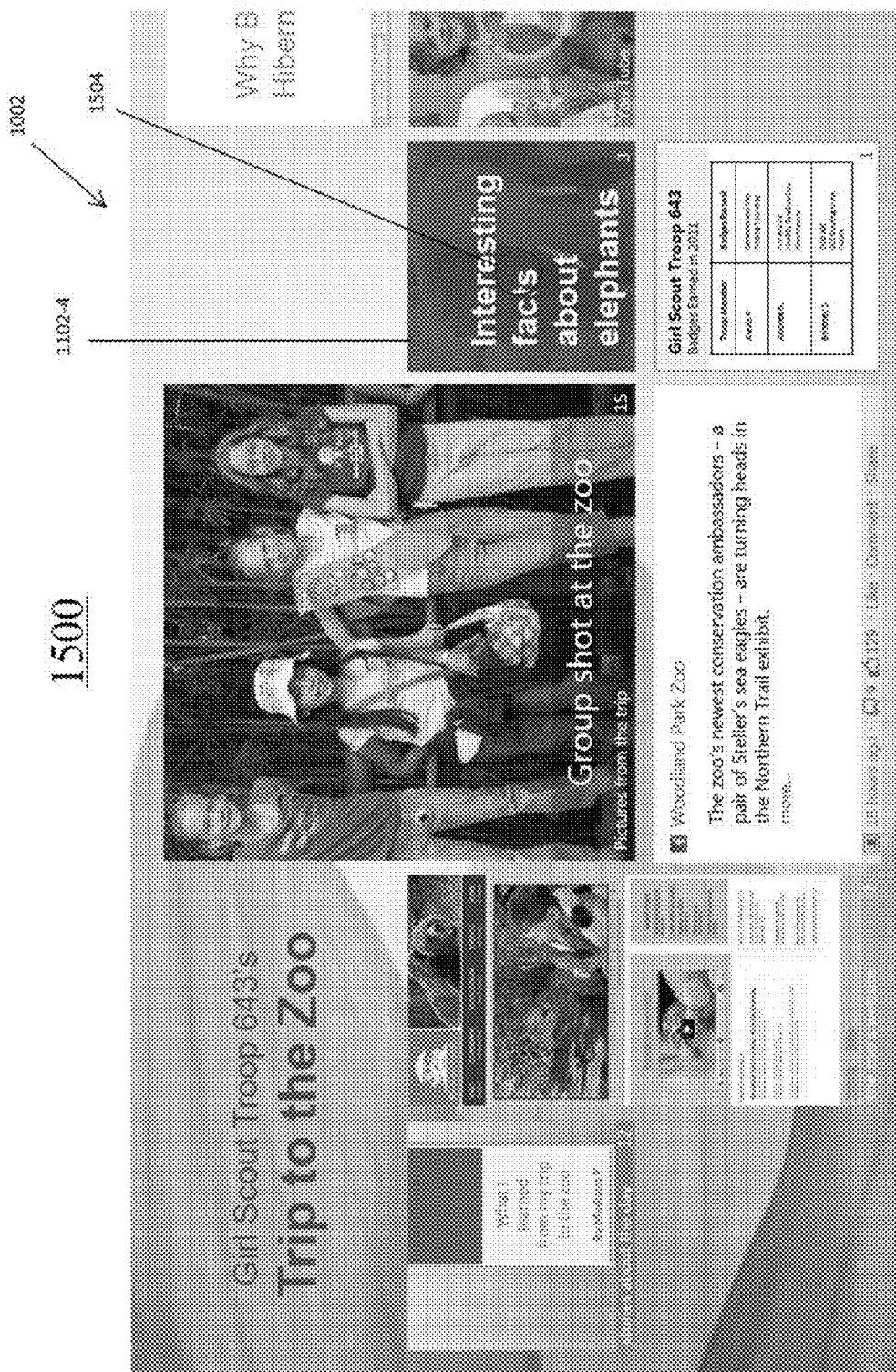
FIG. 15 illustrates an embodiment of a user interface for a montage.

FIG. 15 illustrates a user interface view 1500 of the montage 1002. As shown in the user interface view 1500, the gesture motion causes a third report having an image of an elephant to appear in replacement of the second report for the tile object 1102-4. Meanwhile, the other tile objects 1102-1, 1102-2, 1102-3 and 1102-5 to 1102-9 remain unchanged. The content consumer may see the third report, and decide to learn more. The content consumer can tap to open up the original content file (e.g., <click 2x>). For instance, the user interface view 1500 shows the content consumer making a tapping motion as indicated by the circle 1504 of the third report.

FIG. 16 illustrates a user interface view 1600 of a content file 104-c associated with the tile object 1102-4. As shown in the user interface view 1600, the tapping motion causes the third report to appear titled "Interesting facts about elephants." The content consumer may now read the report. However, since a report may be larger than available screen size, the content consumer can navigate the report using various directional gestures to view different portions of the report. For instance, after viewing the first two pages, the content consumer may make a left-to-right swiping motion as indicated by the arrow 1106 to turn the page (e.g., <Click 2x>). It is worthy to note that the report has been enlarged for presentation on the entire screen area of the display and replaces any user interface view of the montage 1002.

Figure 17:
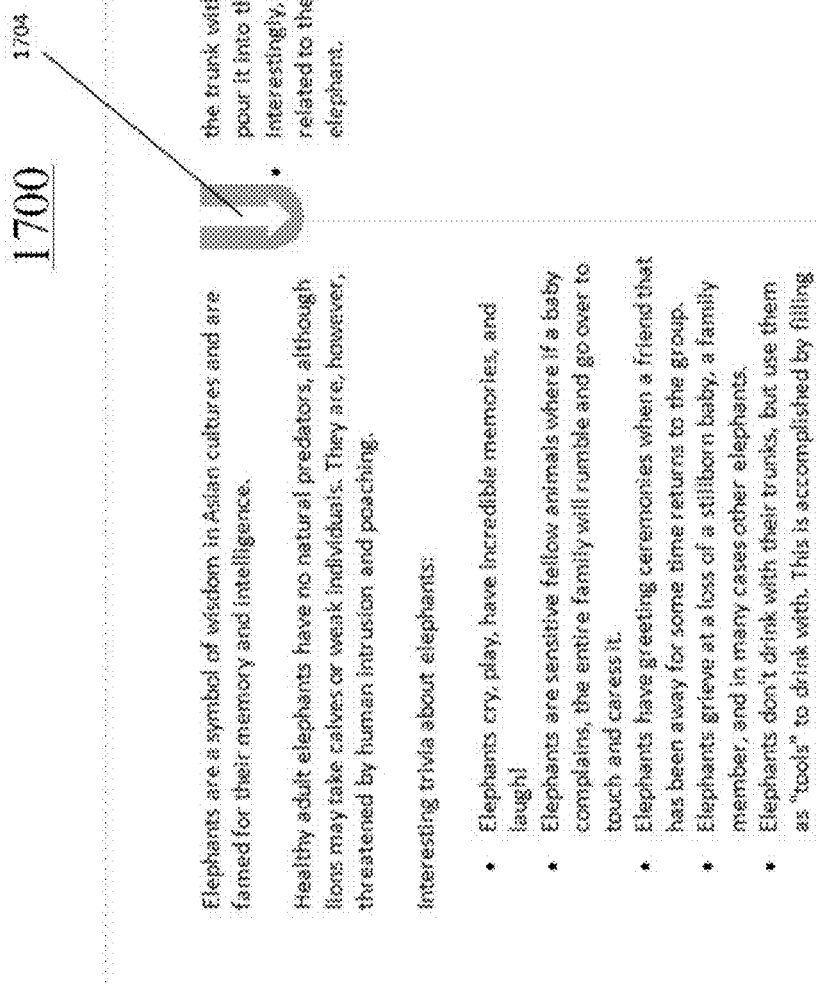
FIG. 17 illustrates an embodiment of a user interface for a content file associated with a tile object.

FIG. 17 illustrates a user interface view 1700 of a content file 104-c associated with the tile object 1102-4. As shown in the user interface view 1700, the swiping motion causes the report to move from left-to-right to display a right portion of the report that was hidden from view in the user interface view 1600. Assume the content consumer realizes that this is not the report she wanted to view, and makes a top-to-bottom swiping motion as indicated by an arrow 1704 to view controls for the report collection and see the other documents (e.g., <click 2x>).

Figure 18:
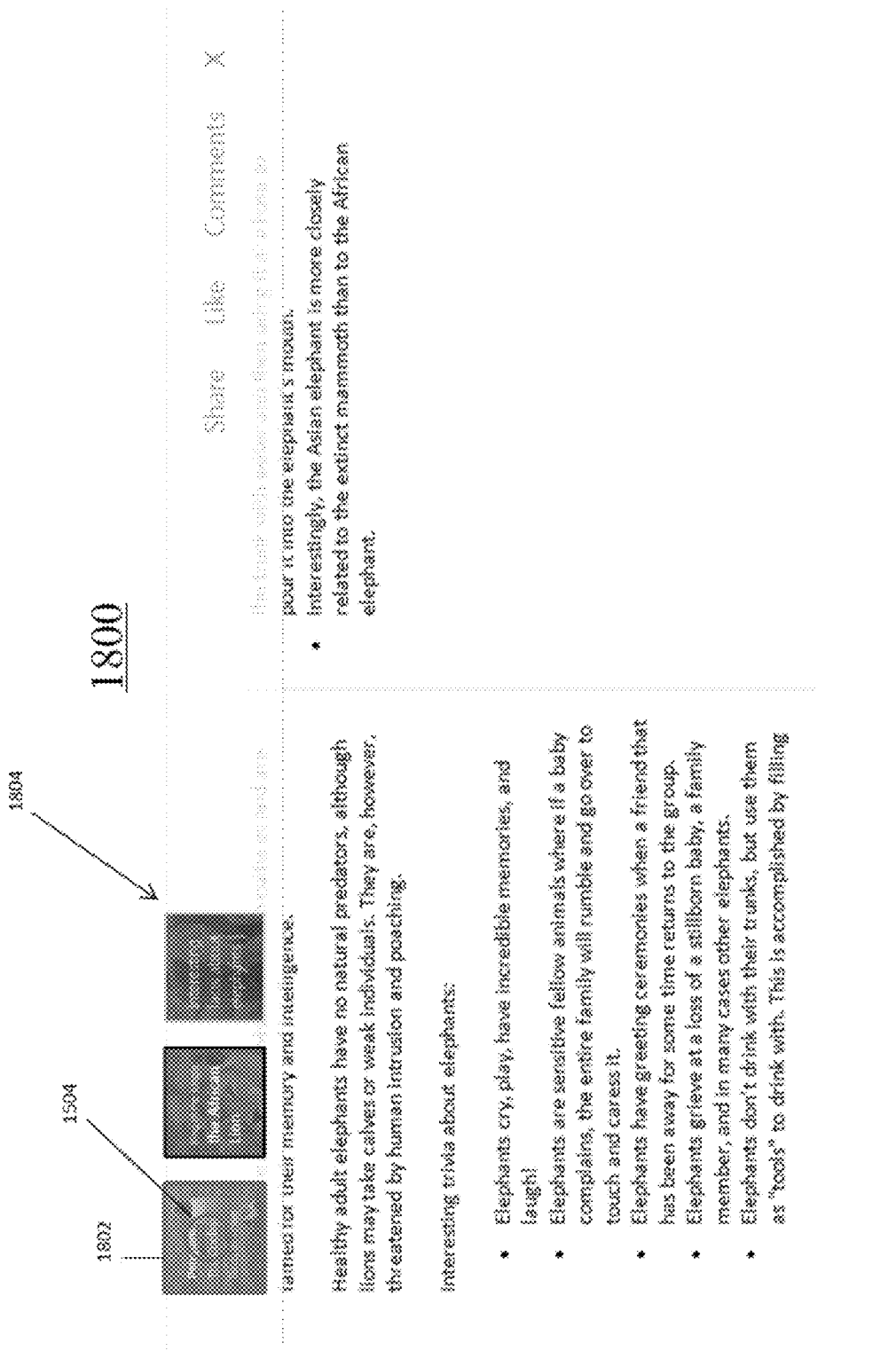
FIG. 18 illustrates an embodiment of a user interface for a content file associated with a tile object.

FIG. 18 illustrates a user interface view 1800 of a content file 104-c associated with the tile object 1102-4. As shown in the user interface view 1800, the downward swiping motion causes various controls 1804 to appear at a top of the report. The controls 1804 include thumbnails of other reports in the report gallery. The content consumer remembers that she wanted to view the report about penguins as represented by the control 1802. The content consumer selects the control 1802 by performing a tapping motion 1504 above the control 1802 (e.g., <click 2x>).

Figure 19:
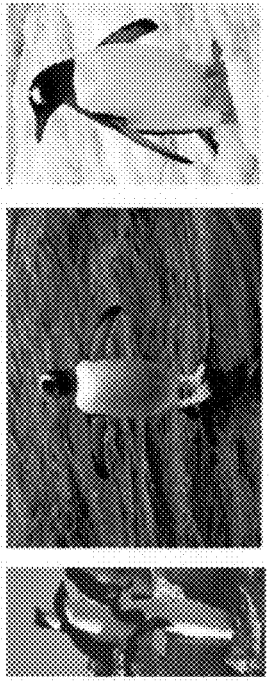
FIG. 19 illustrates an embodiment of a user interface for a content file associated with a tile object.

FIG. 19 illustrates a user interface view 1900 of a content file 104-c associated with the tile object 1102-4. As shown in the user interface view 1900, the tapping motion causes the user interface view 1900 to display a report titled "Penguins: The Coolest Birds In Town." Assume the content consumer desires to skip ahead a bit in the report, and performs a bottom-to-top swiping motion as indicated by an arrow 1904.

FIG. 20 illustrates a user interface view 2000 of a content file 104-c associated with the tile object 1102-4. As shown in the user interface view 2000, the upward swiping motion brings up a page view 2002, with thumbnails for various pages in the report. The content consumer decides to read the fourth page as represented by the control 2004, and performs a tapping motion as indicated by the circle 1504 on the control 2004 to move to that page (e.g., <click 2x>).

FIG. 21 illustrates a user interface view 2100 of a content file 104-c associated with the tile object 1102-4. As shown in the user interface view 2100, the tapping motion brings up the fourth page. Once the content consumer is finished reviewing the fourth page, the content consumer performs a downward swiping motion again from the top to bring up the controls 1804.

Figure 22:
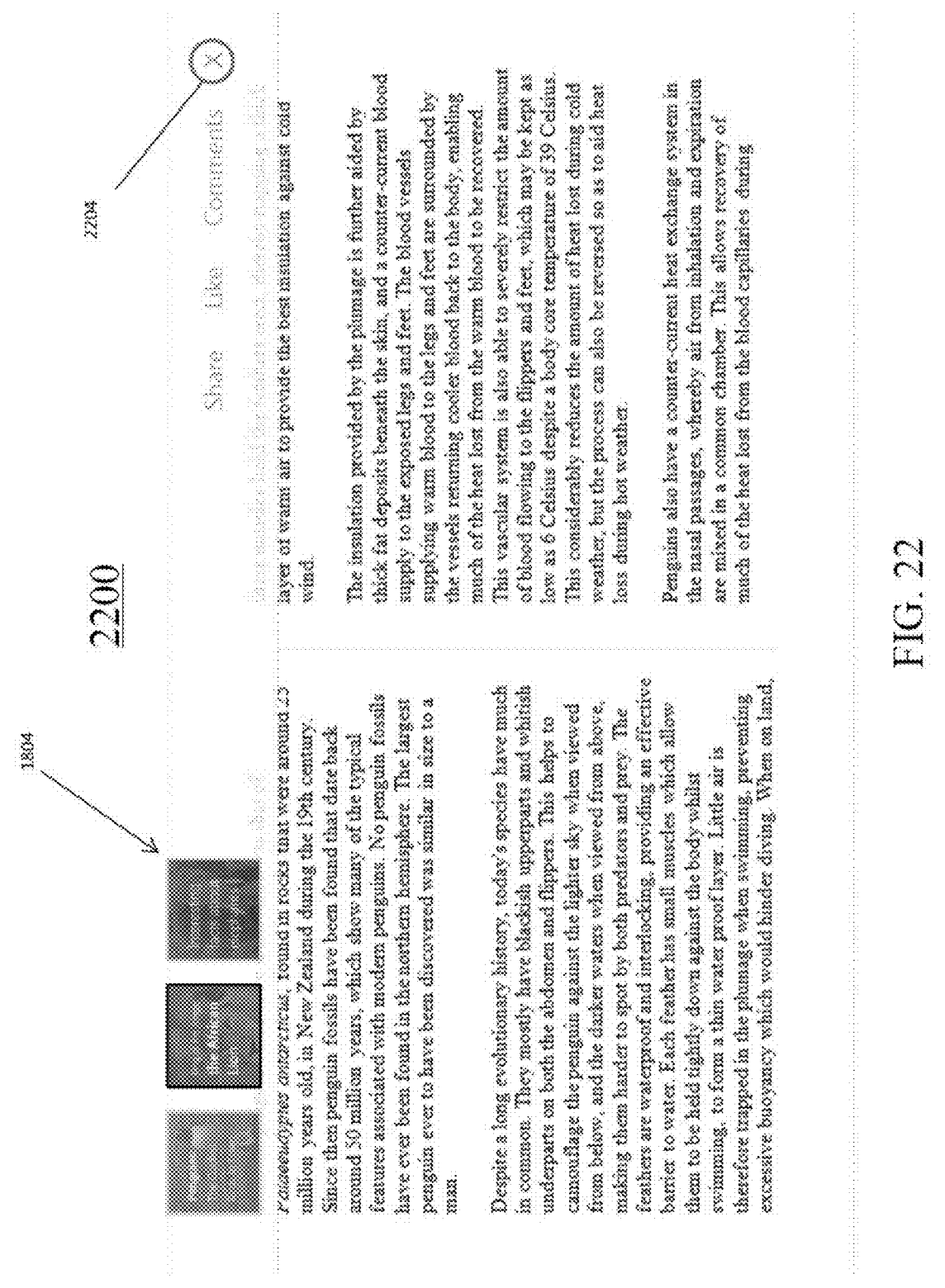

FIG. 22 illustrates a user interface view 2200 of a content file 104-c associated with the tile object 1102-4. As shown in the user interface view 2200, the downward swiping motion brings up the controls 1804. The controls 1804 include various controls labeled as "Share," "Like," "Comments," as well as an icon 2204 with a capital letter "X." The icon 2204 may be used to close a document. The content consumer closes the report to go back to the original surface view by tapping the icon 2204 (E.g., <Click 4x>).

Figure 23:
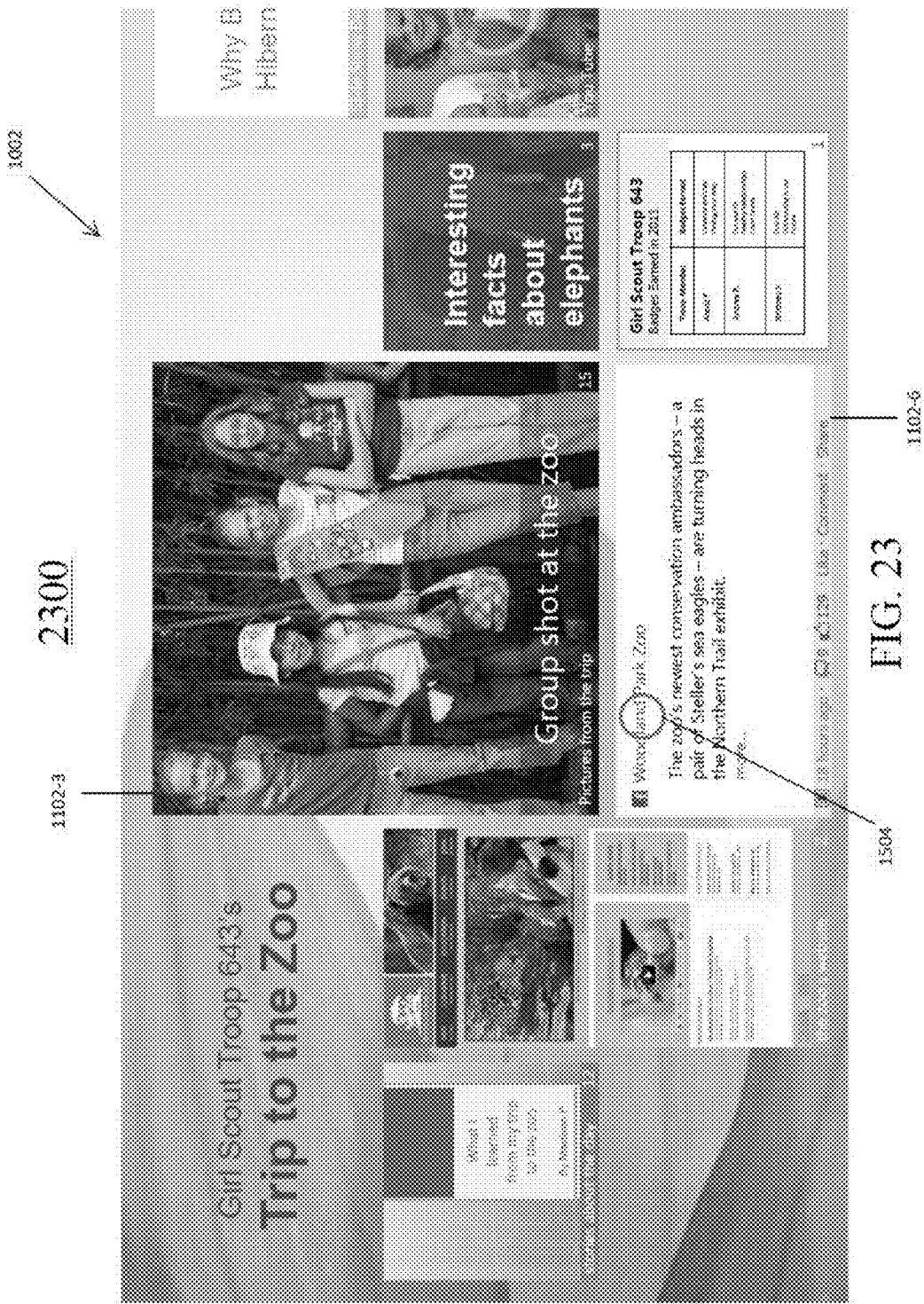
FIG. 23 illustrates an embodiment of a user interface for a montage.

FIG. 23 illustrates a user interface view 2300 of the montage 1002. The user interface view 2300 is the same or similar to the user interface view 1300, which is the latest configuration or state prior to viewing the gallery of reports of the tile object 1102-4. For instance, the tile object 1102-3 still displays the third photograph of children by a fence. In this manner, the content consumer can navigate backwards and forwards through the various tile objects 1102-x without losing track of where they are in the montage 1002. For instance, the content consumer can navigate through the gallery of reports associated with the tile object 1102-4, and return back from such navigation to find the other tile objects 1102-1, 1102-2, 1102-3 and 1102-5 to 1102-9 in a same state as prior to navigating the gallery of reports associated with the tile object 1102-4. In addition, the user interface view 2300 illustrates a case where the content consumer notices a social networking service (SNS) page about the "Woodland Park Zoo" shown as tile object 1102-6. The content consumer performs a tapping motion on the tile object 1102-6 as indicated by the circle 1504 to go to the SNS page (e.g., <click 2x>).

Figure 24:
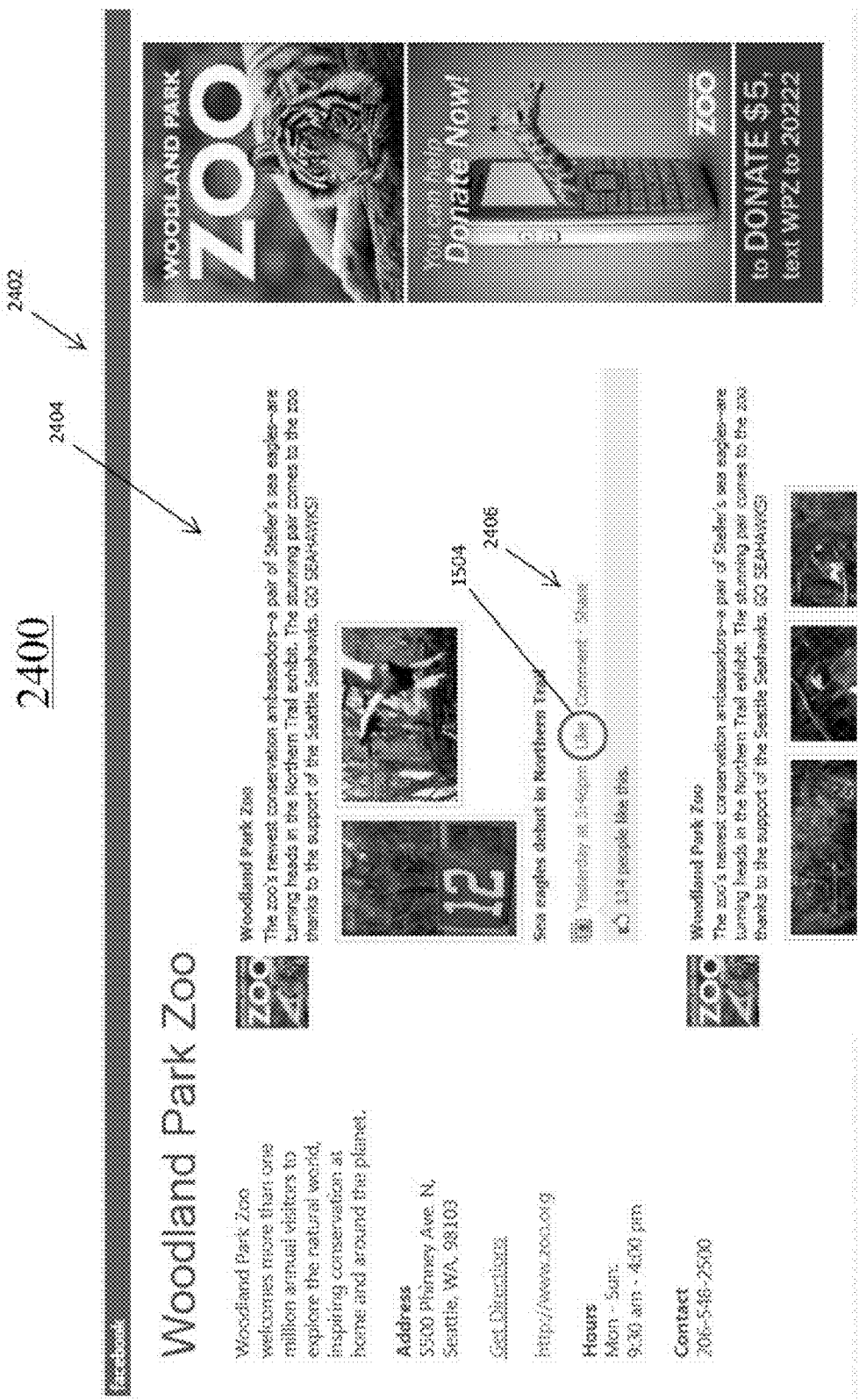
FIG. 24 illustrates an embodiment of a user interface for a content file associated with a tile object.

FIG. 24 illustrates a user interface view 2400 of a content file 104-c associated with the tile object 1102-6. As shown in the user interface view 2400, the tapping motion brings up a content file 104-c in the form of a SNS page 2402. On the SNS page 2402 is an SNS story 2404 about the "Woodland Park Zoo" and various SNS controls 2406 associated with the SNS story 2404. The content consumer reads the SNS story 2404, and selects a SNS control 2406 by performing a tapping motion as indicated by the circle 1504 to indicate the content consumer "Likes" the SNS story 2404 (e.g., <click 2x>).

Figure 25:
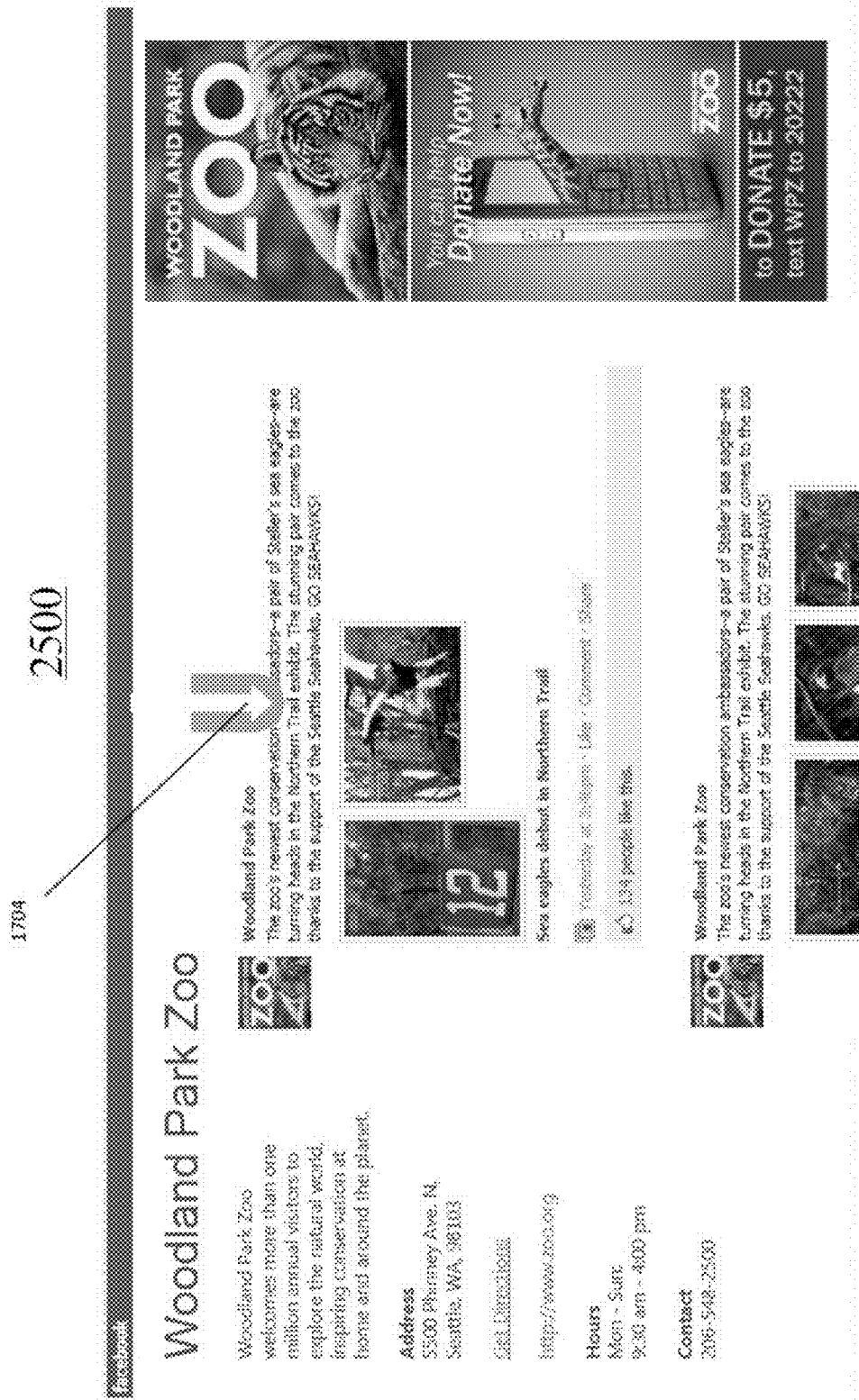
FIG. 25 illustrates an embodiment of a user interface for a content file associated with a tile object.

FIG. 25 illustrates a user interface view 2500 of a content file 104-c associated with the tile object 1102-6. As shown in the user interface view 2500, the content consumer performs a downward swiping motion as indicated by the arrow 1704 in order to bring up a set of controls associated with the SNS page 2402.

Figure 26:
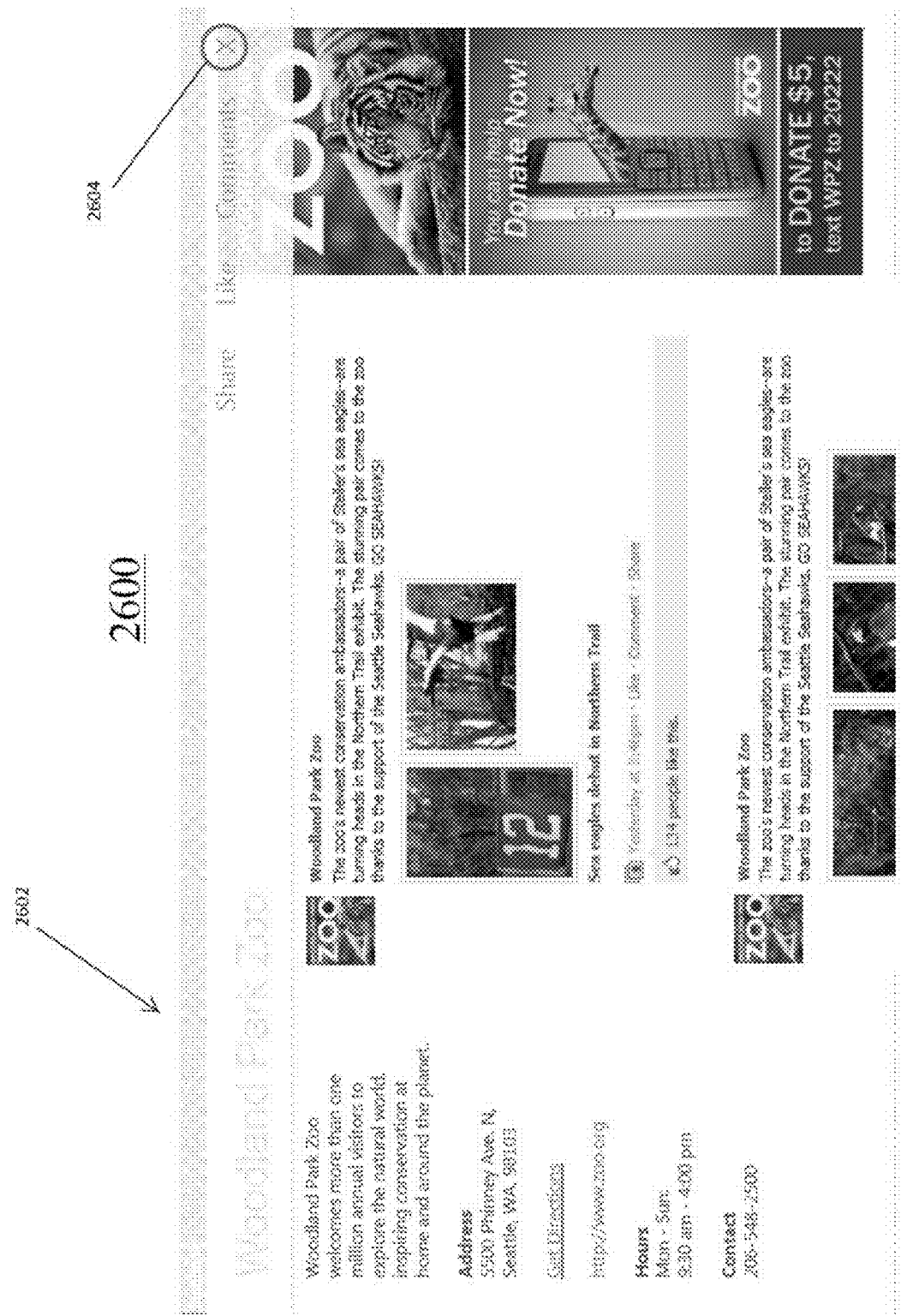
FIG. 26 illustrates an embodiment of a user interface for a content file associated with a tile object.

FIG. 26 illustrates a user interface view 2600 of a content file 104-c associated with the tile object 1102-6. As shown in the user interface view 2600, the downward swiping motion surfaces a set of controls 2602 for the SNS page 2402. The content consumer then selects the icon 2604 with a tapping motion to close the SNS page 2402.

Figure 27:
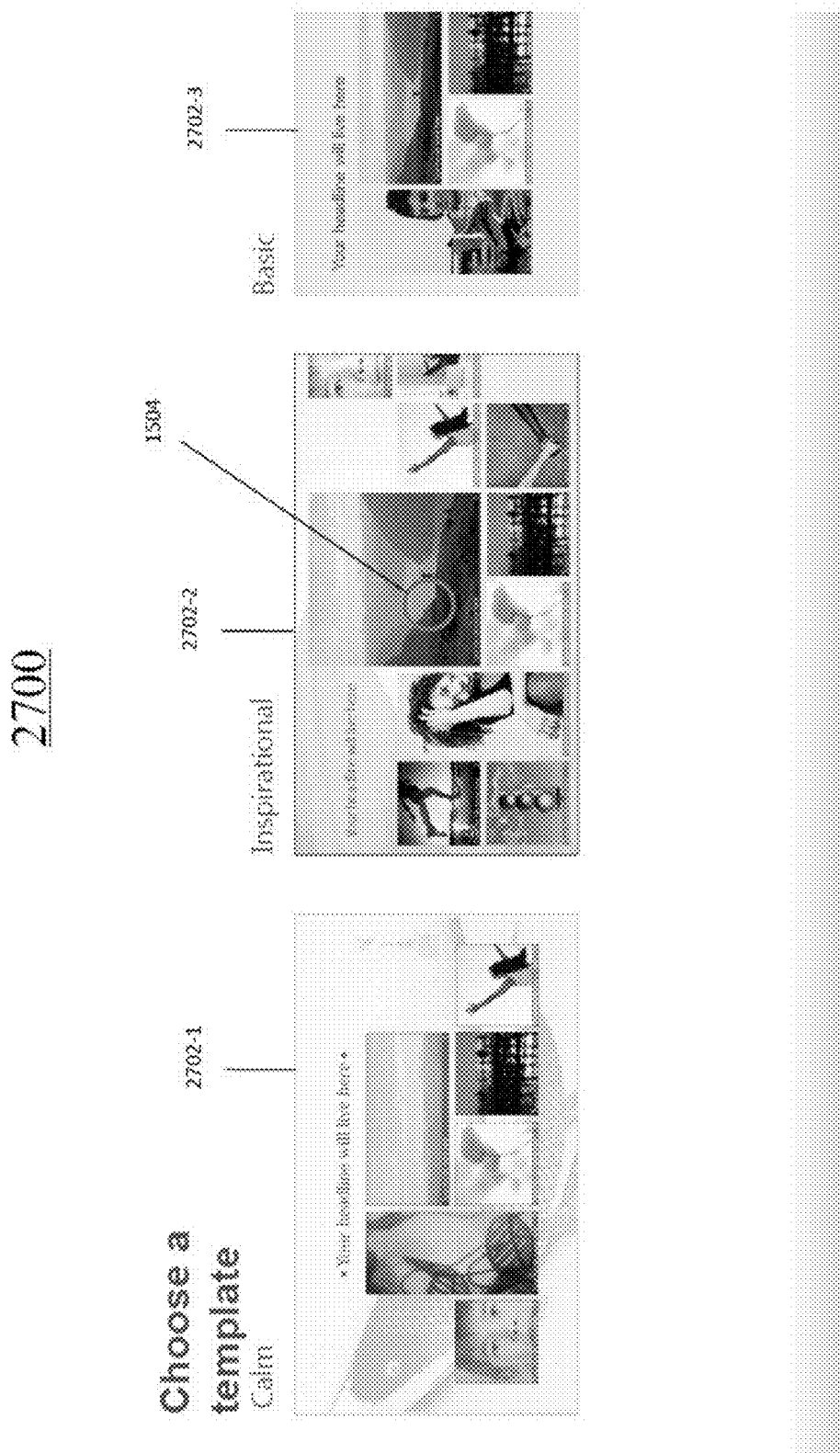
FIG. 27 illustrates an embodiment of a user interface for montage templates.

FIG. 27 illustrates a user interface view 2700 of a set of templates 2'702-y that a content producer can use to generate the montage 1002. More particularly, the user interface view 2700 illustrates three templates 2702-1, 2702-2 and 2702-3. The template 2702-1 has a "Calm" theme, the template 2702-2 has an "Inspirational" theme, and the template 2702-3 has a "Basic" theme. Other templates 2'702-y may be used as well. Assume a content producer selects the template 2702-2 by performing a tapping motion as indicated by the circle 1504 to begin building the montage 1002.

Figure 28:
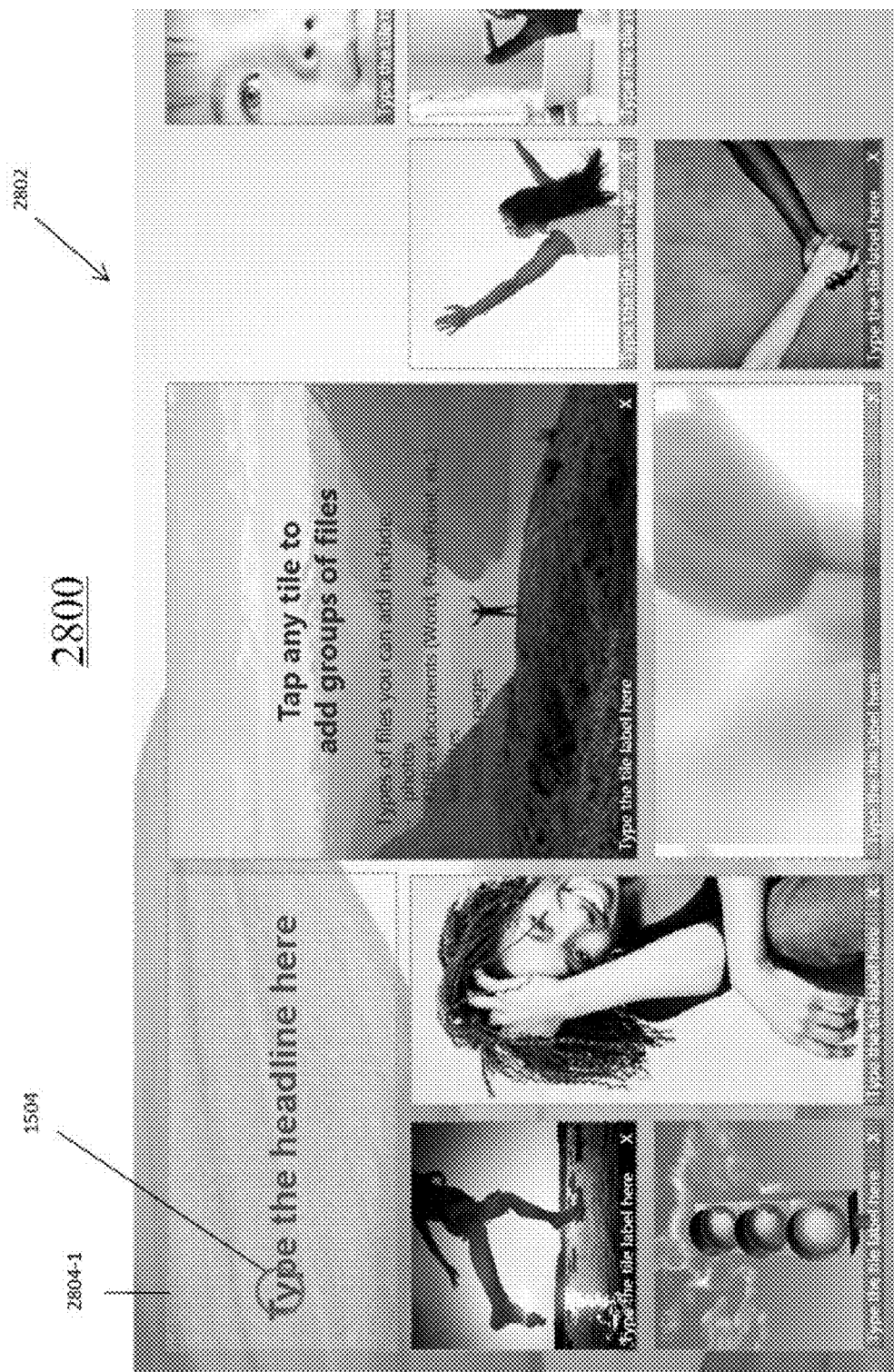
FIG. 28 illustrates an embodiment of a user interface for a montage template.

FIG. 28 illustrates a user interface view 2800 of the template 2702-2 that a content producer can use to generate the montage 1002. The user interface view 2800 illustrates a presentation surface 2802 having various presentation tiles

2804-z. Assume the content producer selects a presentation tile 2804-1 by performing a tapping motion as indicated by the circle 1504 (e.g., <Click 2x>) to insert a headline for the montage 1002 (e.g., <Click 2x>). The content producer can then enter a new headline in the presentation tile 2804-1.

Figure 29:
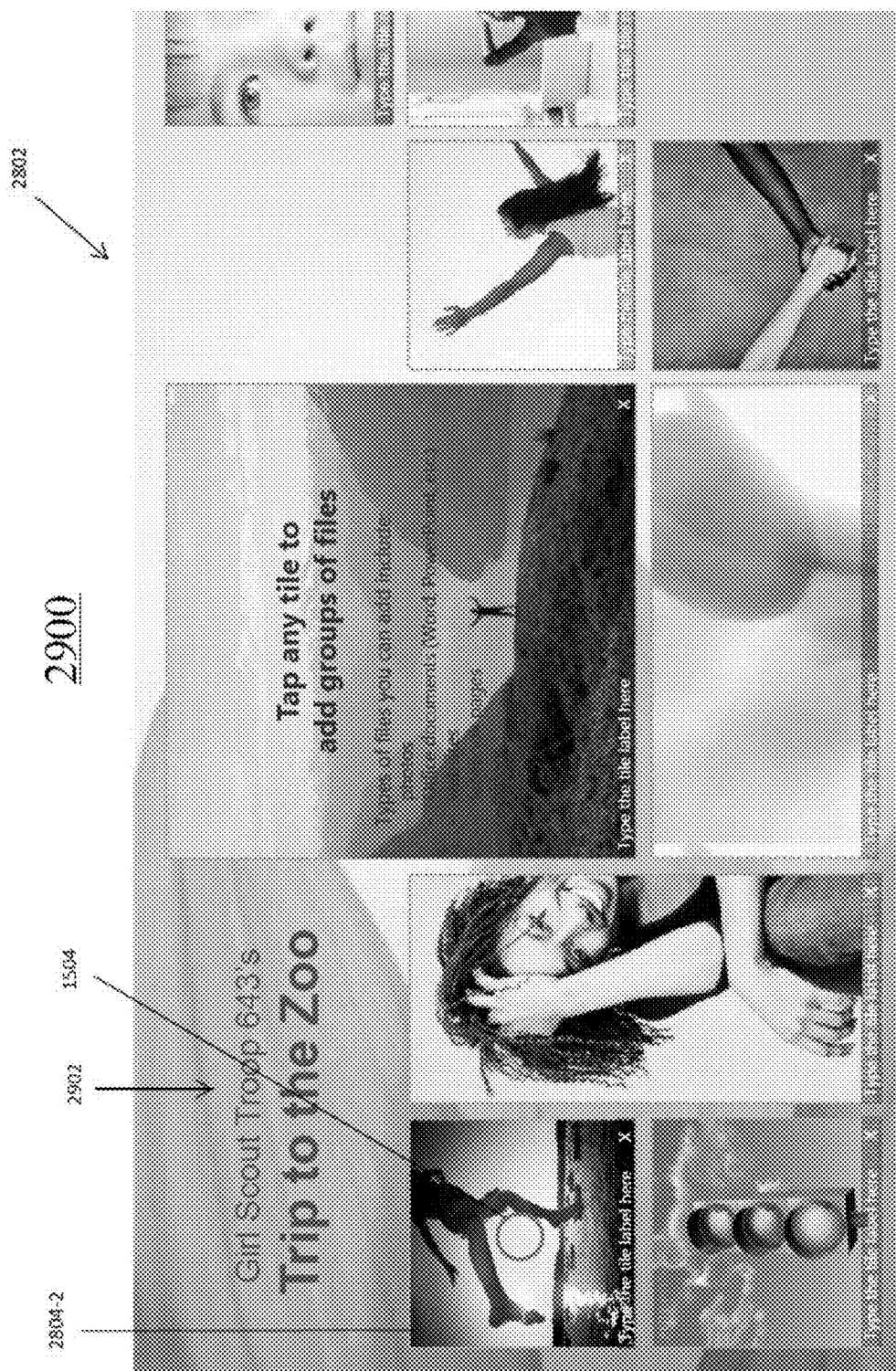
FIG. 29 illustrates an embodiment of a user interface for a montage template.

FIG. 29 illustrates a user interface view 2900 of the template 2702-2 that a content producer can use to generate the montage 1002. The user interface view 2900 illustrates the presentation surface 2802 after insertion of a tile object 2902 in the presentation tile 2804-1 which reads "Girl Scout Troop 643's Trip to the Zoo." The content producer may next decide to insert a group of slides for a slide deck into a presentation tile 2804-2 by performing a tapping motion as indicated by the circle 1504 (e.g., <Click 2x>), and inserts twelve slides for the slide deck.

Figure 30:
FIG. 30 illustrates an embodiment of a user interface for a montage template.

FIG. 30 illustrates a user interface view 3000 of the template 2702-2 that a content producer can use to generate the montage 1002. The user interface view 3000 illustrates the presentation surface 2802 after insertion of a tile object 2904 in the presentation tile 2804-2 which has a first slide that reads "What I learned from my trip to the zoo." The content producer may next decide to insert a tile label for the presentation tile 2804-2 by performing a tapping motion as indicated by the circle 1504 (e.g., <Click 2x>).

Figure 31:
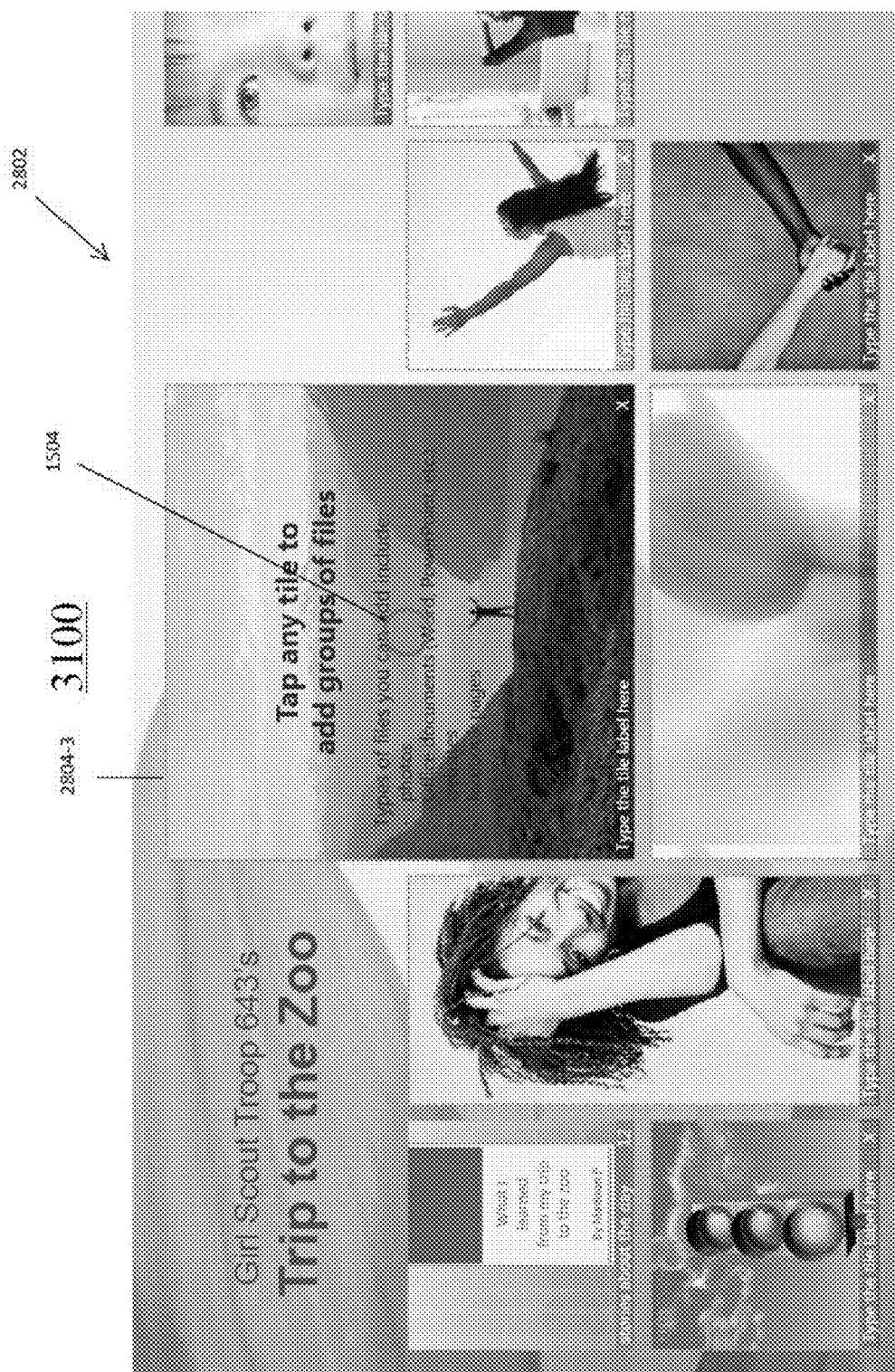
FIG. 31 illustrates an embodiment of a user interface for a montage template.

FIG. 31 illustrates a user interface view 3100 of the template 2702-2 that a content producer can use to generate the montage 1002. The user interface view 3100 illustrates the presentation surface 2802 after insertion of a tile label for the presentation tile 2804-2 which reads "stories about the day." The content producer may next decide to add a photo gallery into a presentation tile 2804-3 by performing a tapping motion as indicated by the circle 1504 (e.g., <Click 2x>), and uploads photos into the presentation tile 2804-3 (e.g., <Click 2x>).

Figure 32:
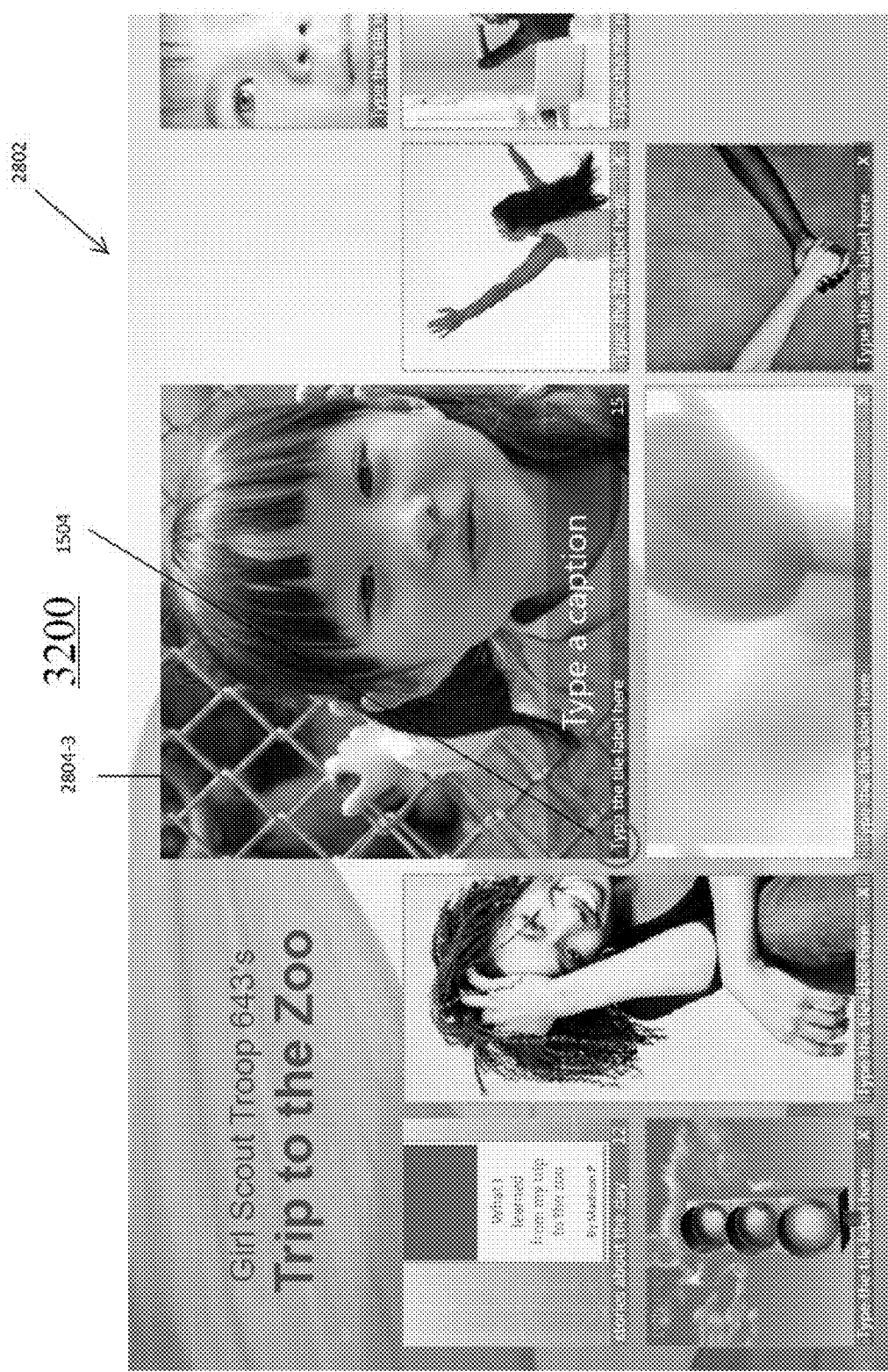
FIG. 32 illustrates an embodiment of a user interface for a montage template.

FIG. 32 illustrates a user interface view 3200 of the template 2702-2 that a content producer can use to generate the montage 1002. The user interface view 3200 illustrates the presentation surface 2802 after insertion of photographs in the presentation tile 2804-3, which illustrates a tile object having a photograph of a child. The content producer may next decide to insert a tile label for the presentation tile 2804-3 by performing a tapping motion as indicated by the circle 1504 (e.g., <Click 2x>).

Figure 33:
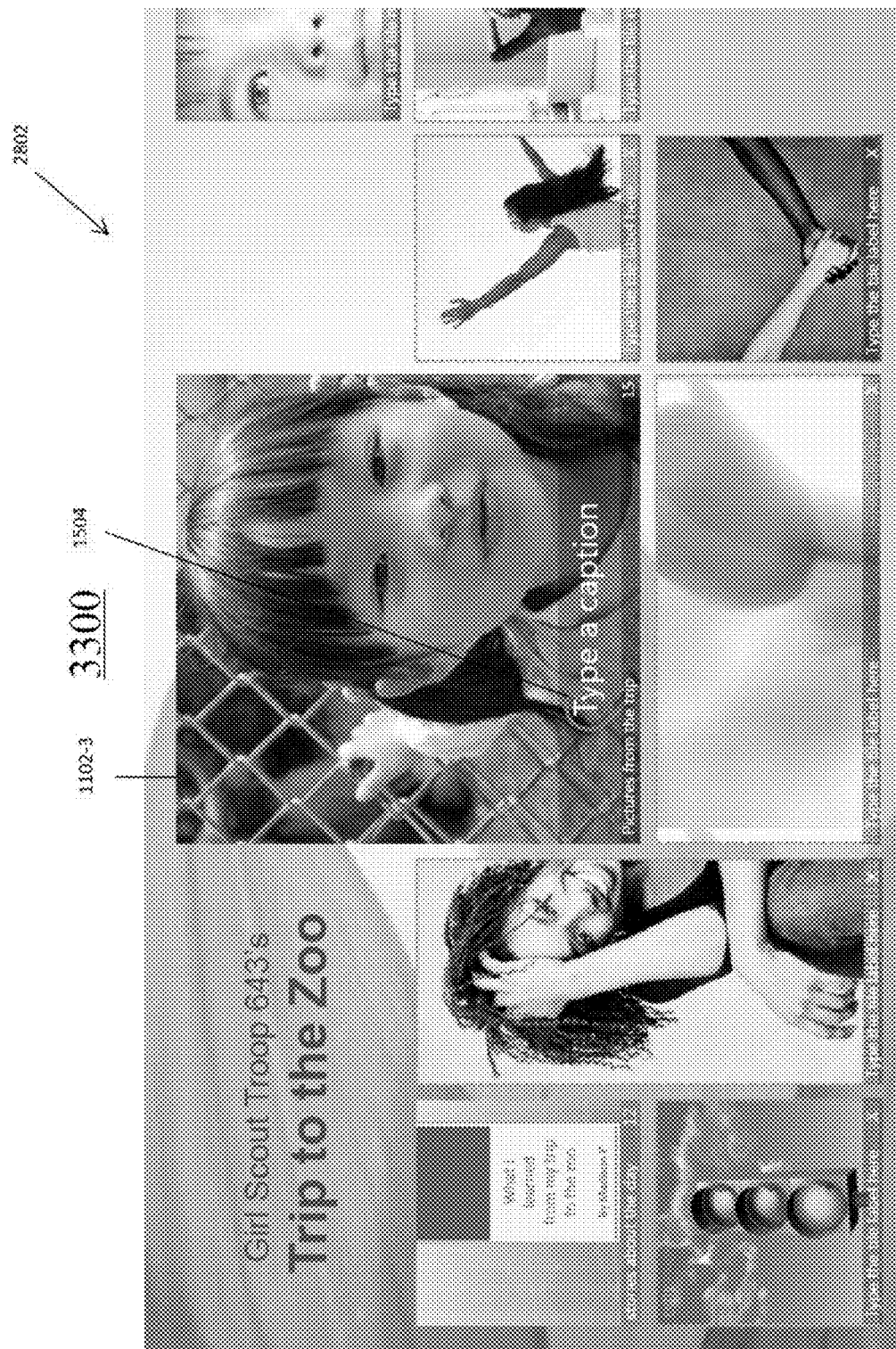
FIG. 33 illustrates an embodiment of a user interface for a montage template.

FIG. 33 illustrates a user interface view 3300 of the template 2702-2 that a content producer can use to generate the montage 1002. The user interface view 3300 illustrates the presentation surface 2802 after insertion of a tile label for the presentation tile 2804-3, which reads "Pictures from the trip." The content producer may next decide to insert a tile caption for the tile object shown as a photograph in the presentation tile 2804-3 by performing a tapping motion as indicated by the circle 1504 (e.g., <Click 2x>).

Figure 34:
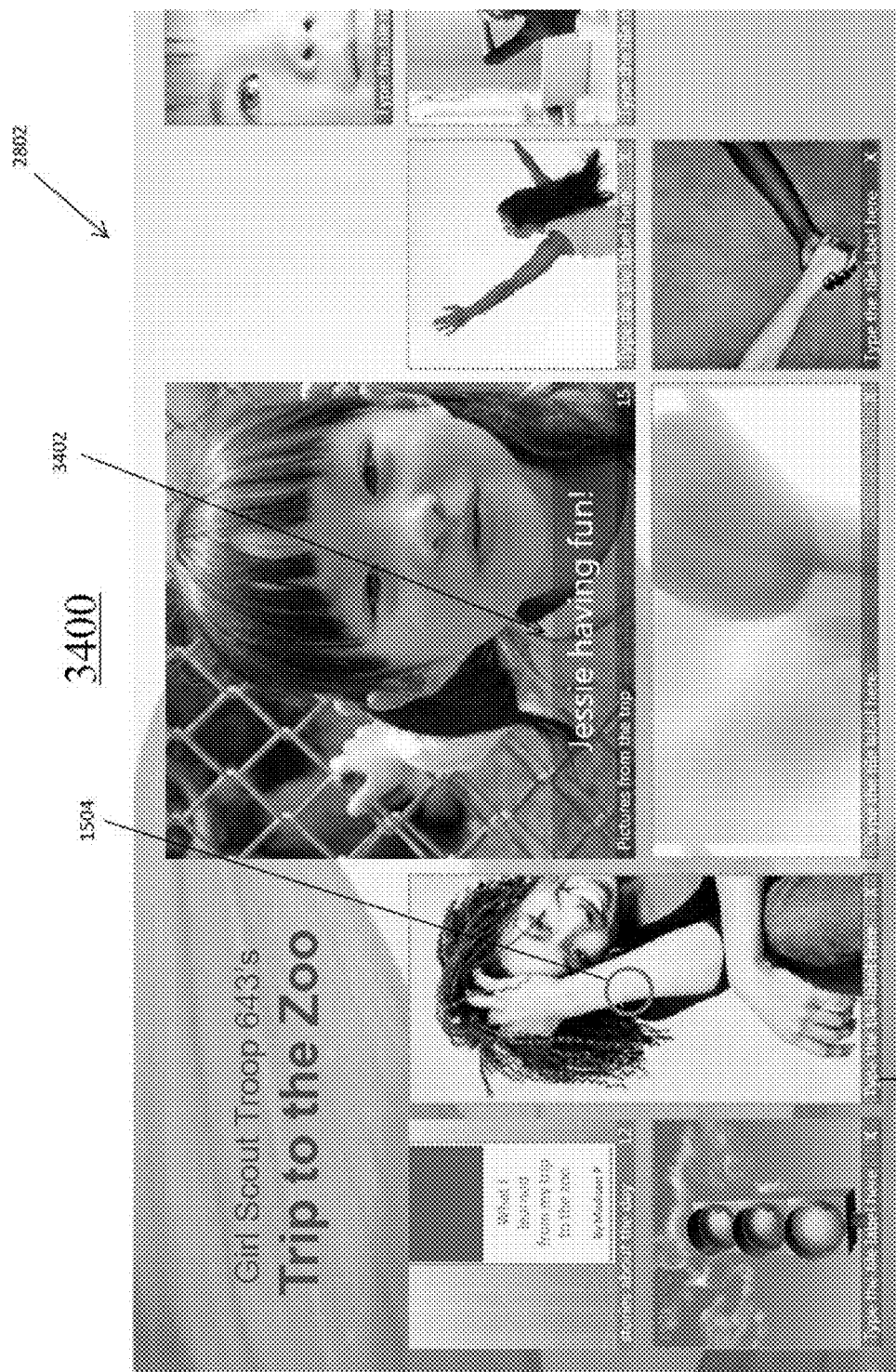
FIG. 34 illustrates an embodiment of a user interface for a montage template.

FIG. 34 illustrates a user interface view 3400 of the template 2702-2 that a content producer can use to generate the montage 1002. The user interface view 3400 illustrates the presentation surface 2802 after insertion of a caption for the tile object shown as a photograph for the presentation tile 2804-3, which reads "Jessie having fun!" The content producer may next decide to insert a web page from a web site in a presentation tile 2804-4 by performing a tapping motion as indicated by the circle 1504 (e.g., <Click 2x>).

Figure 35:
FIG. 35 illustrates an embodiment of a user interface for a montage template.

FIG. 35 illustrates a user interface view 3500 of the template 2702-2 that a content producer can use to generate the montage 1002. The user interface view 3500 illustrates the presentation surface 2802 after insertion of a web page for the presentation tile 2804-4. The content producer may next decide to insert a tile label for the presentation tile 2804-4 by performing a tapping motion as indicated by the circle 1504 (e.g., <Click 2x>).

Figure 36:
FIG. 36 illustrates an embodiment of a user interface for a montage template.

FIG. 36 illustrates a user interface view 3600 of the template 2702-2 that a content producer can use to generate the montage 1002. The user interface view 3600 illustrates the presentation surface 2802 after insertion of a tile label for the tile object shown as a web page for the presentation tile 2804-4, which reads "the zoo's website." The content producer may next decide to insert some documents in a presentation tile 2804-5 by performing a tapping motion as indicated by the circle 1504 (e.g., <Click 2x>).

Figure 37:
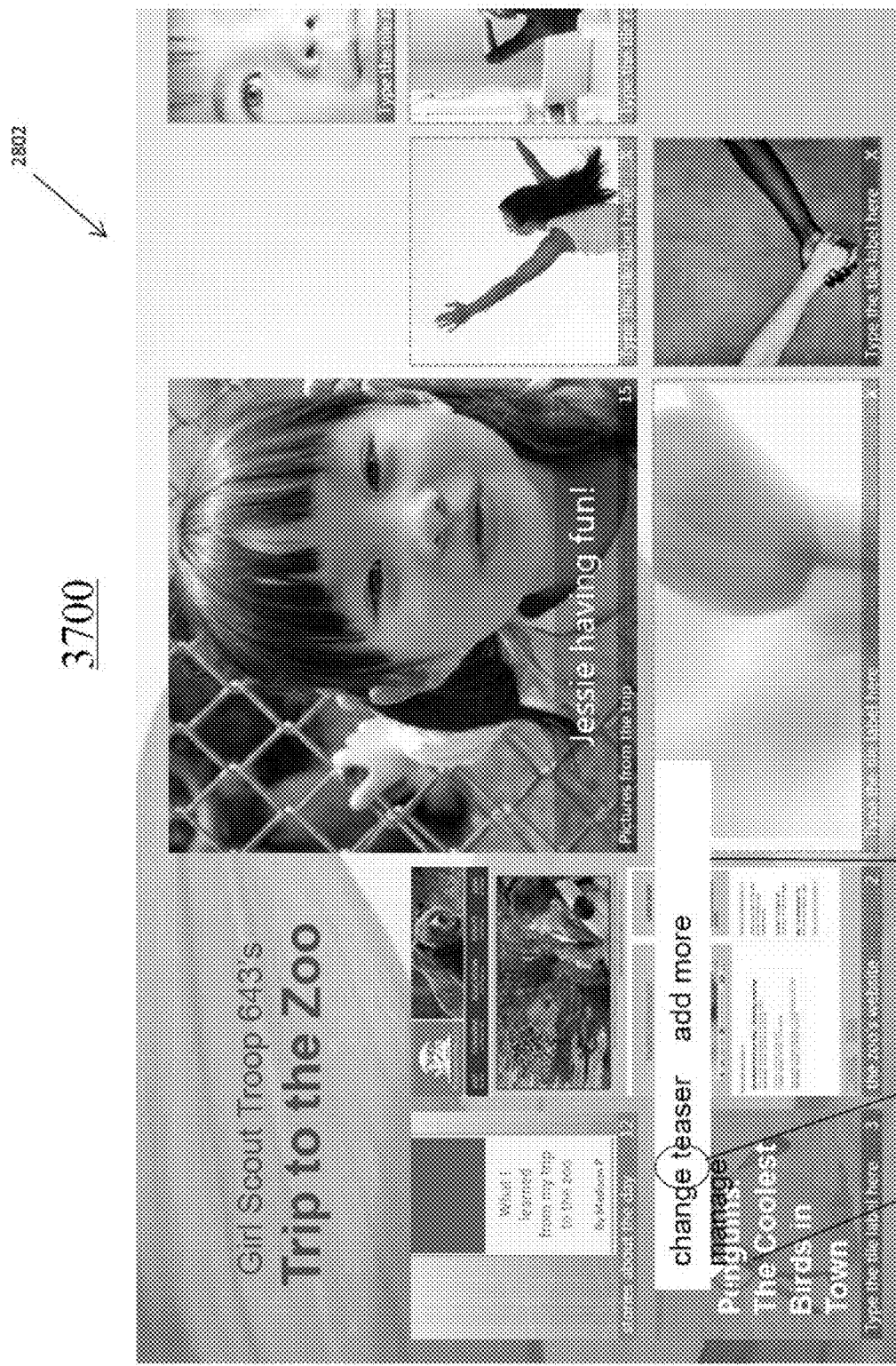
FIG. 37 illustrates an embodiment of a user interface for a montage template.

FIG. 37 illustrates a user interface view 3700 of the template 2702-2 that a content producer can use to generate the montage 1002. The user interface view 3700 illustrates the presentation surface 2802 after insertion of documents into the presentation tile 2804-5, the first of which reads "Penguins: The Coolest Birds in Town." The content producer may next decide to change a color for the tile object in the presentation tile 2804-5 by performing a tapping motion as indicated by the circle 1504 (e.g., <Click 2x>). The tapping motion surfaces controls 3702 to change the tile object. The content producer may select a control labeled "change teaser" by performing a tapping motion as indicated by the circle 1504 (e.g., <Click 2x>).

Figure 38:
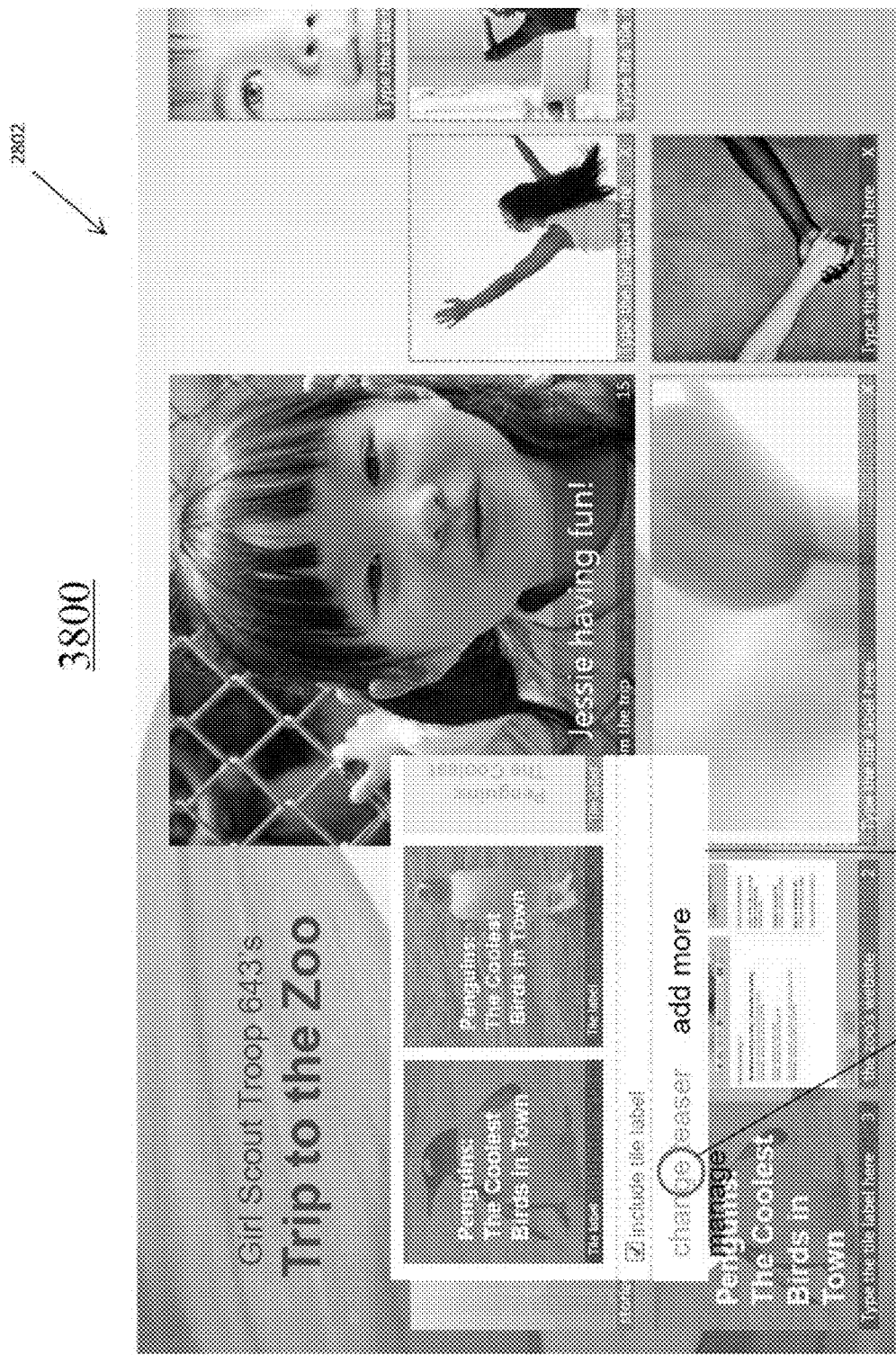
FIG. 38 illustrates an embodiment of a user interface for a montage template.

FIG. 38 illustrates a user interface view 3800 of the template 2702-2 that a content producer can use to generate the montage 1002. The user interface view 3800 illustrates the presentation surface 2802 with an extended set of controls 3802 that include tile objects with different colors.

Figure 39:
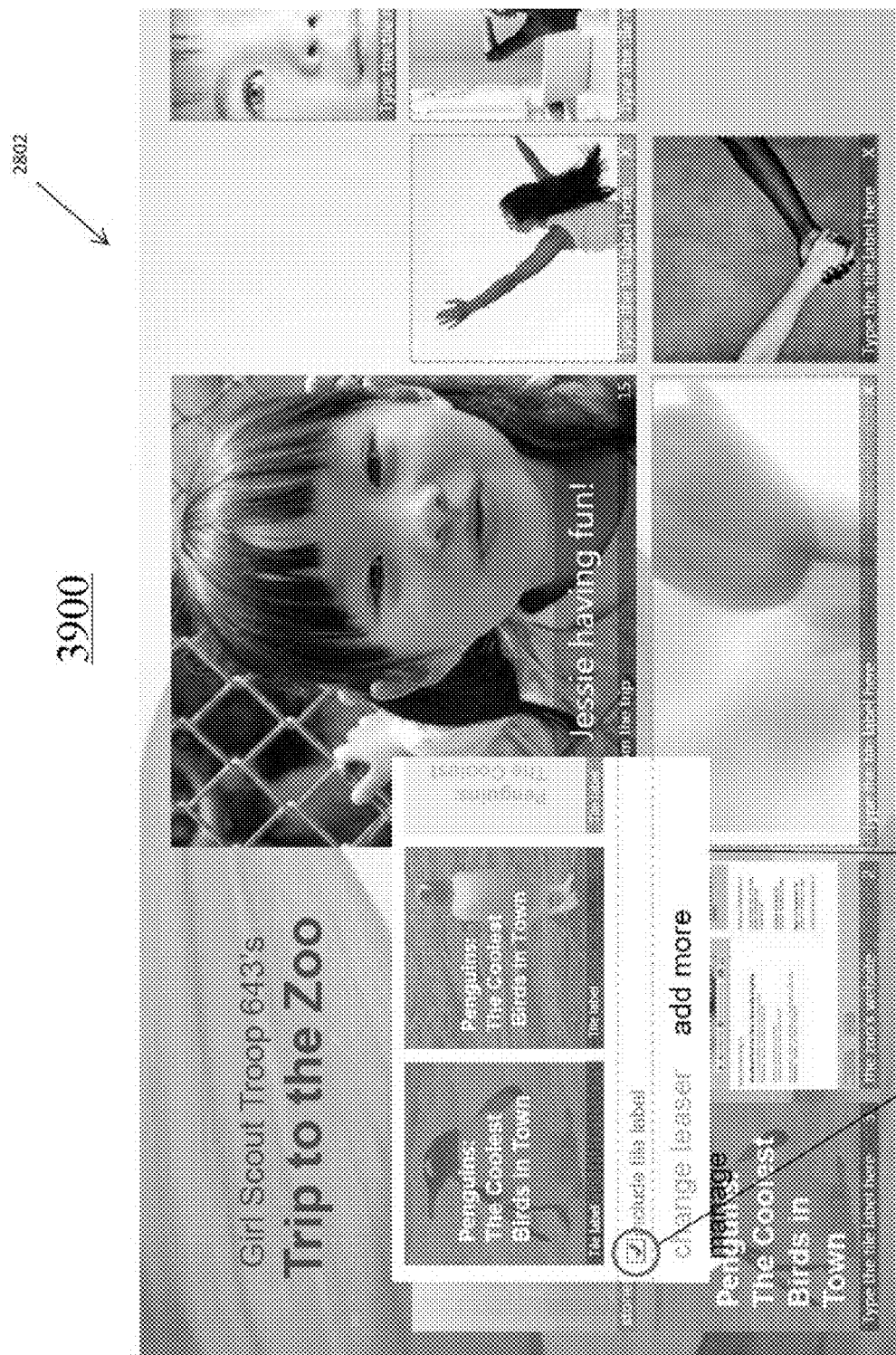
FIG. 39 illustrates an embodiment of a user interface for a montage template.

FIG. 39 illustrates a user interface view 3900 of the template 2702-2 that a content producer can use to generate the montage 1002. The user interface view 3900 illustrates the extended set of controls 3802 which include a check box labeled "include tile label." The content producer may decide to remove the tile label for the tile object in the presentation tile 2804-5 by performing a tapping motion as indicated by the circle 1504 (e.g., <Click 2x>), which deselects the box.

Figure 40:
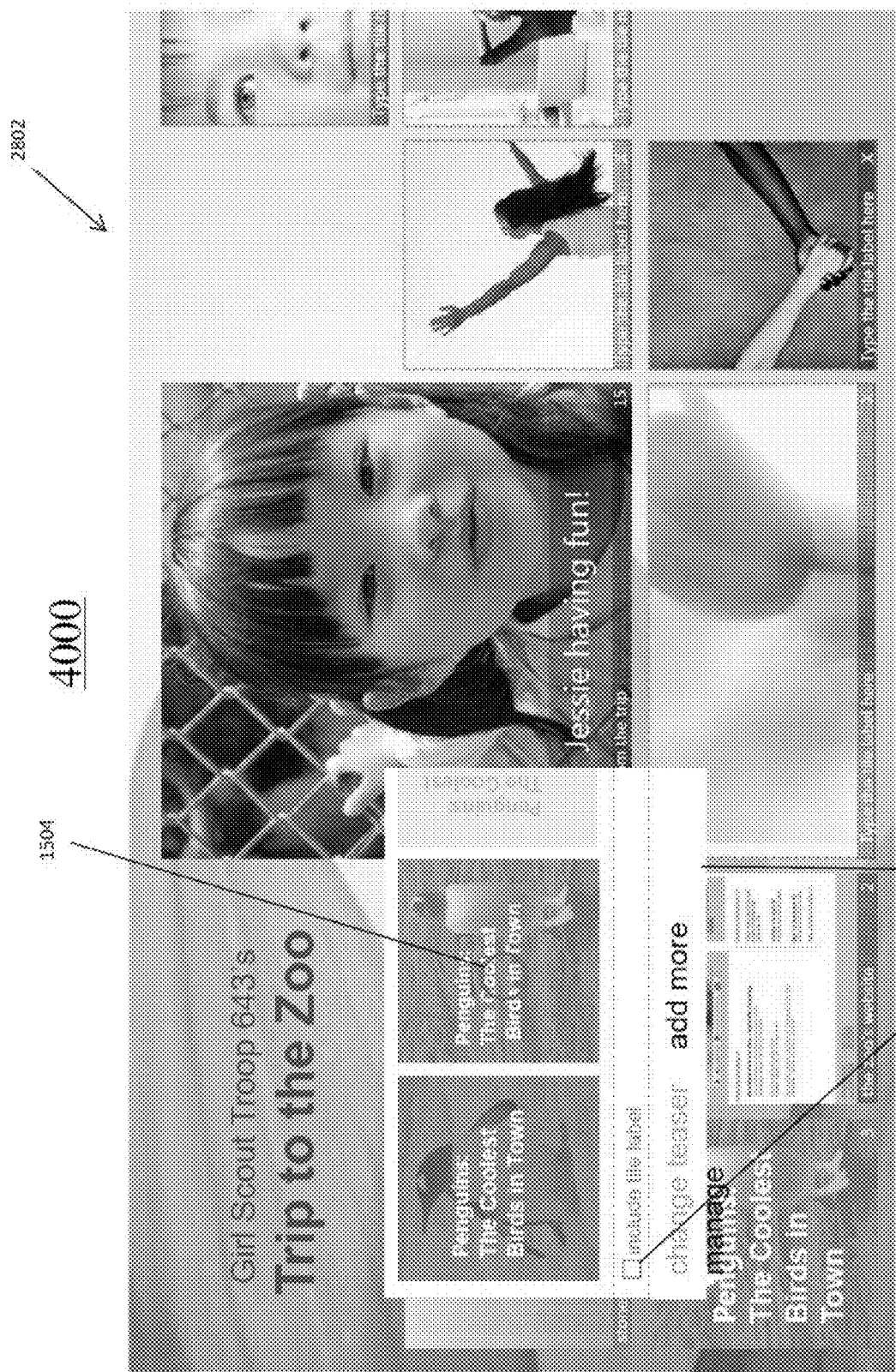
FIG. 40 illustrates an embodiment of a user interface for a montage template.
Figure 41:
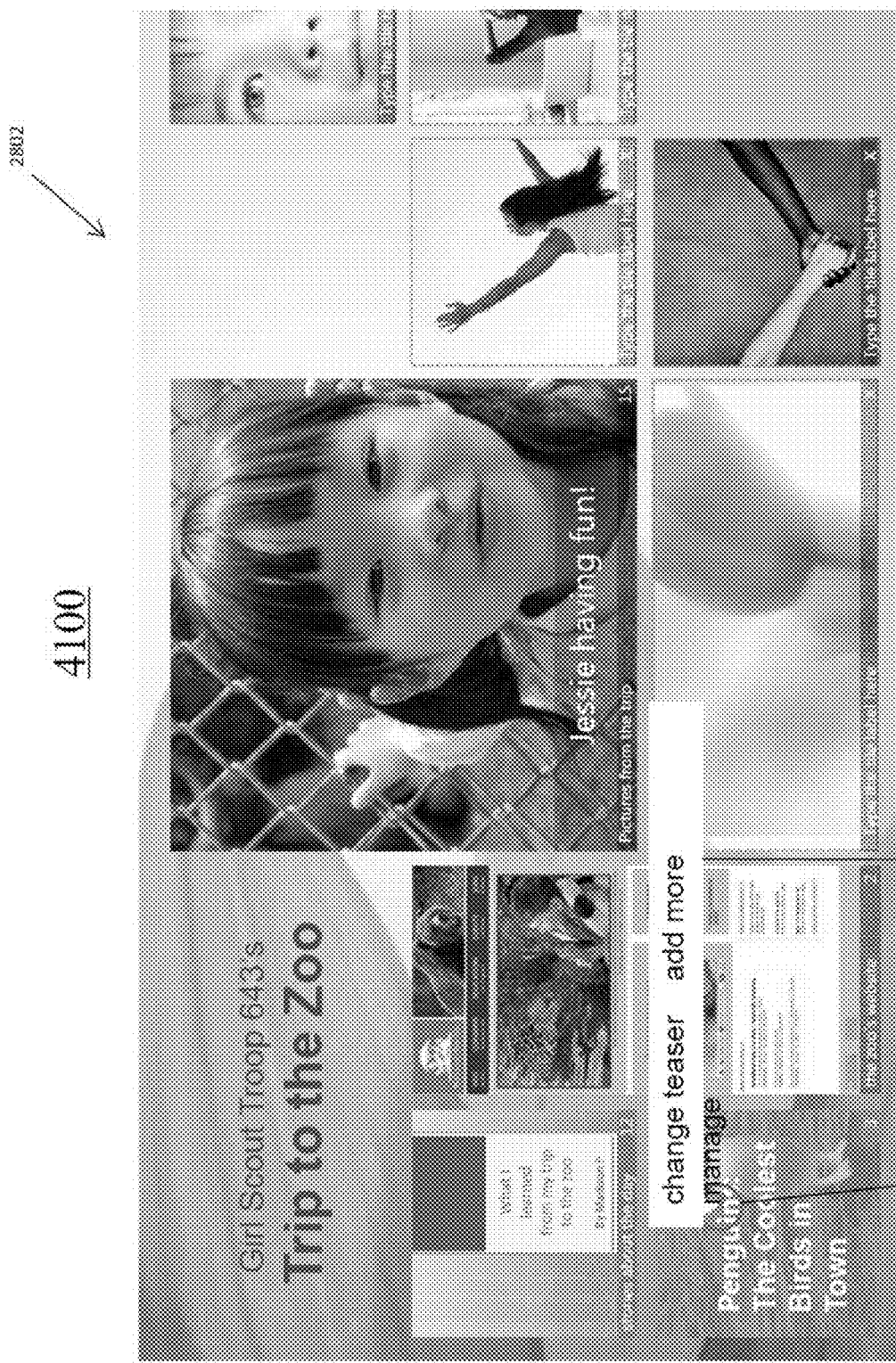
FIG. 41 illustrates an embodiment of a user interface for a montage template.
Figure 42:
FIG. 42 illustrates an embodiment of a user interface for a montage template.
Figure 43:
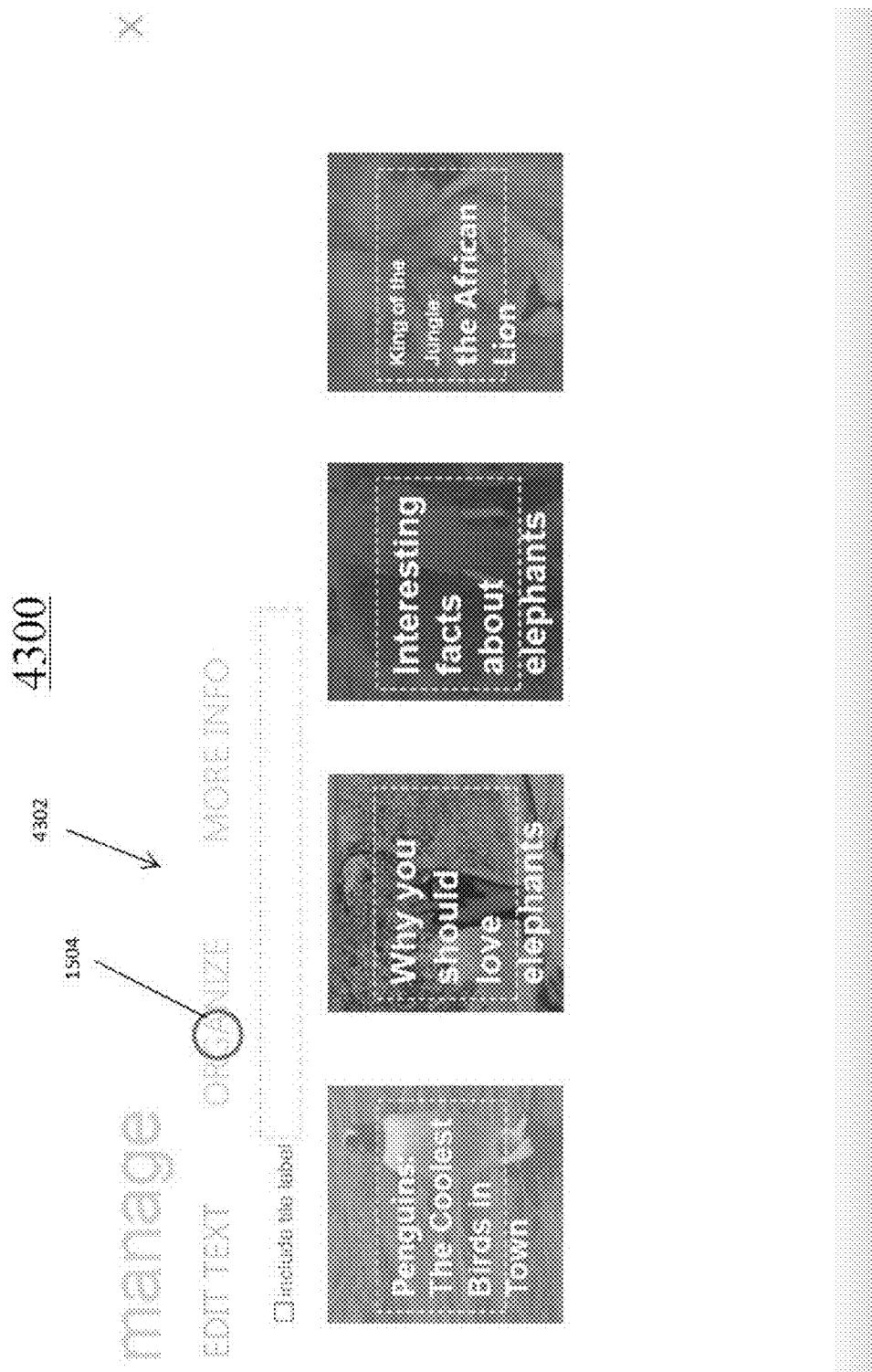
FIG. 43 illustrates an embodiment of a user interface for montage controls.
Figure 44:
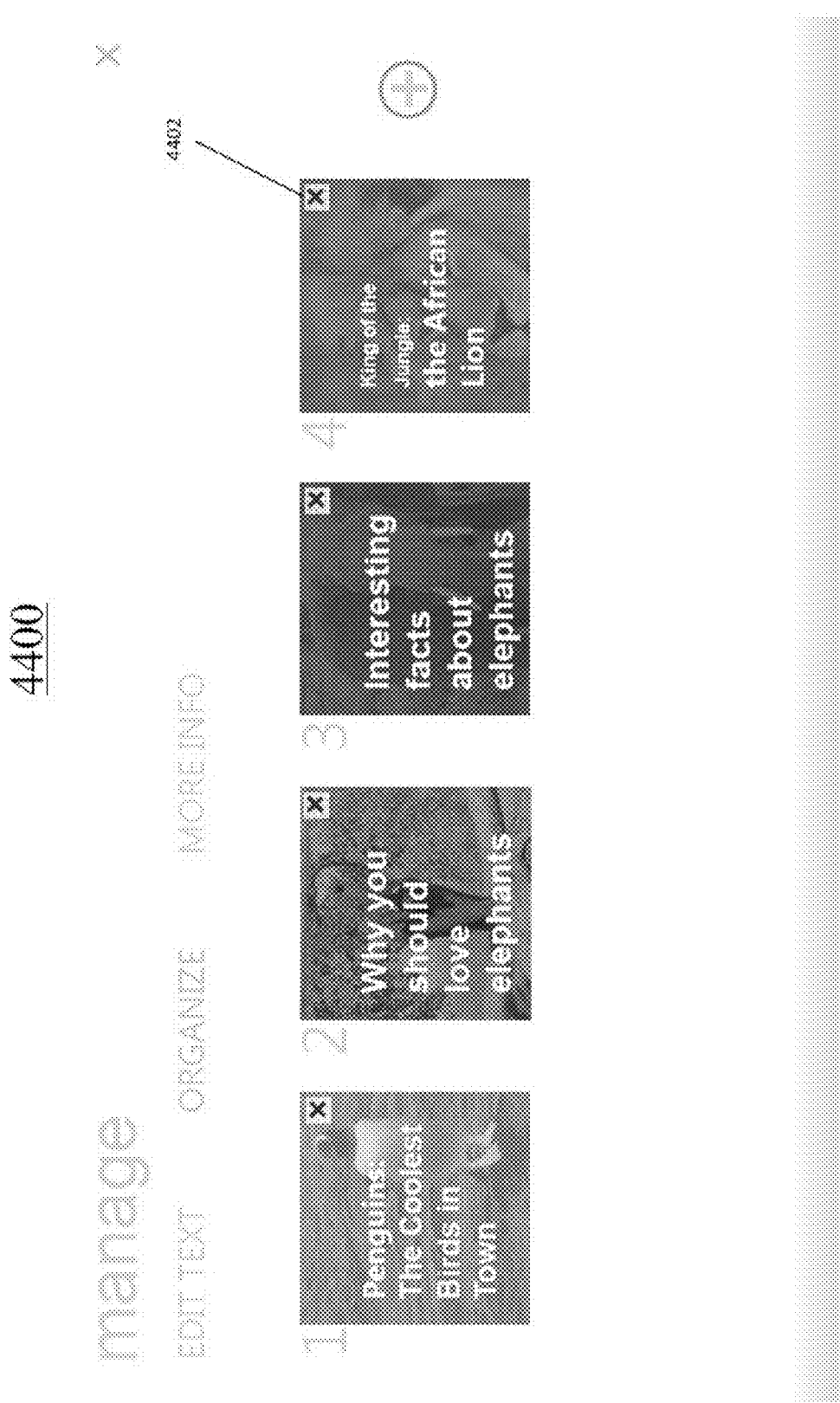
FIG. 44 illustrates an embodiment of a user interface for montage controls.
Figure 45:
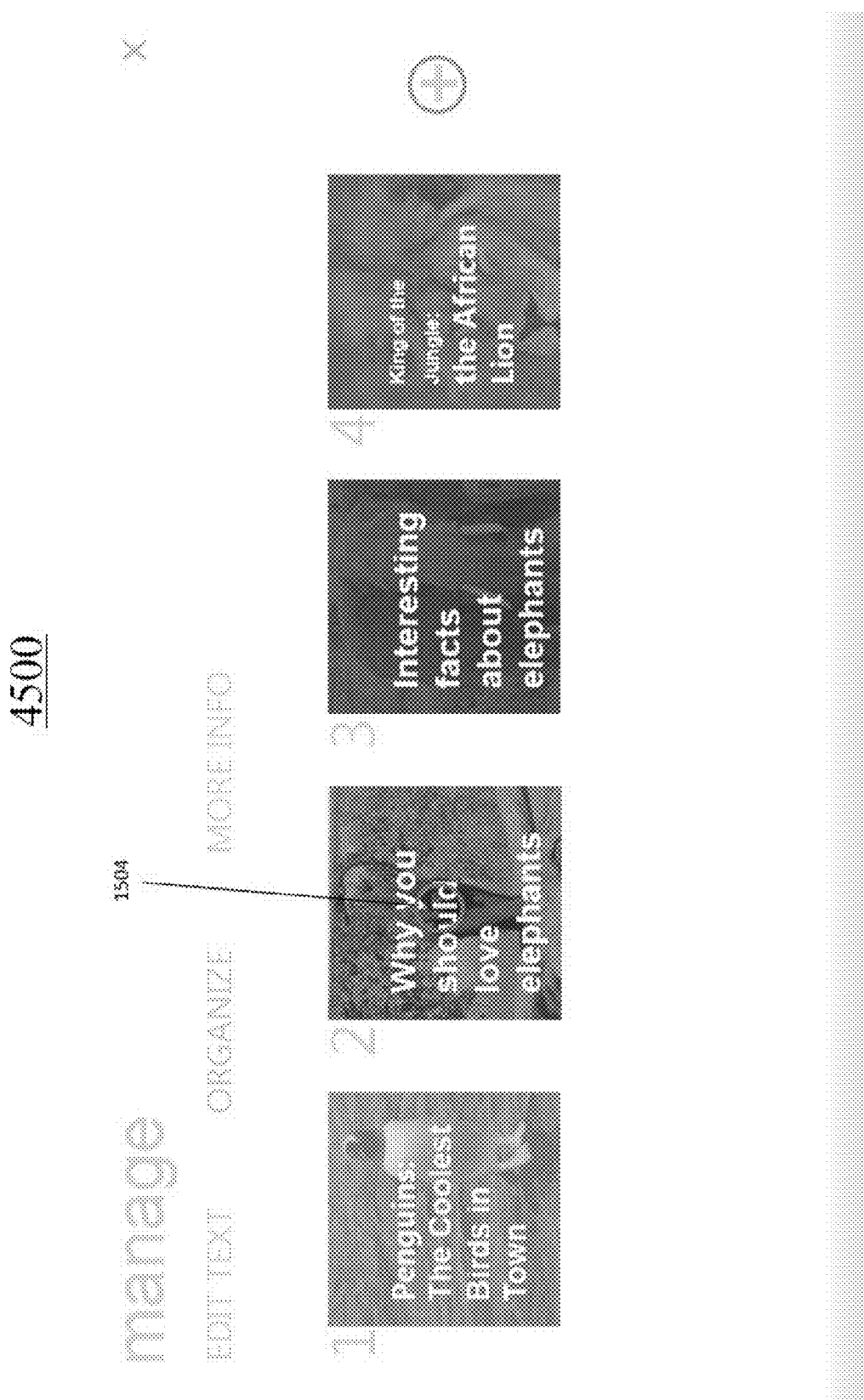
FIG. 45 illustrates an embodiment of a user interface for montage controls.
Figure 46:
FIG. 46 illustrates an embodiment of a user interface for montage controls.
Figure 47:
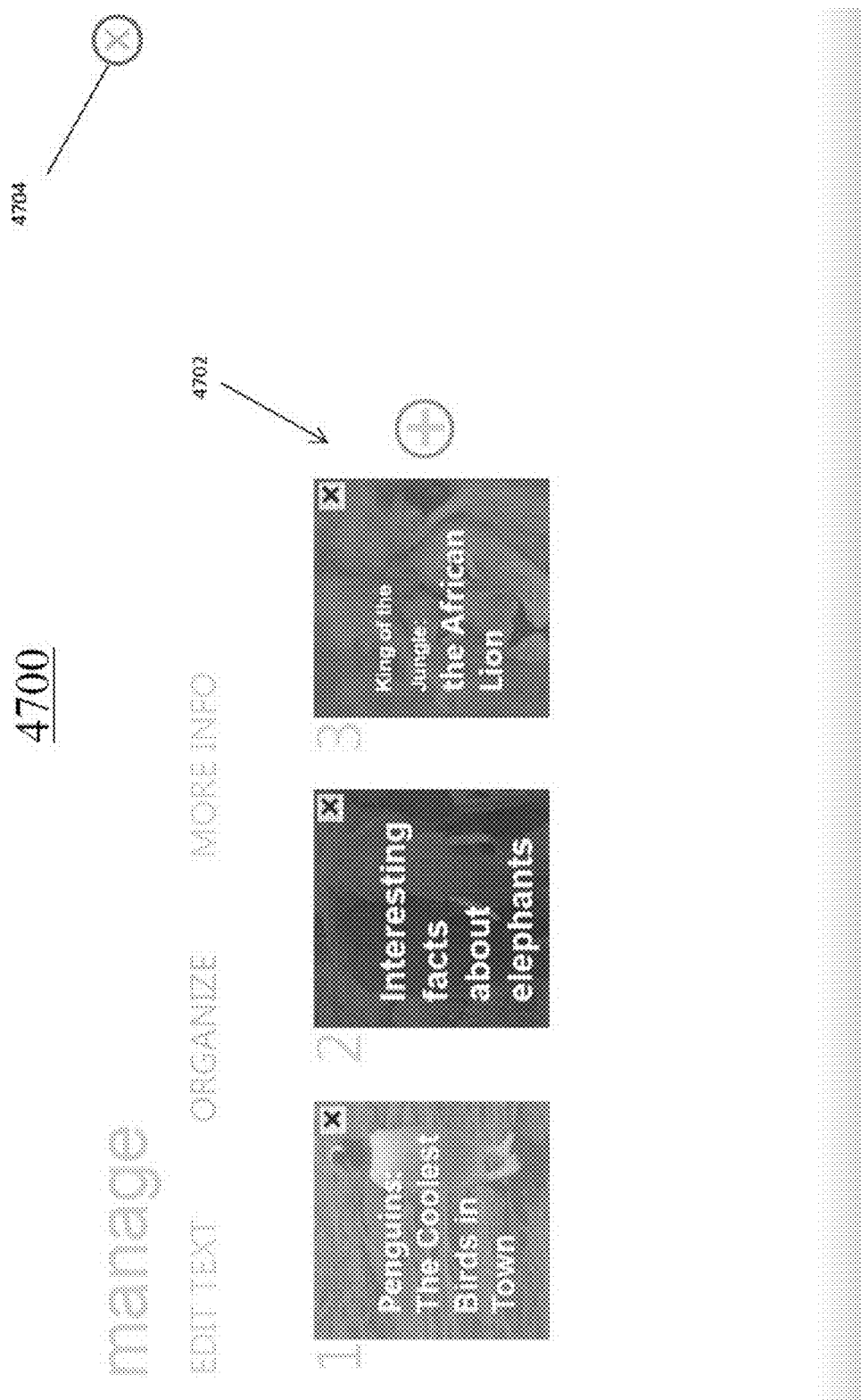
FIG. 47 illustrates an embodiment of a user interface for montage controls.
Figure 48:
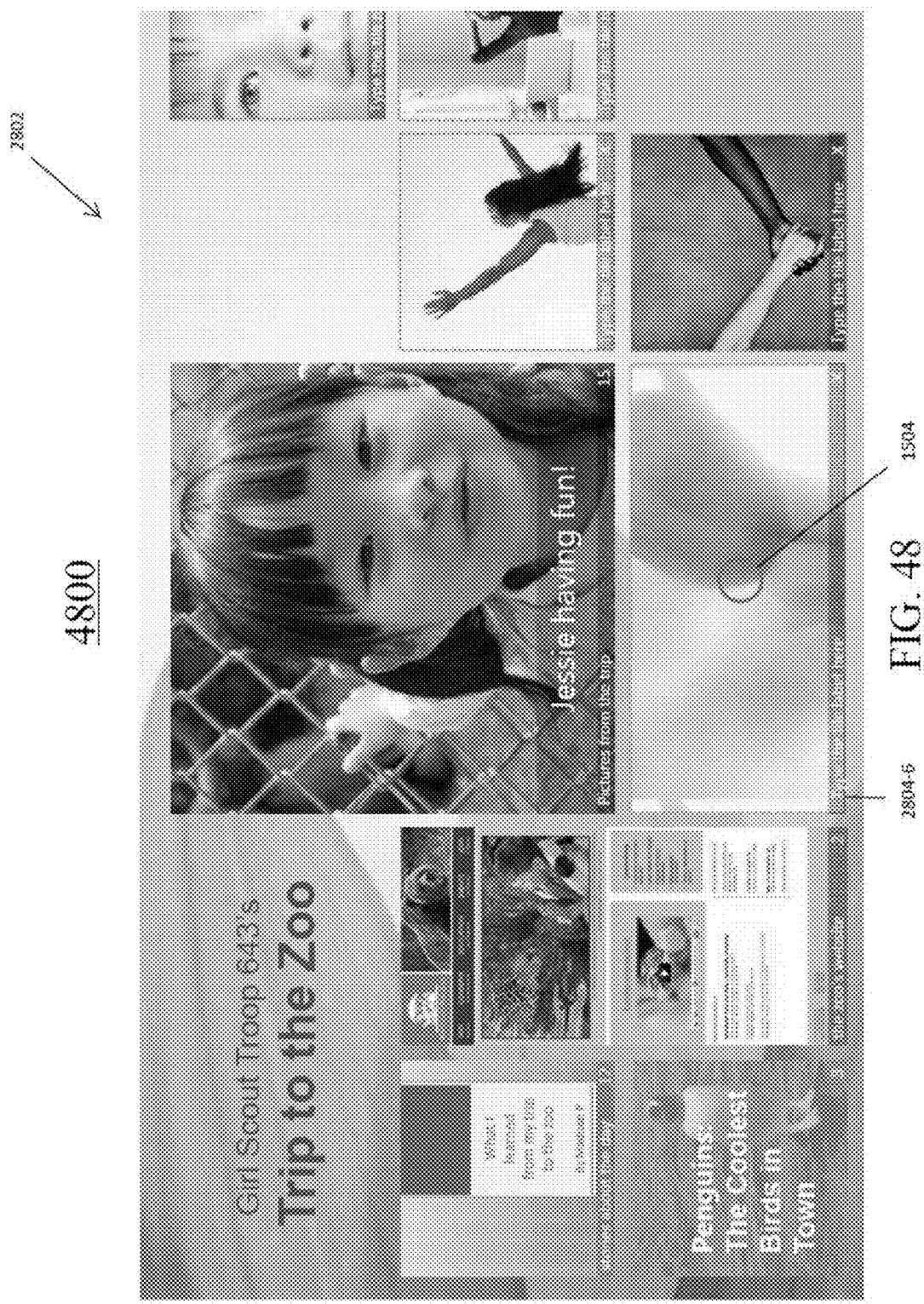
FIG. 48 illustrates an embodiment of a user interface for a montage template.
Figure 49:
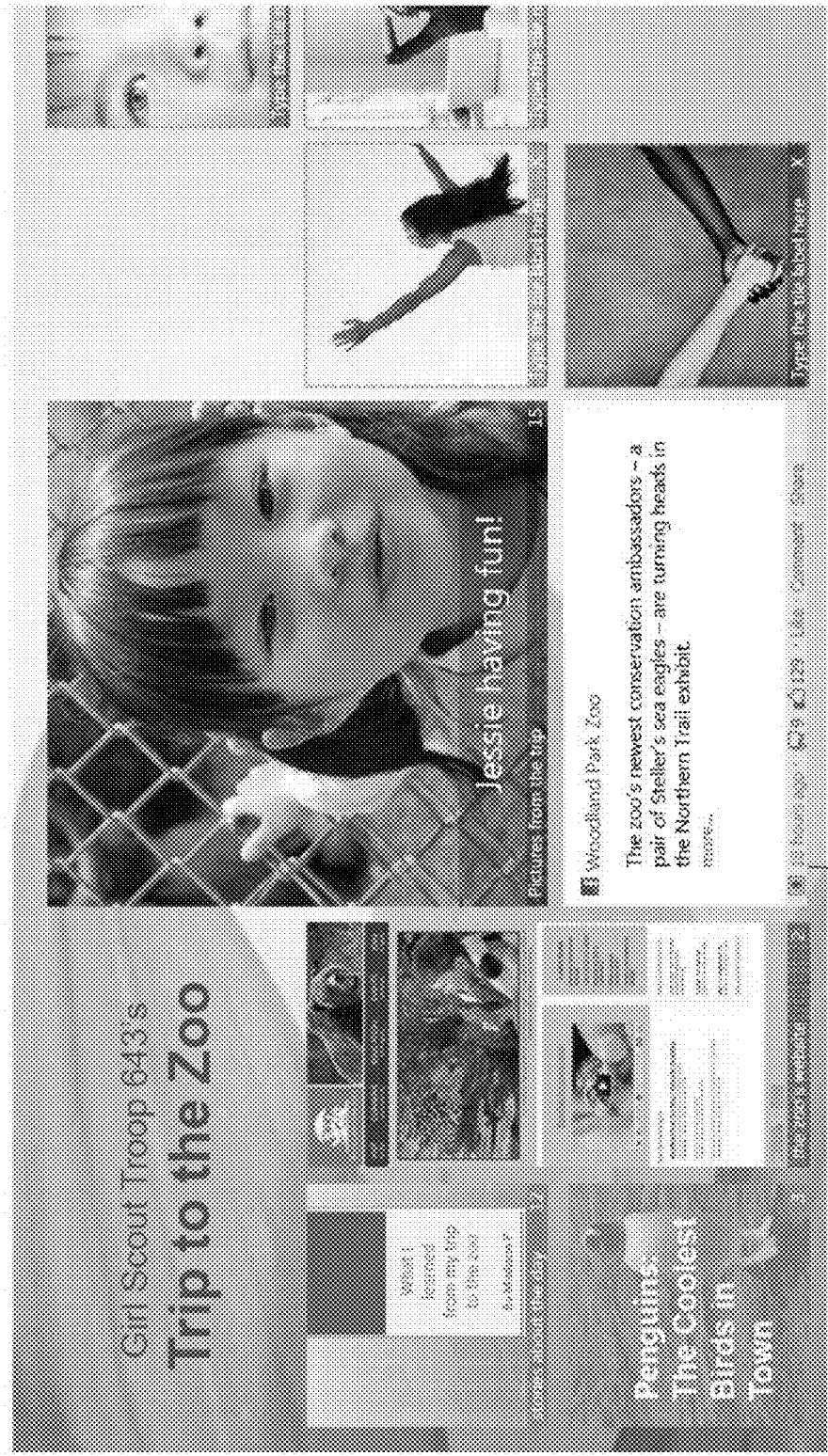
FIG. 49 illustrates an embodiment of a user interface for a montage template.
Figure 50:
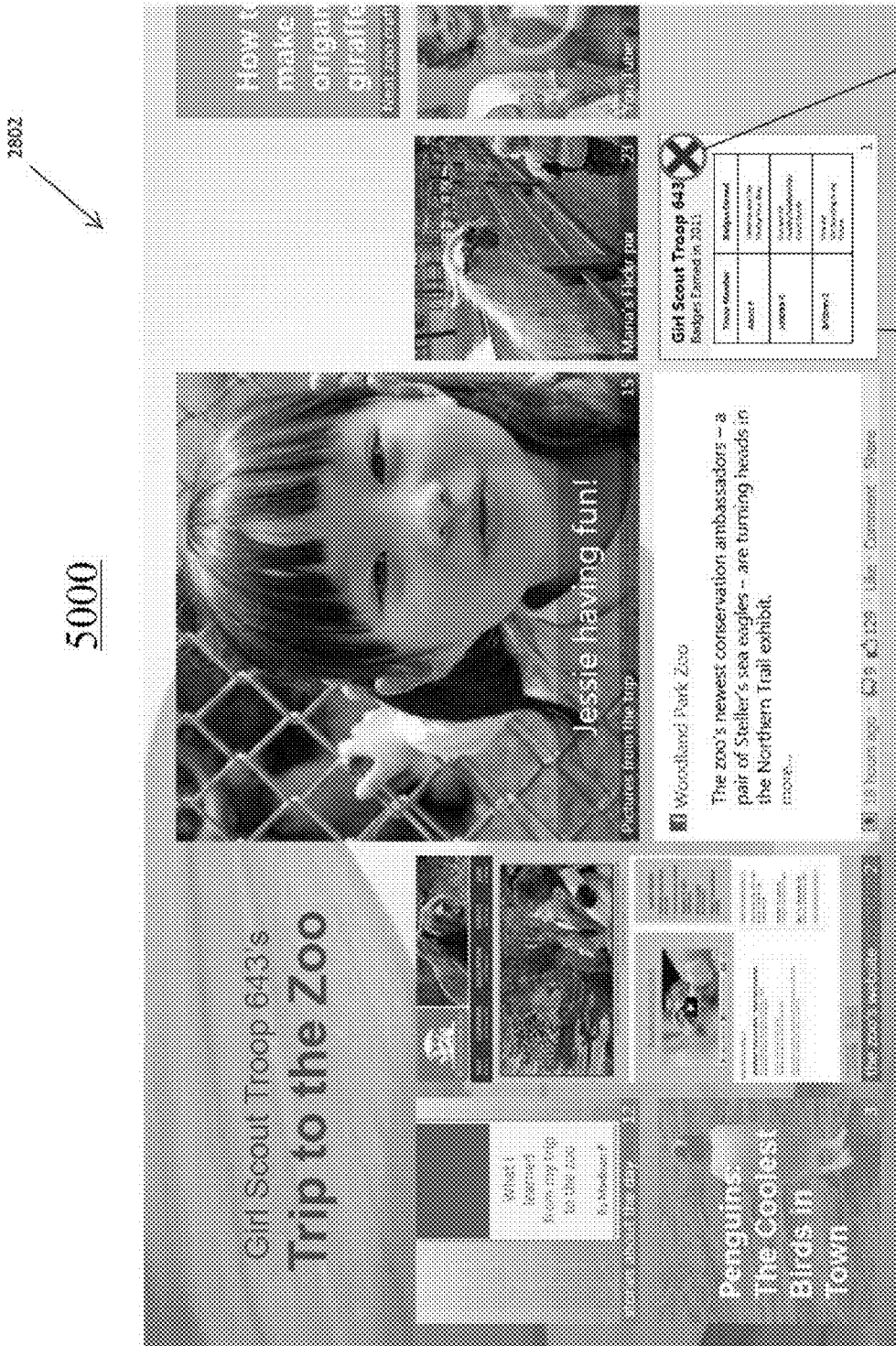
FIG. 50 illustrates an embodiment of a user interface for a montage template.
Figure 51:
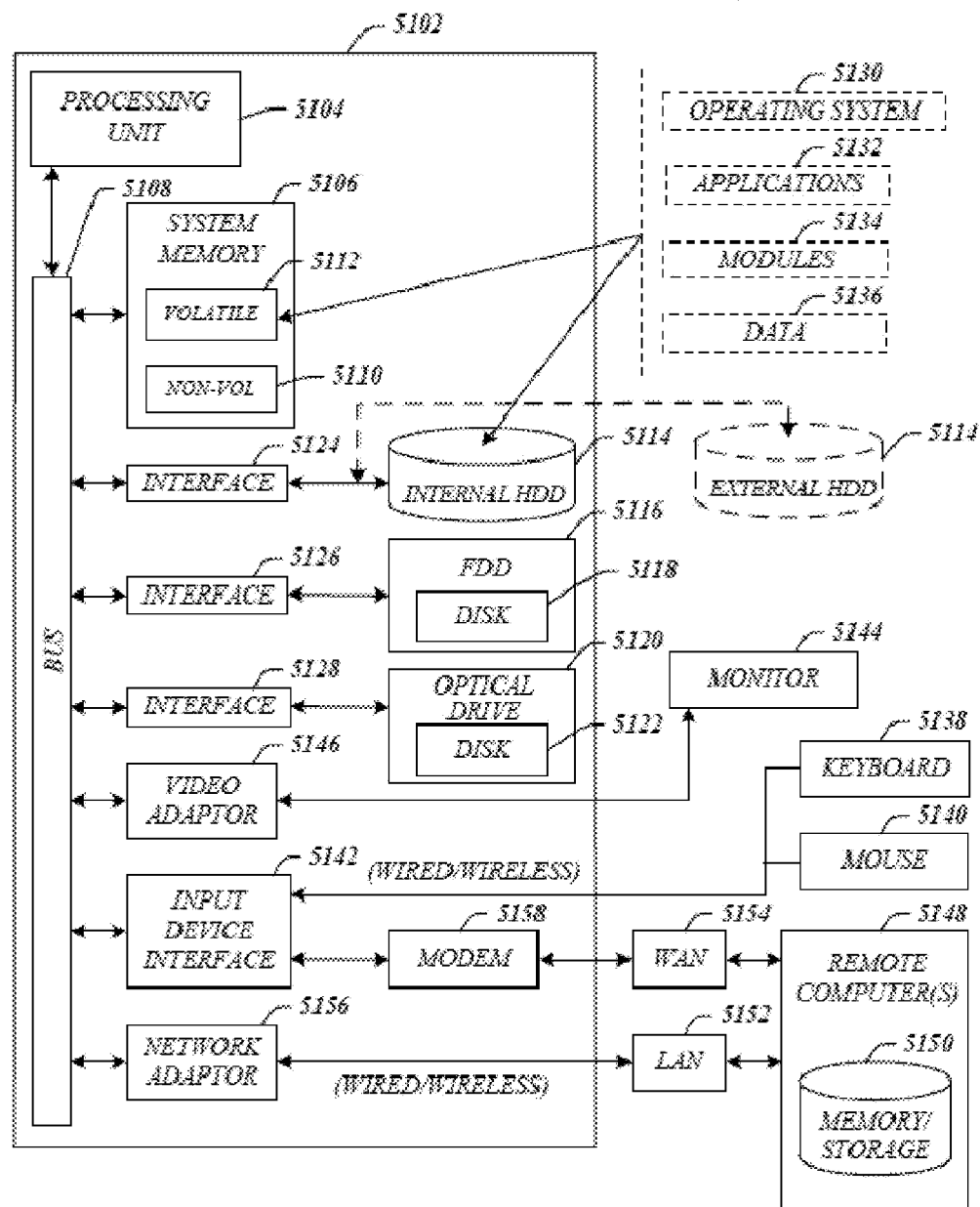
FIG. 51 illustrates an embodiment of a computing architecture.

FIG. 40 illustrates a user interface view 4000 of the template 2702-2 that a content producer can use to generate the montage 1002. The user interface view 4000 illustrates the presentation surface 2802 after the check box has been deselected. The content producer may select a blue color for the tile object in the presentation tile 2804-5 by performing a tapping motion as indicated by the circle 1504 (e.g., <Click 2x>).

FIG. 10 illustrates an embodiment of an exemplary computing architecture 1000 suitable for implementing various embodiments as previously described. The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi-processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The system memory 1006 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. The one or more application programs 1032, other program modules 1034, and program data 1036 can include, for example, the montage application 140, the authoring component 110, the presentation component 130, the security component 536, the publishing component 532, the message component 534, the user interface 538, and the messaging application 542.

A user can enter commands and information into the computer 1002 through one or more wire/wireless input devices, for example, a keyboard 1038 and a pointing device, such as a mouse 1040. Other input devices may include a microphone, an infrared (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
providing a presentation surface having multiple presentation tiles;
receiving a control directive to associate a data source with a presentation tile;
identifying a type of digital content for the data source;
retrieving a portion of content from the data source based on the type of digital content using a content selection algorithm having a set of defined rules pertaining to types of information to retrieve from the data source;
generating multiple versions of a tile object based on the set of defined rules, the multiple versions of the tile object pertaining to different combinations of sub-portions of the same content portion;
receiving a control directive to select one of the versions of the tile object as a selected tile object; and
storing the presentation surface and selected tile object as a montage in which the selected tile object is presented in the presentation tile, the montage capable of navigation using a gesture interface that allows manipulation of the tile object through a gesture to present a second tile object in the presentation tile while other tile objects of the montage remain unchanged.

2. The method of claim 1, comprising receiving the control directive to associate the data source with the presentation tile from an input device.

3. The method of claim 1, comprising identifying the type of digital content for the data source as an application type of digital content or a multimedia type of digital content, the application type of digital content including a word processing file, a spreadsheet file, a presentation file, a personal information manager file, a database file, a publisher file, a drawing file, a note file, or a message file, and the multimedia type of digital content including an audio file, an image file, a video file, an audio/video (AV) file, an animation file, a game file, a markup file, a web page file, or a social networking service (SNS) file.

4. The method of claim 1, comprising retrieving the portion of content from the data source based on a type definition for the type of digital content, the portion of content comprising information of a content and properties class, a content objects class, or a content pages class.

5. The method of claim 1, comprising publishing the montage and the data source to a network service.

6. The method of claim 1, comprising receiving a reference to the montage and a reference to the data source stored in a remote datastore from a network service.

7. The method of claim 1, comprising associating a reference to the data source stored in a remote datastore of a network service with the selected tile object.

8. The method of claim 1, comprising publishing a reference to the montage on a network service.

9. The method of claim 1, comprising sending the montage or a reference to the montage in a message.

10. The method of claim 1, comprising:
receiving a control directive to open the montage;
retrieving the montage from a remote datasource; and
presenting a user interface view of the presentation surface with the selected tile object in the presentation tile.

11. The method of claim 1, comprising:
receiving a control directive to select the tile object;
retrieving the data source for the tile object from a remote datastore; and
presenting a user interface view of the data source.

12. An article of manufacture comprising a storage device containing instructions that when executed enable a system to:
generate a montage comprising a presentation surface with multiple presentation tiles each having a selected tile object for a corresponding data source, the selected tile object having been selected from a plurality of tile objects generated via a content selection algorithm having a set of defined rules pertaining to types of information to retrieve from the data source for each tile object, the montage arranged for use with a gesture interface that allows manipulation of a tile object presented in a presentation tile, through a gesture, to present a second tile object in the presentation tile while the other tile objects of the montage remain unchanged;
send the montage and data sources to a network service;
receive references to the montage and each data source; and
associate a reference for a data source with a corresponding tile object.

13. The article of manufacture of claim 12, further comprising instructions that when executed enable the system to publish the reference to the montage to the network service.

14. The article of manufacture of claim 12, further comprising instructions that when executed enable the system to send the montage or a reference to the montage in a message.

15. An apparatus, comprising:
a logic device arranged to execute a montage application comprising an authoring component operative to provide a presentation surface having multiple presentation tiles, receive control directives to associate data sources with presentation tiles, generate multiple versions of a tile object for each data source using a content selection algorithm having a set of defined rules pertaining to types of information to retrieve from the data source for each version, receive a control directive to select one tile object as a selected tile object for each data source, and store the presentation surface and selected tile objects as a montage capable of navigation using a gesture interface that allows manipulation of a tile object presented in a presentation tile, through a gesture, to present a second tile object in the presentation tile while the other tile objects of the montage remain unchanged.

16. The apparatus of claim 15, the authoring component comprising multiple type modules corresponding to each type of digital content, a type module operative to retrieve information from a data source based on a type definition for a type of digital content, and generate a tile object based on the retrieved information and the type definition.

17. The apparatus of claim 15, comprising a security component operative to receive a control directive to authorize communicating data sources from a local datastore to a remote datastore for a network storage device accessible by a network service.

18. The apparatus of claim 15, comprising a publishing component operative to publish the montage and data sources from a local datastore to a remote datastore for a network storage device accessible by a network service.

19. The apparatus of claim 15, comprising a messaging component operative to send the montage or a reference to the montage in a message.

20. The apparatus of claim 15, comprising a presentation component operative to generate a first user interface view to present each selected tile object within each associated presentation tile of the presentation surface, receive a control directive to reselect a selected tile object, and generate a second user interface view to present a data source corresponding to the reselected tile object.

* * * * *